US011851374B2

United States Patent
Akono et al.

(10) Patent No.: US 11,851,374 B2
(45) Date of Patent: Dec. 26, 2023

(54) CEMENT REINFORCED WITH HIGH CONCENTRATIONS OF MECHANICALLY DISPERSED MULTIWALLED CARBON NANOTUBES AND CARBON NANOFIBERS

(71) Applicant: Northwestern University, Evanston, IL (US)

(72) Inventors: Ange-Therese Akono, Evanston, IL (US); Jiaxin Chen, Evanston, IL (US)

(73) Assignee: Northwestern University, Evanston, IL (US)

( * ) Notice: Subject to any disclaimer, the term of this patent is extended or adjusted under 35 U.S.C. 154(b) by 189 days.

(21) Appl. No.: 17/376,426

(22) Filed: Jul. 15, 2021

(65) Prior Publication Data

US 2022/0017418 A1 Jan. 20, 2022

Related U.S. Application Data

(60) Provisional application No. 63/052,072, filed on Jul. 15, 2020.

(51) Int. Cl.
*C04B 28/04* (2006.01)
*C04B 14/02* (2006.01)
(Continued)

(52) U.S. Cl.
CPC ............ *C04B 28/04* (2013.01); *C04B 14/026* (2013.01); *C04B 14/386* (2013.01); *B82Y 30/00* (2013.01); *B82Y 40/00* (2013.01)

(58) Field of Classification Search
CPC ..... C04B 28/04; C04B 14/026; C04B 14/386; B82Y 30/00; B82Y 40/00
See application file for complete search history.

(56) References Cited

U.S. PATENT DOCUMENTS 7,041,167 B2 * 5/2006 Jiang .................. C04B 22/06
106/713
8,865,107 B2 10/2014 Hersam et al.
(Continued)

FOREIGN PATENT DOCUMENTS

| CN | 108863127 A | 11/2018 |
|---|---|---|
| WO | WO 2013/096990 A1 | 7/2013 |
| WO | WO 2020/092449 A1 | 5/2020 |

OTHER PUBLICATIONS

Carmen Camacho et al. Materials 2014, 7, 1640-1651 (Year: 2014).*
(Continued)

*Primary Examiner* — Anthony J Zimmer
*Assistant Examiner* — Jordan W Taylor
(74) *Attorney, Agent, or Firm* — Bell & Manning, LLC

(57) ABSTRACT

Methods for the dispersion and synthesis of multi-walled carbon nanotube-cement composites with high concentrations of multi-walled carbon nanotubes that do not require chemical dispersion aids or dispersion-enhancing chemical surface functionalization are provided. Also provided are multi-walled carbon nanotube-cement composites made using the methods. Methods for the dispersion and synthesis of carbon nanofiber-cement composites with high concentrations of carbon nanofibers that do not require chemical dispersion aids or dispersion-enhancing chemical surface functionalization are further provided. Also provided are carbon nanofiber-cement composites made using the methods.

17 Claims, 35 Drawing Sheets

(51) Int. Cl.
    *C04B 14/38* (2006.01)
    *B82Y 40/00* (2011.01)
    *B82Y 30/00* (2011.01)

(56) References Cited

U.S. PATENT DOCUMENTS

| | | |
|---|---|---|
| 9,365,456 B2 | 1/2016 | Shah et al. |
| 9,499,439 B2 | 11/2016 | Shah et al. |
| 9,828,290 B2 | 11/2017 | Christiansen et al. |
| 2015/0152314 A1 | 6/2015 | Muthusamy et al. |
| 2019/0382269 A1 | 12/2019 | Askari et al. |
| 2022/0017418 A1 | 1/2022 | Akono et al. |
| 2022/0242787 A1 | 8/2022 | Akono |
| 2023/0072824 A1 | 3/2023 | Akono |

OTHER PUBLICATIONS

Di Bella et al. Cement and Concrete Research 78 (2015) 234-244 (Year: 2015).*

Konsta-Gdoutos et al. Cement & Concrete Composites 53 (2014) 162-169 (Year: 2014).*

Nochaiya et al. Applied Surface Science 257 (2011) 1941-1945 (Year: 2011).*

P. Stynoski et al. Cement & Concrete Composites 55 (2015) 232-240 (Year: 2015).*

Vandamme Cement and Concrete Research 40 (2010) 14-26 (Year: 2010).*

Yu et al. Sci Rep 6, 36967 (2016). (Year: 2016).*

Zhang et al. Construction and Building Materials 38 (2013) 1040-1050 (Year: 2013).*

Reales OA, Toledo Filho RD. A review on the chemical, mechanical and microstructural characterization of carbon nanotubes-cement based composites. *Constr. Build. Mat.* Nov. 15, 2017;154; 697-710.

Hu Y, Luo D, Li P, Li Q, Sun G. Fracture toughness enhancement of cement paste with multi-walled carbon nanotubes. *Constr. and Build. Mat.* Nov. 15, 2014;70; 332-338.

Liu J, Fu J, Ni T, Yang Y. Fracture toughness improvement of multi-wall carbon nanotubes/graphene sheets reinforced cement paste. *Constr. Build. Mat.* Mar. 10, 2019;200; 530-538.

Zou B, Chen SJ, Korayem AH, Collins F, Wang CM, Duan WH. Effect of ultrasonication energy on engineering properties of carbon nanotube reinforced cement pastes. *Carbon.* Apr. 1, 2015;85; 212-220.

Konsta-Gdoutos MS, Metaxa ZS, Shah, SP. Highly dispersed carbon nanotube reinforced cement based materials. *Cem. Concr. Res.* 2010;40 (7); 1052-1059.

Luo JL, Duan ZD, Zhao TJ, Li QY. Effect of multi-wall carbon nanotube on fracture mechanical property of cement-based composite. *Adv. Mat. Res.* 2011;146; 581-584.

Alafogianni P, Dassios K, Tsakiroglou CD, Matikas TE, Barkoula NM. Effect of CNT addition and dispersive agents on the transport properties and microstructure of cement mortars. *Constr. Build. Mat.* Feb. 10, 2019;197; 251-261.

Parveen S, Rana S, Fangueiro R. A review on nanomaterial dispersion, microstructure, and mechanical properties of carbon nanotube and nanofiber reinforced cementitious composites. *J. Nanomater.* Jan. 1, 2013. Doi: 10.1155/2013/710175.

Metaxa ZS, Konsta-Gdoutos MS, Shah SP. Carbon nanofiber cementitious composites: effect of debulking procedure on dispersion and reinforcing efficiency. *Cem. Concr. Comp.* Feb. 1, 2013;36; 25-32.

Tyson BM, Abu Al-Rub RK, Yazdanbakhsh A, Grasley Z. Carbon nanotubes and carbon nanofibers for enhancing the mechanical properties of nanocomposite cementitious materials. *J. Mater. Civil Eng.* 2011;23; 1028-1035.

Chuah, Samuel, et al. "Nano reinforced cement and concrete composites and new perspective from graphene oxide." *Construction and Building Materials* 73 (2014): 113-124.

Yang, Haibin, et al. "A critical review on research progress of graphene/cement-based composites." *Composites Part A: Applied Science and Manufacturing* 102 (2017): 273-296.

Cui, Xia, et al. "Mechanical properties and reinforcing mechanisms of cementitious composites with different types of multiwalled carbon nanotubes." *Composites Part A: Applied Science and Manufacturing* 103 (2017): 131-147.

Ange-Therese Akono, "Fracture toughness of one-and two-dimensional nanoreinforced cement via scratch testing," *Phil. Trans. R. Soc.* A379-20200288. https://doi.org/10.1098/rsta.2020.0288.

Ange-Therese Akono, Supplementary material for "Fracture toughness of one-and two-dimensional nanoreinforced cement via scratch testing," *Phil. Trans. R. Soc.* doi: 10.1098/rsta[paper ID in form xxxx.xxxx e.g.—10.1098/rsta.2014.0049]; pp. 1-11.

Zhifang Zhao et al., "A review on the properties, reinforcing effects, and commercialization of nanomaterials for cement-based materials," *Nanotechnology Reviews* 2020; 9: 303-322. https://doi.org/10.1515/ntrev-2020-0023.

Hongjian Du et al., "Enhancement of barrier properties of cement mortar with graphene nanoplatelet," *Cement and Concrete Research* 76 (2015) 10-19.

Fakhim Babak et al., "Preparation and Mechanical Properties of Graphene Oxide: Cement Nanocomposites," Hindawi Publishing Corporation, *The Scientific World Journal*, vol. 2014, Article ID 276323, pp. 1-10.

Jiaxin Chen et al., "Influence of Multi-walled carbon nanotubes on the hydration products of ordinary Portland cement paste," *Cement and Concrete Research* 137 (2020) 106197.

G.Y. Li, P.M. Wang, X. Zhao, Mechanical behavior and microstructure of cement composites incorporating surface-treated multi-walled carbon nanotubes, Carbon N. Y. 43 (2005) 1239-1245. https://doi.org/10.1016/j.carbon.2004.12.017.

Xiao-Lin Xie et al., "Dispersion and alignment of carbon nanotubes in polymer matrix: a review," *Materials Science and Engineering R* 49 (2005); 89-112.

J.M. Makar, J. Margeson, J. Luh, Carbon nanotube/cement composites—early results and potential applications, *NRC Publ. Rec.* (2005) 1-10. https://doi.org/10.1039/B910216G.

G.Y. Li, P.M. Wang, X. Zhao, Pressure-sensitive properties and microstructure of carbon nanotube reinforced cement composites, *Cem. Concr. Compos.* 29 (2007) 377-382. https://doi.org/10.1016/j.cemconcomp.2006.12.011.

S. Musso, J.M. Tulliani, G. Ferro, A. Tagliaferro, Influence of carbon nanotubes structure on the mechanical behavior of cement composites, *Compos. Sci. Technol.* 69 (2009) 1985-1990. https://doi.org/10.1016/j.compscitech.2009.05.002.

J.M. Makar, G.W. Chan, Growth of cement hydration products on single-walled carbon nanotubes, *J. Am. Ceram. Soc.* 92 (2009) 1303-1310. https://doi.org/10.1111/j.1551-2916.2009.03055.x.

B. Han, X. Yu, E. Kwon, A self-sensing carbon nanotube/cement composite for traffic monitoring, *Nanotechnology.* 20 (2009) 445501. https://doi.org/10.1088/0957-4484/20/44/445501.

X. Yu, E. Kwon, A carbon nanotube/cement composite with piezoresistive properties, *Smart Mater. Struct.* 18 (2009). https://doi.org/10.1088/0964-1726/18/5/055010.

M.S. Konsta-Gdoutos, Z.S. Metaxa, S.P. Shah, Multi-scale mechanical and fracture characteristics and early-age strain capacity of high performance carbon nanotube/cement nanocomposites, *Cem. Concr. Compos.* 32 (2010) 110-115. https://doi.org/10.1016/j.cemconcomp.2009.10.007.

S.P. Shah, M.. Konsta-Gdoutos, Z.S. Metaxa, Exploration of fracture characteristics, nanoscale properties and nanostructure of cementitious matrices with carbon nanotubes and nanofibers, Proc. 7th Int. Conf. Fract. Mech. *Concr. Concr. Struct.* (2010) 9-12.

A. Chaipanich, T. Nochaiya, W. Wongkeo, P. Torkittikul, Compressive strength and microstructure of carbon nanotubes-fly ash cement composites, *Mater. Sci. Eng. A.* 527 (2010) 1063-1067. https://doi.org/10.1016/j.msea.2009.09.039.

M.S. Morsy, S.H. Alsayed, M. Aqel, Hybrid effect of carbon nanotube and nano-clay on physico-mechanical properties of cement mortar, *Constr. Build. Mater.* 25 (2011) 145-149. https://doi.org/10.1016/j.conbuildmat.2010.06.046.

(56) References Cited

OTHER PUBLICATIONS

D. Gao, M. Sturm, Y.L. Mo, Erratum: Electrical resistance of carbon-nanofiber concrete (Smart Mater. Struct. (2010) 18 (095039), *Smart Mater. Struct.* 20 (2011). https://doi.org/10.1088/0964-1726/20/4/049501.
T. Nochaiya, A. Chaipanich, Behavior of multi-walled carbon nanotubes on the porosity and microstructure of cement-based materials, *Appl. Surf. Sci.* 257 (2011) 1941-1945. https://doi.org/10.1016/j.apsusc.2010.09.030.
F. Collins, J. Lambert, W.H. Duan, The influences of admixtures on the dispersion, workability, and strength of carbon nanotube-OPC paste mixtures, *Cem. Concr. Compos.* 34 (2012) 201-207. https://doi.org/10.1016/j.cemconcomp.2011.09.013.
S. Kawashima, P. Hou, D.J. Corr, S.P. Shah, Modification of cement-based materials with nanoparticles, *Cem. Concr. Compos.* 36 (2013) 8-15.
B. Wang, Y. Han, S. Liu, Effect of highly dispersed carbon nanotubes on the flexural toughness of cement-based composites, *Constr. Build. Mater.* 46 (2013) 8-12. https://doi.org/10.1016/j.conbuildmat.2013.04.014.
B. Han, S. Sun, S. Ding, L. Zhang, X. Yu, J. Ou, Review of nanocarbon-engineered multifunctional cementitious composites, *Compos. Part A Appl. Sci. Manuf.* 70 (2015) 69-81. https://doi.org/10.1016/j.compositesa.2014.12.002.
S. Xu, J. Liu, Q. Li, Mechanical properties and microstructure of multi-walled carbon nanotube-reinforced cement paste, *Constr. Build. Mater.* 76 (2015) 16-23. https://doi.org/10.1016/j.conbuildmat.2014.11.049.
P.A. Danoglidis, M.S. Konsta-Gdoutos, E.E. Gdoutos, S.P. Shah, Strength, energy absorption capability and self-sensing properties of multifunctional carbon nanotube reinforced mortars, *Constr. Build. Mater.* 120 (2016) 265-274. https://doi.org/10.1016/j.conbuildmat.2016.05.049.
E.E. Gdoutos, M.S. Konsta-Gdoutos, P.A. Danoglidis, Portland cement mortar nanocomposites at low carbon nanotube and carbon nanofiber content: A fracture mechanics experimental study, *Cem. Concr. Compos.* 70 (2016) 110-118. https://doi org/10.1016/j.cemconcomp.2016.03.010.
S.P. Tastani, M.S. Konsta-Gdoutos, S.J. Pantazopoulou, V. Balopoulos, The effect of carbon nanotubes and polypropylene fibers on bond of reinforcing bars in strain resilient cementitious composites, *Front. Struct. Civ. Eng.* 10 (2016) 214-223. https://doi.org/10.1007/s11709-016-0332-3.
G. Sun, R. Liang, Z. Lu, J. Zhang, Z. Li, Mechanism of cement/carbon nanotube composites with enhanced mechanical properties achieved by interfacial strengthening, *Constr. Build. Mater.* 115 (2016) 87-92. https://doi.org/10.1016/j.conbuildmat.2016.04.034.
Z.S. Metaxa, E.D. Pasiou, I. Dakanali, I. Stavrakas, D. Triantis, S.K. Kourkoulis, Carbon nanotube reinforced mortar as a sensor to monitor the structural integrity of restored marble epistyles under shear, *Procedia Struct. Integr.* 2 (2016.
K.M. Liew, M.F. Kai, L.W. Zhang, Carbon nanotube reinforced cementitious composites: An overview, Compos. Part A Appl. Sci. Manuf. 91 (2016) 301-323. https://doi.org/10.1016/j.compositesa.2016.10.020.
B. Balasubramaniam, K. Mondal, K. Ramasamy, G.S. Palani, N.R. Iyer, Hydration phenomena of functionalized carbon nanotubes (CNT)/cement composites, *Fibers.* 5 (2017) 1-13, https://doi.org/10.3390/fib5040039.
A. Sedaghatdoost, K. Behfarnia, Mechanical properties of Portland cement mortar containing multi-walled carbon nanotubes at elevated temperatures, *Constr. Build. Mater.* 176 (2018) 482-489. https://doi.org/10.1016/j.conbuildmat.2018.05.095.
Y. Ruan, B. Han, X. Yu, W. Zhang, D. Wang, Carbon nanotubes reinforced reactive powder concrete, Compos. Part A Appl. Sci. Manuf. 112 (2018) 371-382. https://doi.org/10.1016/j.compositesa.2018.06.025.
P. Sikora, M. Abd Elrahman, S.Y. Chung, K. Cendrowski, E. Mijowska, D. Stephan, Mechanical and microstructural properties of cement pastes containing carbon nanotubes and carbon nanotube-silica core-shell structures, exposed to elevated temperature, *Cem. Concr. Compos.* 95 (2019) 193-204. https://doi.org/10.1016/j.cemconcomp.2018.11.006.
B.R. Ahmed, A. Hussein, D. Saleh, R.S.M. Rashid, Influence of Carbon Nanotubes ( CNTs ) in the *Cement Composites*, (2019). https://doi.org/10.1088/1755-1315/357/1/012024.
T. Shi, Y. Gao, D.J. Corr, S.P. Shah, FTIR study on early-age hydration of carbon nanotubes-modified cement-based materials, *Adv. Cem. Res.* 31 (2019) 353-361. https://doi.org/10.1680/jadcr.16.00167.
M.O. Mohsen, M.S. Al Ansari, R. Taha, N. Al Nuaimi, A.A. Taqa, Carbon Nanotube Effect on the Ductility, Flexural Strength, and Permeability of Concrete, *J. Nanomater.* 2019 (2019) 1-11. https://doi.org/10.1155/2019/6490984.
G.M. Kim, I.W. Nam, B. Yang, H.N. Yoon, H.K. Lee, S. Park, Carbon nanotube (CNT) incorporated cementitious composites for functional construction materials: The state of the art, *Compos. Struct.* 227 (2019) 111244. https://doi.org/10.1016/j.compstruct.2019.111244.
Z. Li, D.J. Corr, B. Han, S.P. Shah, Investigating the effect of carbon nanotube on early age hydration of cementitious composites with isothermal calorimetry and Fourier transform infrared spectroscopy, *Cem. Concr. Compos.* (2020) 103513. https://doi.org/10.1016/j.cemconcomp.2020.103513.
Jennings, Hamlin M., et al. "Characterization and modeling of pores and surfaces in cement paste: correlations to processing and properties." *Journal of Advanced Concrete Technology* 6.1 (2008): 5-29.
He, Huan, et al. "Modifying Mechanical Strength and Capillary Porosity of Portland Cement-Based Mortar Using a Biosurfactant from Pseudomonas fluorescens." *Advances in Materials Science and Engineering* 2020 (2020).
Yu, Zechuan, Ao Zhou, and Denvid Lau. "Mesoscopic packing of disk-like building blocks in calcium silicate hydrate." *Scientific reports* 6.1 (2016): 1-8.
Yakovlev et al., Cement Based Foam Concrete Reinforced by Carbon Nanotubes, Materials Science, vol. 12, No. 2, 2006, pp. 147-151.
Mitchell et al., The Effects of Solvents on C—S—H as Determined by Thermal Analysis, Journal of Thermal Analysis and Calorimetry, vol. 86, No. 3, Dec. 2006, pp. 591-594.
Al-Rub et al., On the aspect ratio effect of multi-walled carbon nanotube reinforcements on the mechanical properties of cementitious nanocomposites, Construction and Building Materials, vol. 35, May 31, 2012, pp. 647-655.
Hunashyal et al., Experimental investigation of the effect of carbon nanotubes and carbon fibres on the behaviour of plain cement composite beams, The IES Journal Part A: Civil & Structural Engineering, vol. 4, No. 1, Feb. 10, 2011, pp. 29-36.
Campillo et al., High-Performance Nanostructured Materials for Construction, Nanotechnology in Construction, 2004, pp. 215-225.
Jiang et al., Carbon Nanotubes as a New Reinforcement Material for Modern Cement-Based Binders, NICOM 2: $2^{nd}$ International Symposium on Nanotechnology in Construction, 2006, pp. 209-213.
Luo et al., The influence of surfactants on the processing of multi-walled carbon nanotubes in reinforced cement matrix composites, Phys. Status Solidi A, vol. 206, No. 12, Jul. 27, 2009, pp. 2783-2790.
Ferro et al., Carbon nanotubes cement composites, Frattura ed Integrità Strutturale, vol. 18, 2011, pp. 34-44.
Sobolkina et al., Dispersion of carbon nanotubes and its influence on the mechanical properties of the cement matrix, Cement & Concrete Composites, vol. 34, Aug. 8, 2012, pp. 1104-1113.
Pacheco-Torgal, Nanotechnology: Advantages and drawbacks in the field of construction and building materials, Construction and Building Materials, vol. 25, Aug. 1, 2010, pp. 582-590. Knapen et al., Effect of free water removal from early-age hydrated cement pastes on thermal analysis, Construction and Building Materials, vol. 23, No. 11, Nov. 2009, pp. 3431-3438.
Knapen et al., Effect of free water removal from early-age hydrated cement pastes on thermal analysis, Construction and Building Materials, vol. 23, No. 11, Nov. 2009, pp. 3431-3438.
Han et al., Multifunctional and Smart Carbon Nanotube Reinforced Cement-Based Materials, Chapter 1 from Nanotechnology in Civil

(56) References Cited

OTHER PUBLICATIONS

Infrastructure—A Paradigm Shift, Kasthurirangan Gopalakrishnan, Bjorn Birgisson, Peter Taylor, and Nii O. Attoh-Okine (Eds.), Springer, 2011, pp. 1-47.

Selvam et al., Application of Nanoscience Modeling to Understand the Atomic Structure of C—S—H, Chapter 3 from *Nanotechnology in Civil Infrastructure—A Paradigm Shift*, Kasthurirangan Gopalakrishnan, Bjorn Birgisson, Peter Taylor, and Nii O. Attoh-Okine (Eds.), Springer, 2011, pp. 85-102.

Birgisson et al., Optimization of Clay Addition for the Enhancement of Pozzolanic Reaction in Nano-modified Cement Paste, Chapter 7 from Nanotechnology in Civil Infrastructure—A Paradigm Shift, Kasthurirangan Gopalakrishnan, Bjorn Birgisson, Peter Taylor, and Nii O. Attoh-Okine (Eds.), Springer, 2011, pp. 225-236.

Sanchez et al., Nanotechnology in concrete—A review, Construction and Building Materials, vol. 24, May 15, 2010, pp. 2060-2071.

Melo et al., Macro- and Micro-Characterization of Mortars Produced with Carbon Nanotubes, ACI Materials Journal, vol. 108, No. 3, May-Jun. 2011, pp. 327-332.

Chen et al., Carbon nanotube-cement composites: A retrospect, The IES Journal Part A: Civil & Structural Engineering, vol. 4, No. 4, Sep. 19, 2011, pp. 254-265.

The International Search Report and the Written Opinion dated Jun. 9, 2021 for International application No. PCT/US2021/15651; pp. 1-14.

Chi et al., Preparation and Mechanical Properties of Potassium Metakaolin Based Geopolymer Paste Feb. 19, 2019 (Jan. 19, 2019) *Advanced Engineering Forum*, vol. 31; pp. 38-45.

Dimitrova et al., Non-aqueous Surfactant-free Antiform Emulsions: Properties and Triggered Release Feb. 2014, *The Canadian Journal of Chemical Engineering*, vol. 92; pp. 330-336.

Thomas Chudoba, "Measurement of Hardness and Youngs Modulus by Nanoindentation," Chapter 6, Nanostructured Coatings, Copyright 2006; pp. 1-5.

Wikipedia 'Elastic Modulus' May 21, 2018 (May 21, 2018) retrieved from, https://en.wikipedia.org/w/index.php?title+Elastic_modulus &oldid+842299072>, pp. 1-4.

Meng et al., "Improving the Flexural Performance of Ultra-High-performance Concrete by Rheology Control of Suspending Mortar," Abstract, Improved Flexural Performance of Ultra-High-Performance Concrete by Rheology Control of Suspending Mortar, Jun. 1, 2019 (Jun. 1, 2019); pp. 1-4.

Dong et al., "Effects of Carboxylated Multiwalled Carbon Nanotubes on the Function of Macrophages," *Journal of Nanomaterials*, 2015, vol. 2015, Article ID 638760; pp. 1-9. http://dx.doi.org/10.1155/2015/638760.

Li et al., "Single-walled carbon nanotubes as ultrahigh frequency nanomechanical resonators," *Physical Review B*, 2003, vol. 68; p. 073405-1-073405-3.

Graziele da Luz et al., "Effect of pristine and functionalized carbon nanotubes on microstructural, rheological, and mechanical behaviors of metakaolin-based geopolymer," *Cement and Concrete Composites*, 2019, vol. 104, 103332; pp. 1-2.

Ghasan F. Huseien et al., "Effect of metakaolin replaced granulated blast furnace slag on fresh and early strength properties of geopolymer mortar," *Ain Shams Engineering Journal*, 2018, vol. 9; pp. 1557-1566.

Ange-Therese Akono, "Fracture behavior of metakaolin-based geopolymer reinforced with carbon nanofibers," *Ceramic Engineering & Science*, 2020; pp. 234-242. DOI: 10.1002/ces2.10060.

Pavel Rovnanik et al., "Effect of carbon nanotubes on the mechanical fracture properties of fly ash geopolymer," *Procedia Engineering*, 2016, vol. 151; pp. 321-328.

Sun, Xiaoyan, et al. "Influence of multi-walled nanotubes on the fresh and hardened properties of a 3D printing PVA mortar ink," *Construction and Building Materials* 247 (2020): 118590.

Su, Zijian, Wei Hou, and Zengqing Sun. "Recent advances in carbon nanotube-geopolymer composite," *Construction and Building Materials* 252 (2020): 118940.

Pongsak Jittabut et al., "Physical and Microstructure Properties of Geopolymer Nanocomposite Reinforced with Carbon Nanotubes," *Materials Today: Proceedings* 17 (2019): 1682-1692.

Yuan, Jingkun, et al. "In situ processing of MWCNTs/leucite composites through geopolymer precursor," *Journal of the European Ceramic Society* 37.5 (2017): 2219-2226.

Ma, Y., G. Ye, and J. Hu, "Micro-mechanical properties of alkali-activated fly ash evaluated by nanoindentation," *Construction and Building Materials* 147 (2017): 407-416.

Nur Yazdani et al., "Carbon Nano-Tube and Nano-Fiber in Cement Mortar: Effect of Dosage Rate and Water-Cement Ratio," *International Journal of Material Science* (IJMSCI), Jun. 2014, vol. 4, Issue 2; pp. 45-52. Doi: 10.14355/ijmsci.2014.0402.01.

R.A. Sa Ribeiro et al., "A Review of Particle- and Fiber-Reinforced Metakaolin-Based Geopolymer Composites," *Journal of Ceramic Science and Technology*, 08[3] 307-322 (2017). DOI: 10.4416/JCST2017-00048.

Tiesong Lin et al., "Effects of fiber length on mechanical properties and fracture behavior of short carbon fiber reinforced geopolymer matrix composites," *Materials Science and Engineering A* 497 (2008) 181-185.

Saloumeh Mesgari Abbasi et al., "Microstructure and mechanical properties of a metakaolinite-based geopolymer nanocomposite reinforced with carbon nanotubes," *Ceramics International* 42 (2016) 15171-15176.

Natali et al., "Novel fiber-reinforced composite materials based on sustainable geopolymer matrix," *Procedia Engineering* 21 (2011) 1124-1131.

Pergang He et al., "Effects of high-temperature heat treatment on the mechanical properties of unidirectional carbon fiber reinforced geopolymer composites," *Ceramics International* 36 (2010) 1447-1453.

Mohamed Saafi et al., "Multifunctional properties of carbon nanotube/fly ash geopolymeric nanocomposites," *Construction and Building Materials* 49 (2013) 46-55.

\* cited by examiner

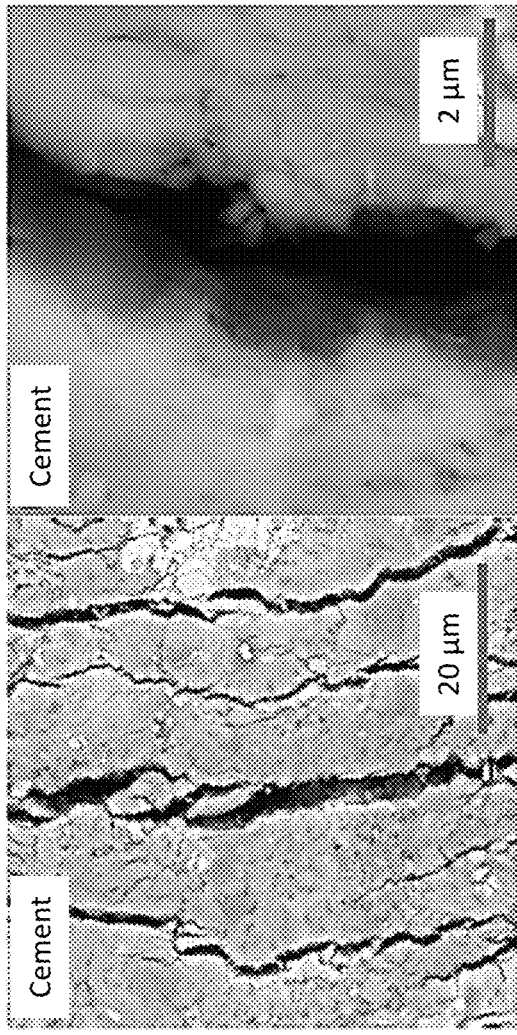
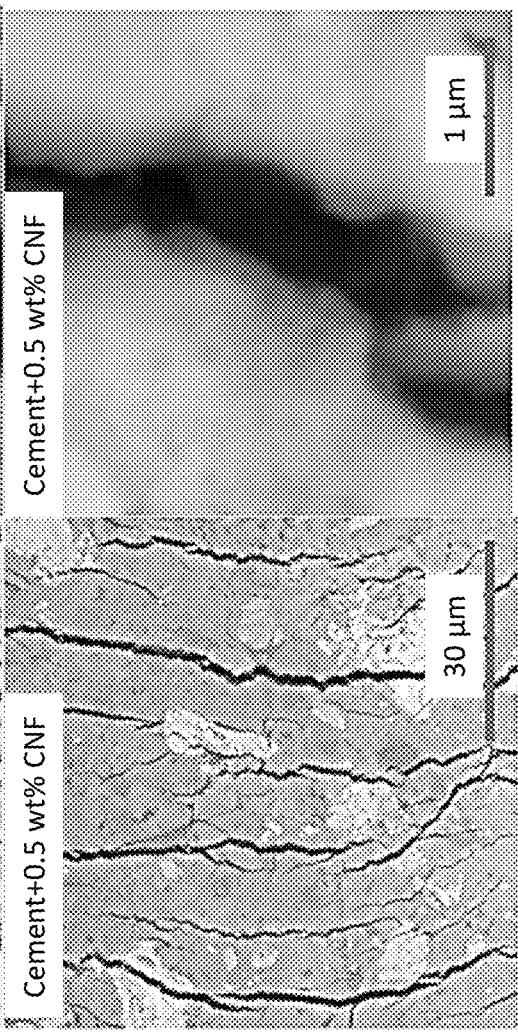
FIG. 22A  FIG. 22B  FIG. 22C  FIG. 22D

CEMENT REINFORCED WITH HIGH CONCENTRATIONS OF MECHANICALLY DISPERSED MULTIWALLED CARBON NANOTUBES AND CARBON NANOFIBERS

CROSS-REFERENCE TO RELATED APPLICATIONS

The present application claims priority to U.S. provisional patent application No. 63/052,072 that was filed Jul. 15, 2020, the entire contents of which are incorporated herein by reference.

REFERENCE TO GOVERNMENT RIGHTS

This invention was made with government support under 1829101 awarded by the NSF. The government has certain rights in the invention.

BACKGROUND

Cement paste is an essential component of concrete. However, cement paste is inherently brittle. To improve the fracture performance and the strength properties of cement paste, many studies have focused on multi-walled carbon nanotube (MWCNT) reinforcement. Another advantage of MWCNT-cement composites is the ability to improve the durability and thermal conductivity, and boost the electrical conductivity.

Low concentration MWCNT-cement composites have been studied by many professionals. Some professionals tried to add chemical compositions to cement composites to achieve adequate carbon nanotube dispersion. Others have applied surface treatments to carbon nanotubes such as carboxylic acid attachment, acidic treatment, non-covalent surface modification, and sodium dodecyl sulfate. Dispersion by sonication has been used; however, it is usually used with additional chemical components such as isopropanol, single-walled carbon nanotubes, sodium dodecylbenzene sulfonate, surfactants (e.g., gum Arabic), sulfuric acid, nitric acid, organic ammonium chloride solution, alkylbenzene sulfonic acid, or styrene butadiene rubber co-polymer latex. The results of these studies are summarized below.

Many studies have shown that MWCNT-reinforced cement displayed higher strength characteristics. Shah et al. found that the addition of 0.048 weight percent (wt %) of MWCNT increases the compressive strength. (S. P. Shah et al., Proc. 7th Int. Conf. Fract. Mech. Concr. Concr. Struct. (2010) 912.) Xu et al. found that incorporating 0.025 wt %, 0.05 wt %, and 0.1 wt % of MWCNT into cement paste can increase compressive strength by 9.4%, 18.32%, and 21.78%, respectively, at 7 days. (S. Xu, et al., Constr. Build. Mater. 76 (2015) 1623. Zou et al. synthesized cement composites using 0.038 wt % and 0.08 wt % of 9.5 nm functionalized MWCNTs. They observed that MWCNTs contribute to a significant increase in the Youngs modulus, the flexural strength, and the fracture energy. (B. Zou, et al., Carbon N. Y. 85 (2015) 212220.) Falara et al. cast cement composites with 0.048 wt % and 0.08 wt % of 20-40 nm wide MWCNTs. After 28 days of curing, they reported an increase in the modulus of elasticity by 28.4% and 47.8%, respectively. Furthermore, Shah et al. tested MWCNT-modified cement specimens with reinforcement levels 0.048 wt % and 0.08 wt % using MWCNTs with different lengths. In each instance, the modulus of elasticity was increased after 3, 7, and 28 days of curing. (Shah et al., 2010.) Similarly, Konsta-Gdoutos et al. showed an enhancement in the flexural strength and elastic modulus of MWCNT-modified cement after 3, 7, and 28 days of curing. (M. S. Konsta-Gdoutos et al., Cem. Concr. Res. 40 (2010) 10521059.)

Several researchers have also shown that the fracture performance of cement composites can be improved by the addition of MWCNTs. Hu et al. found that incorporating 0.05 wt % and 0.1 wt % of MWCNTs with a surfactant can increase the fracture toughness by 6.27%, 9.41%; however, for a 1.0 wt % reinforcement level, they reported a decrease in fracture energy by 3.12%. (Y. Hu, et al., Constr. Build. Mater. 70 (2014) 332338.) Wang et al. found that within a range 0.05-0.15 wt % of MWCNT reinforcement levels, and using a surfactant, 0.08 wt % was the optimum concentration for the improvement in fracture toughness. (B. Wang, et al., Constr. Build. Mater. 46 (2013) 812.) However, many questions remain regarding the strengthening and toughening mechanisms of MWCNTs in cement composites, and the effect of MWCNTs on cement hydration products is still under debate.

To address the challenges of dispersing carbon nanotubes in water, others have tried to forego any chemical treatments by adding fly ash to the cement composites along with carbon nanotubes and ultrasonicating without any emphasis on a specific energy setup. However, the resultant high viscosity of the cement composites makes it challenging and difficult to process or use at a construction site. Moreover, it is challenging to select the suitable amount of dispersion energy and dispersion method. Furthermore, with additional surface treatments and additional chemical or superplasticizer, not only does the chemical composition of cement composites change, but also the complexity of the manufacturing procedure needed to implement the cement compositions commercially. (A. Sobolkina, et al., Cem. Concr. Compos. 34 (2012) 11041113 and J. M. Makar, et al., NRC Publ. Rec. (2005) 110.)

Carbon nanofiber (CNF)-reinforced cement is also a relatively new type of smart and multifunctional construction material that can be rendered electrically conductive, magnetic, and self-sensing for strains and damage. Prior research has shown that CNFs can enhance the electrical sensitivity and the strain sensing capabilities of self-consolidating concrete. Consequently, CNF-reinforced concrete has been studied in structural health monitoring and in electromagnetic interference shielding applications.

Like MWCNTs, CNFs have a strong potential to enhance the mechanical behavior of cementitious composites. Yet, a major challenge resides in achieving an optimal dispersion of carbon nanofibers within the cement matrix. The issue is the presence of strong van der Waals forces that promote carbon nanofiber agglomeration. Yazdanbakhsh et al. showed that the efficiency of the CNF dispersion procedure is a function of the superplasticizer and of the cement grain size. (A. Yazdanbakhsh, et al., Transportation Research Record 2142 (2010) 89-95.) Tyson et al. cast cement composites with 0.1-0.2 wt % CNF. (B. Tyson, et al., Journal of Materials in Civil Engineering 23 (2011) 1028-1035.) The CNFs were dispersed using a high-range polycarboxylate-based water reducing admixture along with ultrasonication. They reported an increase in the strength and Young's modulus after 21 days of curing. Abu Al-rub et al. investigated the influence of surface functionalization of CNFs by treatment with an acidic solution on the mechanical properties of CNF composites: although the surface functionalization step increased the interfacial bonding between CNFs and the cement matrix, a decrease in Young's modulus was observed due to the formation of ettringite phases. (R. Abu Al-Rub, et al., Journal of Nanomechanics and Micromechanics 2 (2012) 1-6.) Metaxa et al. reported a nonlinear improvement in the flexural strength for CNF cement composites with 0.025-0.1 wt % CNF, and with 0.048 wt % CNF yielding the optimum flexural strength. (Z. Metaxa, et al., Transportation research record 2142 (2010) 114-622 118; and Z. Metaxa, et al., Cement and Concrete Composites 36 (2013) 25-32.) Their optimum dispersion procedure involved ultrasonication of CNFs in an aqueous surfactant solution with a surfactant-to-CNF weight ratio of 4.0, and with an ultrasonic energy input of 2800 kJ/l. Further studies by Gdoutos et al. revealed a significant increase in the Young's modulus and the fracture toughness for mortar with 0.1 wt % CNF. (E. Gdoutos, et al., Cement and Concrete Composites 70 (2016) 110-118.) In addition, Sanchez and coworkers reported a secondary disaggregation of CNFs following dispersion in water with and without a high-range water reducing agent. (C. Gay, et al., Transportation Research Record 2142 (2010) 109-113; and C. Stephens, et al., Carbon 107 (2016) 482-500.)

Moreover, CNFs can tremendously improve the durability of cement paste. Brown and Sanchez observed reduced cracking and limited changes in compressive strength in CNF cement following exposure to sulfate attack. (L. Brown, et al., Construction and Building Materials 166 (2018) 181-187.) Wang et al. reported a decrease in total porosity for CNF-modified cement composites. (B. Wang, et al., Journal of Wuhan University of Technology-Mater. Sci. Ed. 29 (2014) 82-88.) Furthermore, Blandine et al. reported a drastic reduction in autogenous shrinkage for Portland cement paste reinforced with 0.1 wt % CNF. (F. Blandine, et al., Frontiers of Structural and Civil Engineering 10 (2016) 224-235.)

Despite big strides in the science of MWCNT- and CNF-modified cements, limitations in the properties of these cement composites have prevented them from achieving wide-spread use.

SUMMARY

MWCNT-reinforced cements composites and CNF-reinforced cement composites are provided.

One example of a cement composite includes: Portland cement; and multiwalled carbon nanotubes that are free of dispersion-enhancing chemical surface functionalization and are present at a concentration in the range from 0.2 wt % to 1.0 wt %, based on the total weight of the Portland cement and the multiwalled carbon nanotubes, wherein: the cement composite is free of dispersing aids; the cement composite has a gel porosity in the range from 0.15 to 0.20 and a capillary porosity of less than 0.1; the cement composite has a volume fraction of high-density calcium-silicate-hydrates in the range from 0.3 to 0.6; and the cement composite has a Young' modulus in the range from 15 GPa to 50 GP, including the range from 18 GPa to 45 GPa.

Another example of a cement composite includes: Portland cement; and carbon nanofibers that are free of dispersion-enhancing chemical surface functionalization and are present at a concentration in the range from 0.1 wt % to 0.5 wt %, based on the total weight of the Portland cement and the carbon nanofibers, wherein: the cement composite is free of dispersing aids; the cement composite has a gel porosity in the range from 0.16 to 0.20 and a capillary porosity of less than 0.1; the cement composite has a volume fraction of high-density calcium-silicate-hydrates in the range from 0.65 to 0.75; and the cement composite has a Young' modulus in the range from 30 GPa to 40 GPa.

BRIEF DESCRIPTION OF THE DRAWINGS

Illustrative embodiments of the invention will hereafter be described with reference to the accompanying drawings, wherein like numerals denote like elements.

(FIG. 5B) Cement with 0.2 wt % MWCNT; (FIG. 5C) Cement with 0.5 wt % MWCNT; (FIG. 5D) Cement with 1.0 wt % MWCNT.

(FIG. 8A) CT0.0; (FIG. 8B) CT0.5, dashed circles represent bridging effects.

MWCNT; CT0.5=cement+0.5 wt % MWCNT; CT1.0=cement+1.0 wt % MWCNT, (Raw Data, no background subtraction).

Figures 14A, 14B:
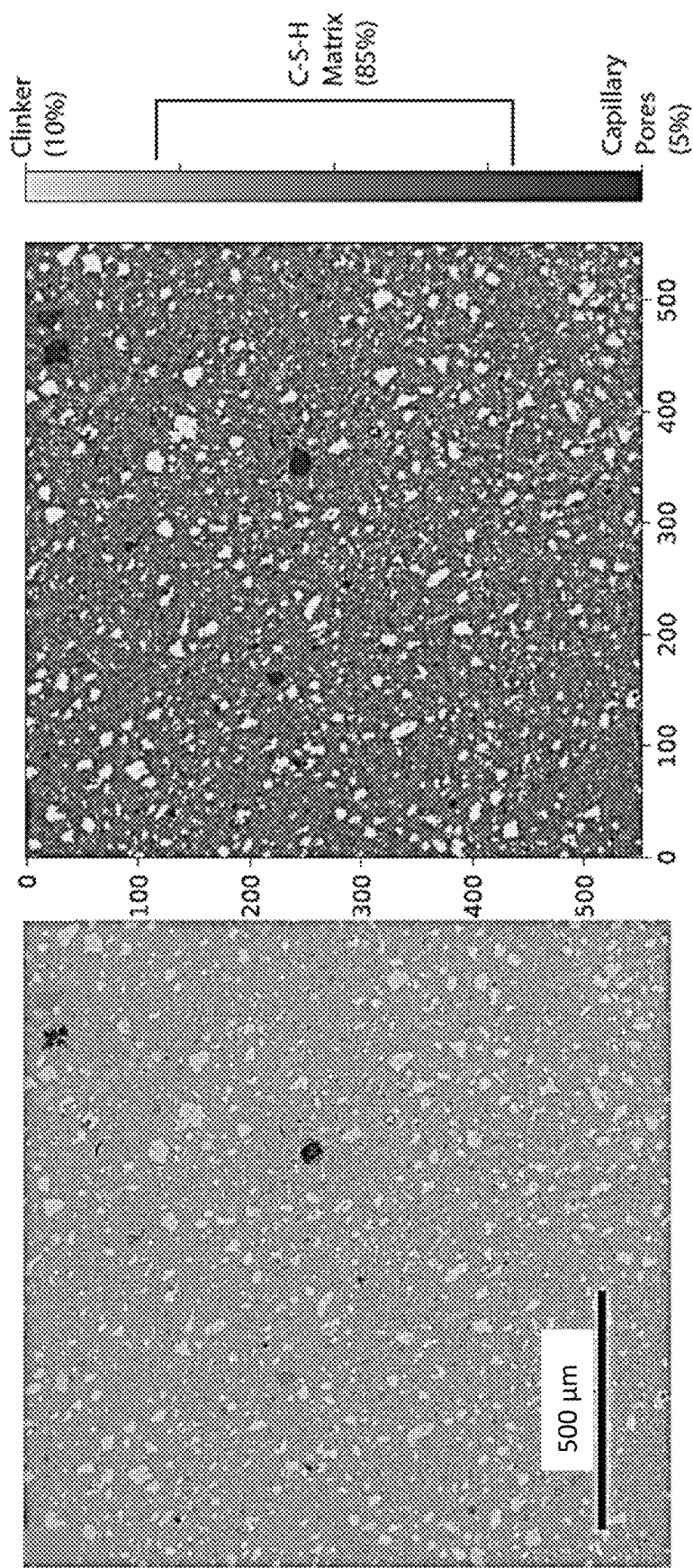

FIG. 14A shows an environmental backscattered electron microscopy (ESEM) image of a CNF cement composite (0.5 wt % CNF) at a 55× magnification level. The C—S—H matrix is in dark grey, clinker grains are in light grey, and capillary pores are in black. FIG. 14B shows a digital image analysis of an ESEM image of CNF-modified cement.

Figure 15:
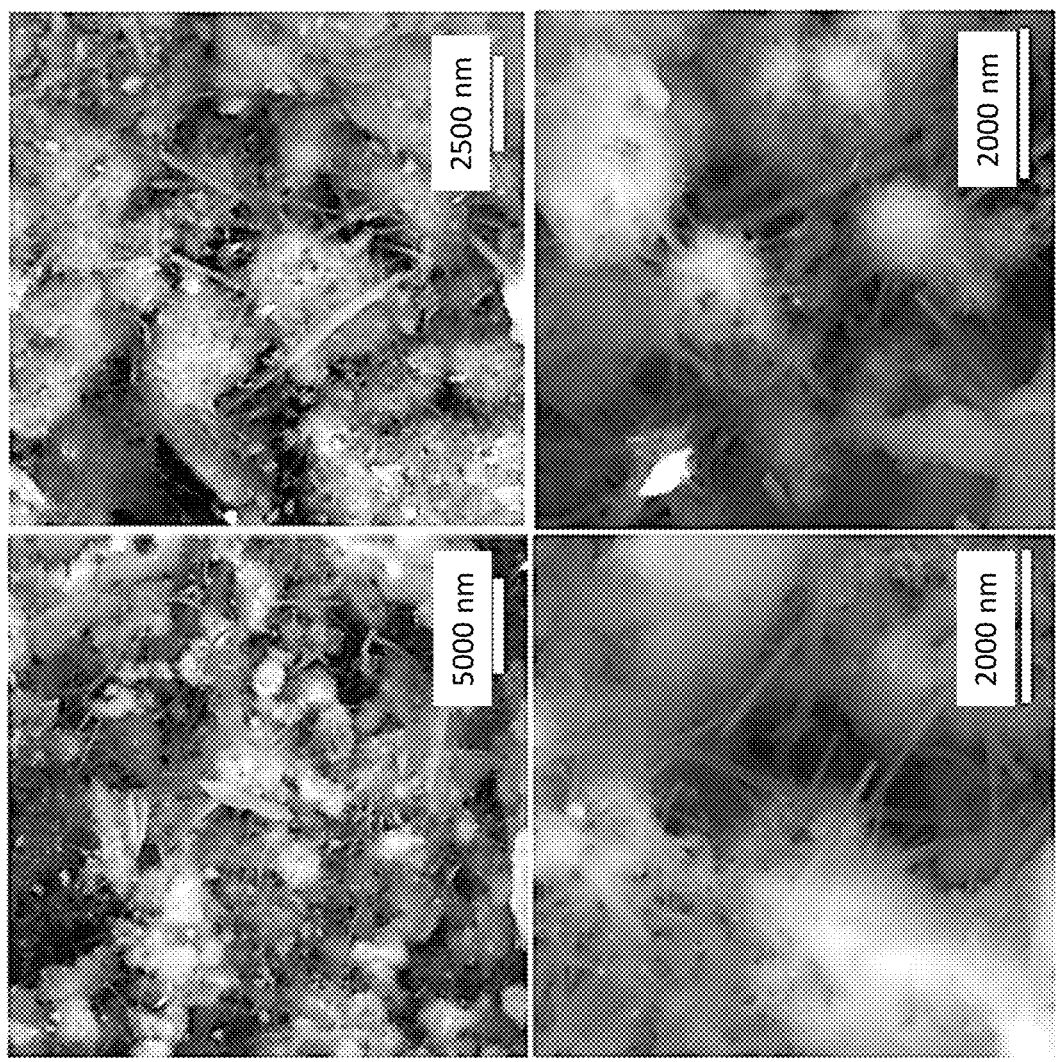

FIG. 15 shows an ESEM image of the C—S—H matrix within a CNF cement composite (0.5 wt % CNF) at a 20,000× magnification level.

Figure 16:
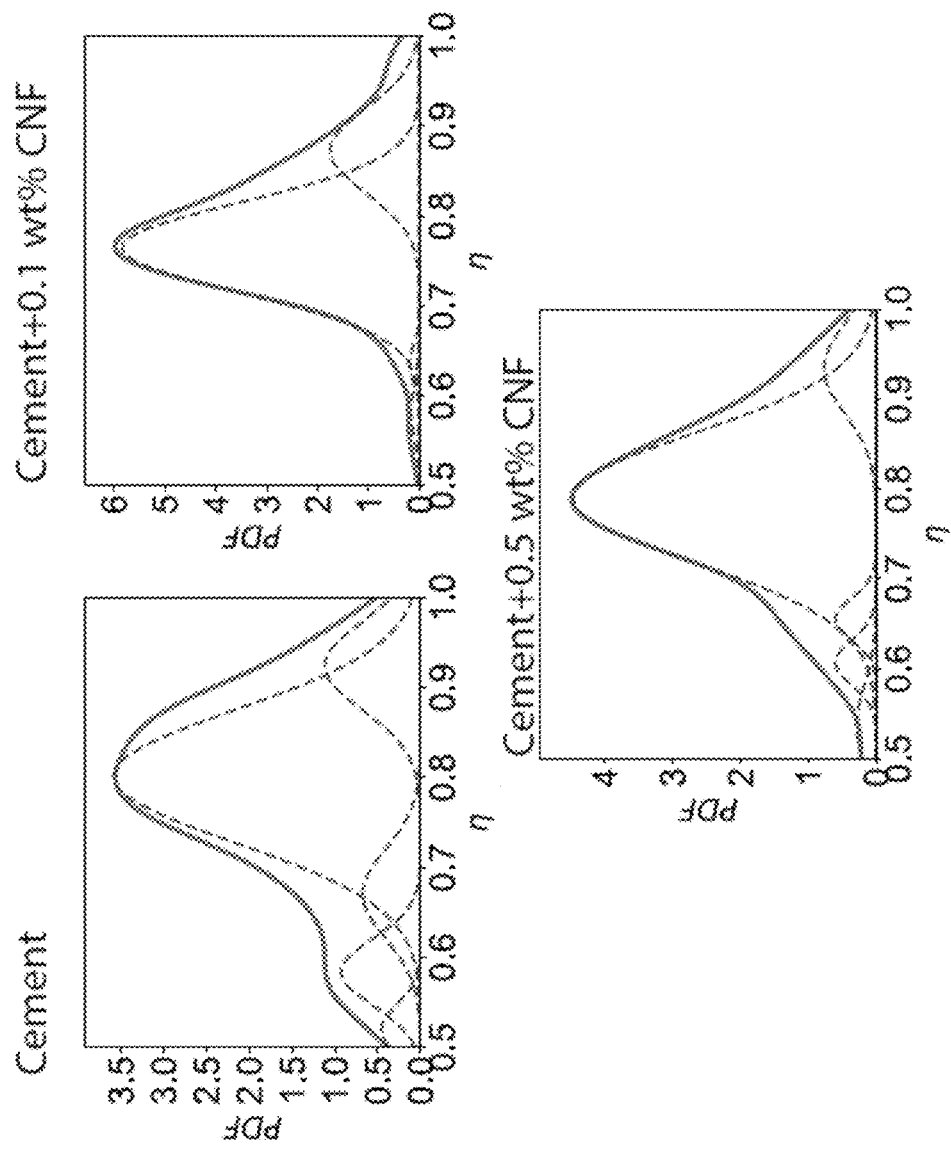

FIG. 16 shows probability distribution functions (PDFs) of the local packing density ($\eta$) for plain cement and for CNF-modified cement composites.

Figure 17:
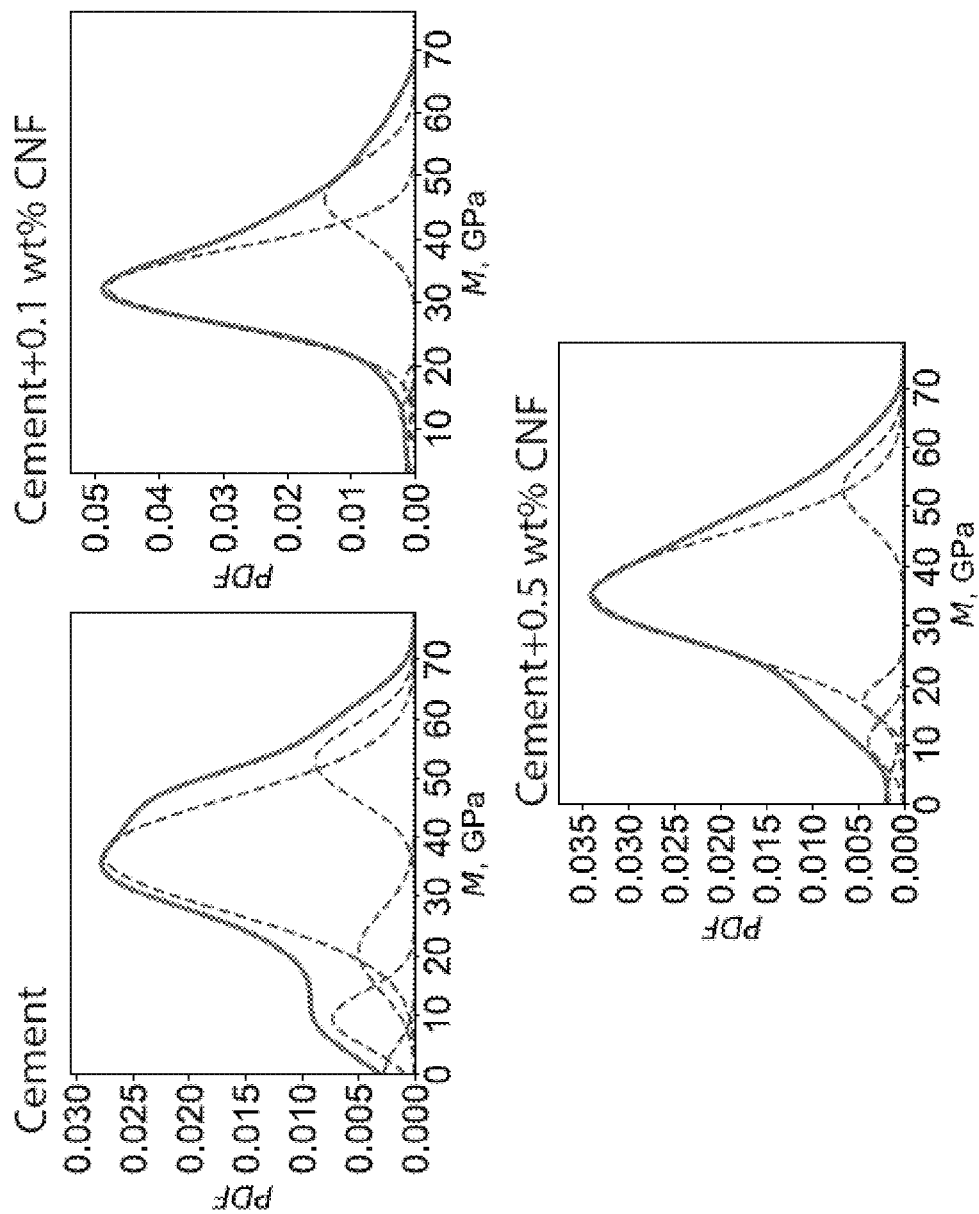

FIG. 17 shows PDFs of the indentation modulus (M) for plain cement and for CNF-modified cement composites. The dotted lines represent the probability distribution functions for individual chemomechanical phases, whereas the solid line represents the experimental collective probability distribution function based on 400 indentation tests.

Figure 18:
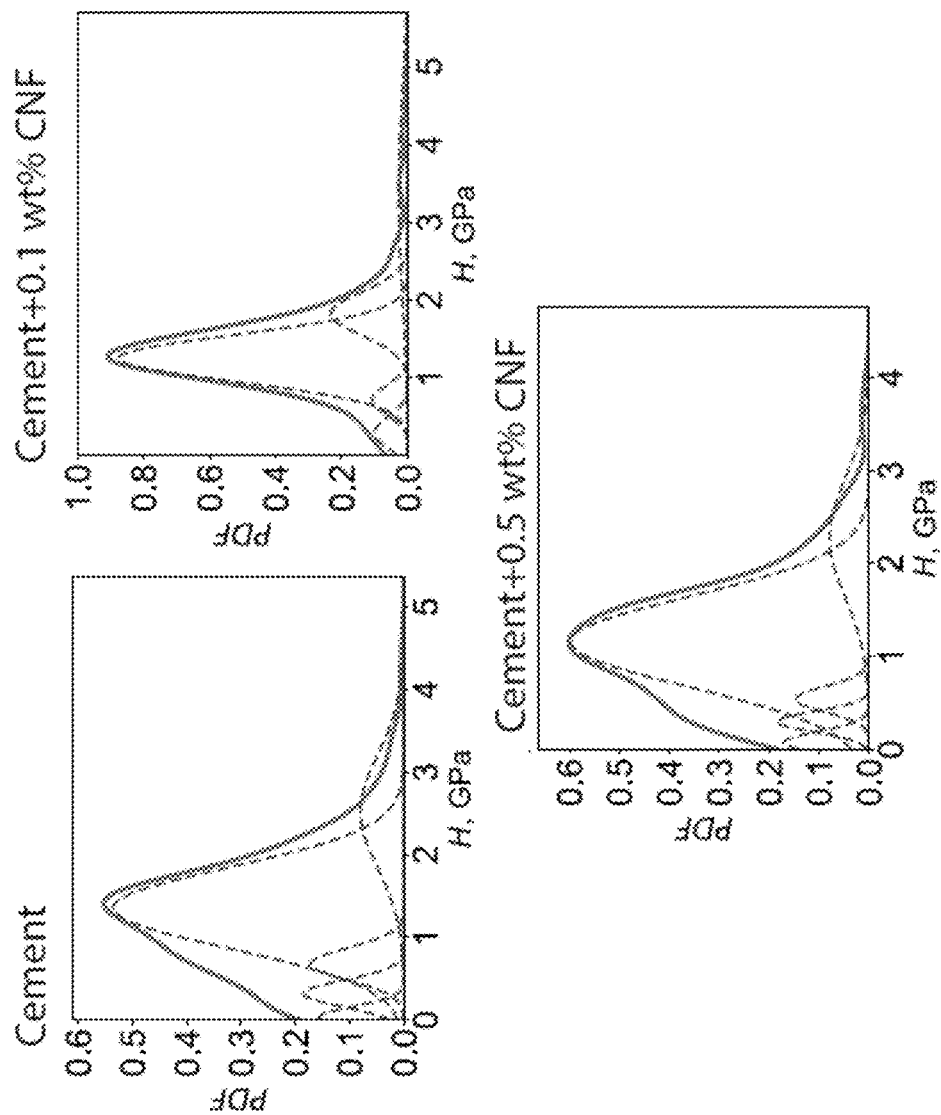

FIG. 18 shows PDFs of the indentation hardness (H) for plain cement and for CNF-modified cement composites. The dotted lines represent the probability distribution functions for individual chemomechanical phases whereas the solid line represents the experimental collective probability distribution function based on 400 indentation tests.

Figure 19:
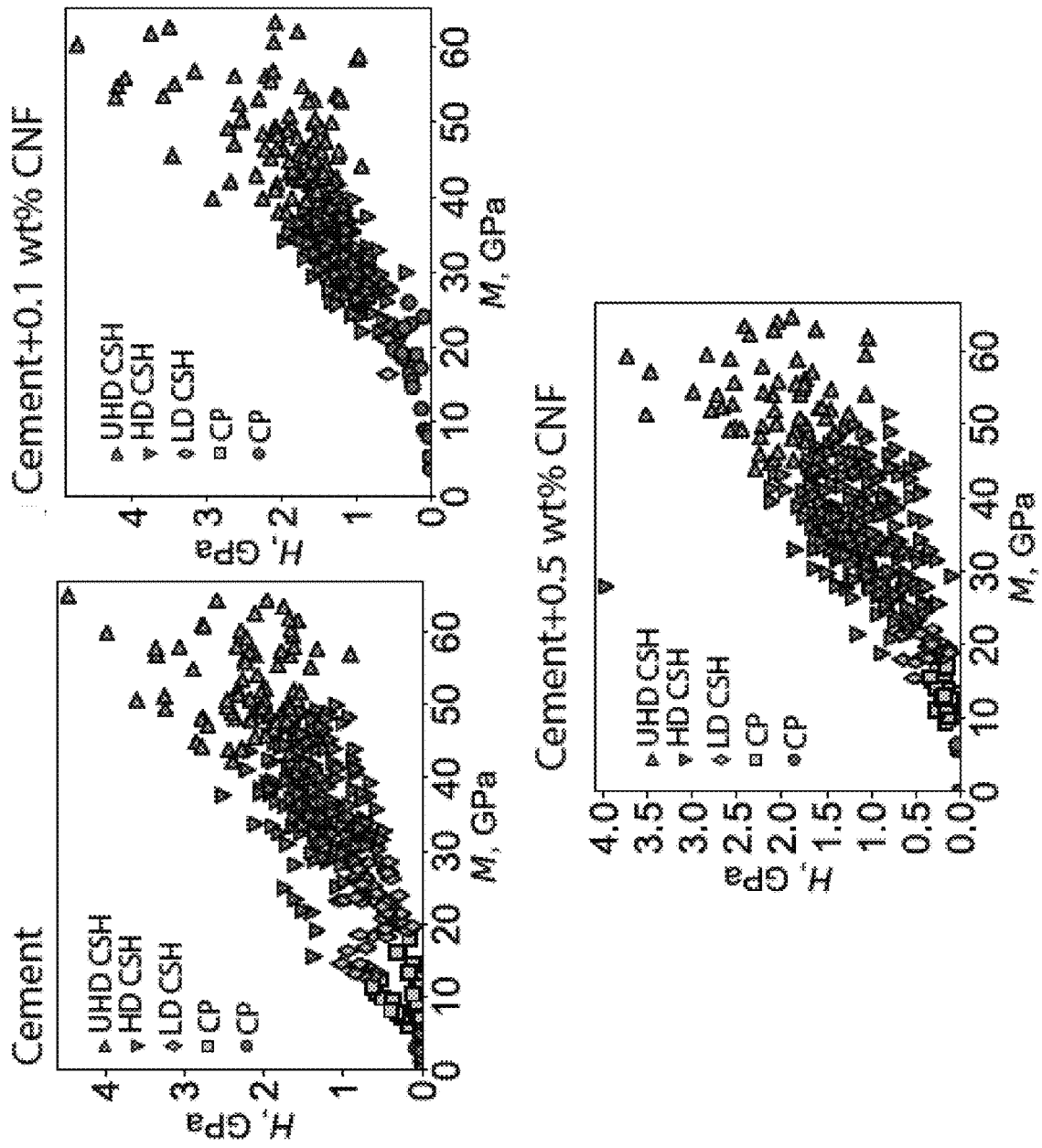

FIG. 19 shows statistical deconvolution of indentation data for plain cement and for CNF-modified cement composites. CP=capillary pores. LD CSH=low-density C—S—H. HD CSH=high-density C—S—H. UHD=ultra-high-density C—S—H. M is the indentation modulus and H is the indentation hardness. 400 indentation tests were conducted per specimen.

Figure 20:
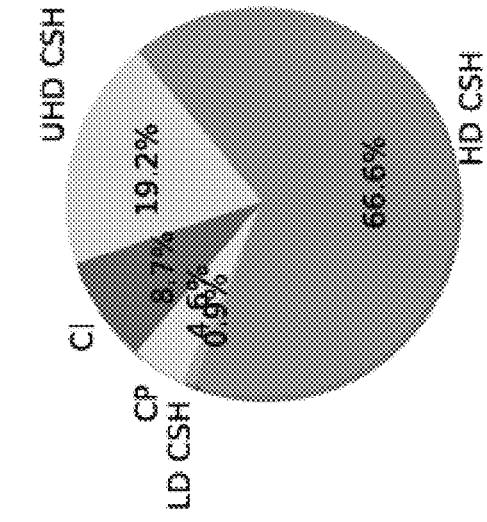
Figure 20:
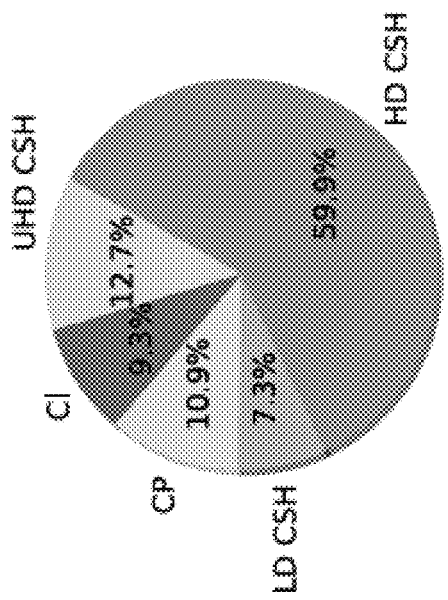
Figure 20:
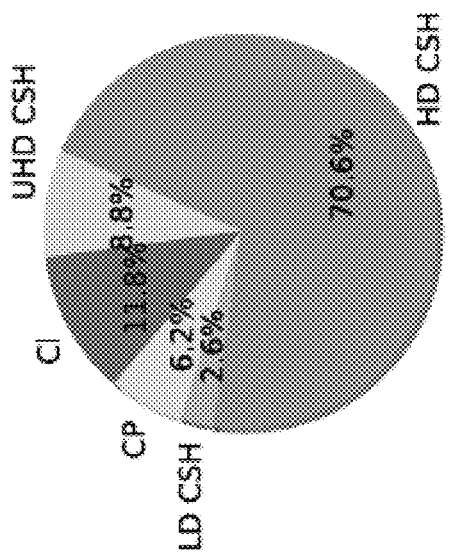

FIG. 20 shows phase distribution in both plain cement and CNF-modified cement composites. CP=capillary pores. LD CSH=low-density C—S—H. HD CSH=high-density C—S—H. UHD=ultra-high-density C—S—H. Cl=unhydrated clinker.

Figures 21A, 21B:
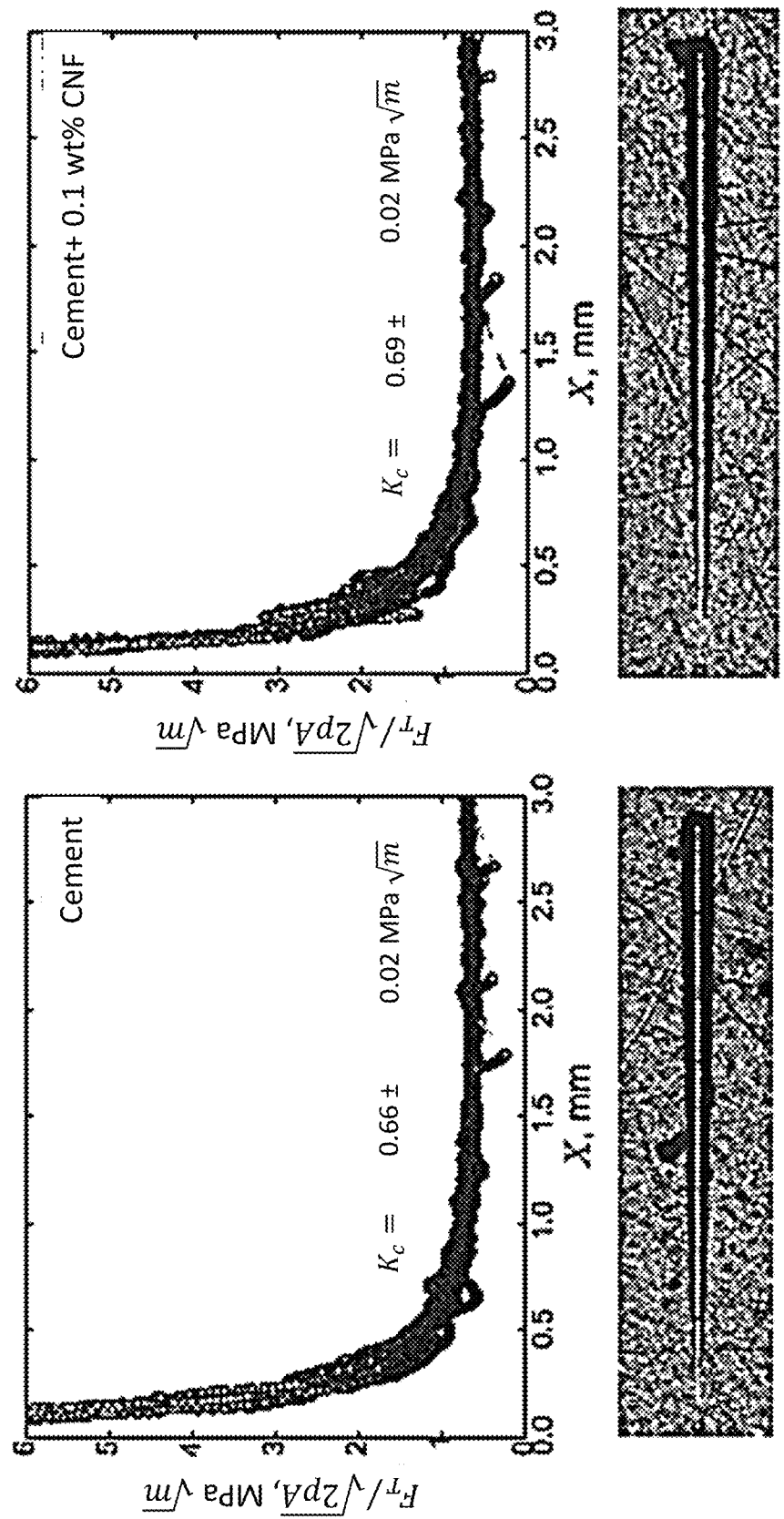
Figure 21C:
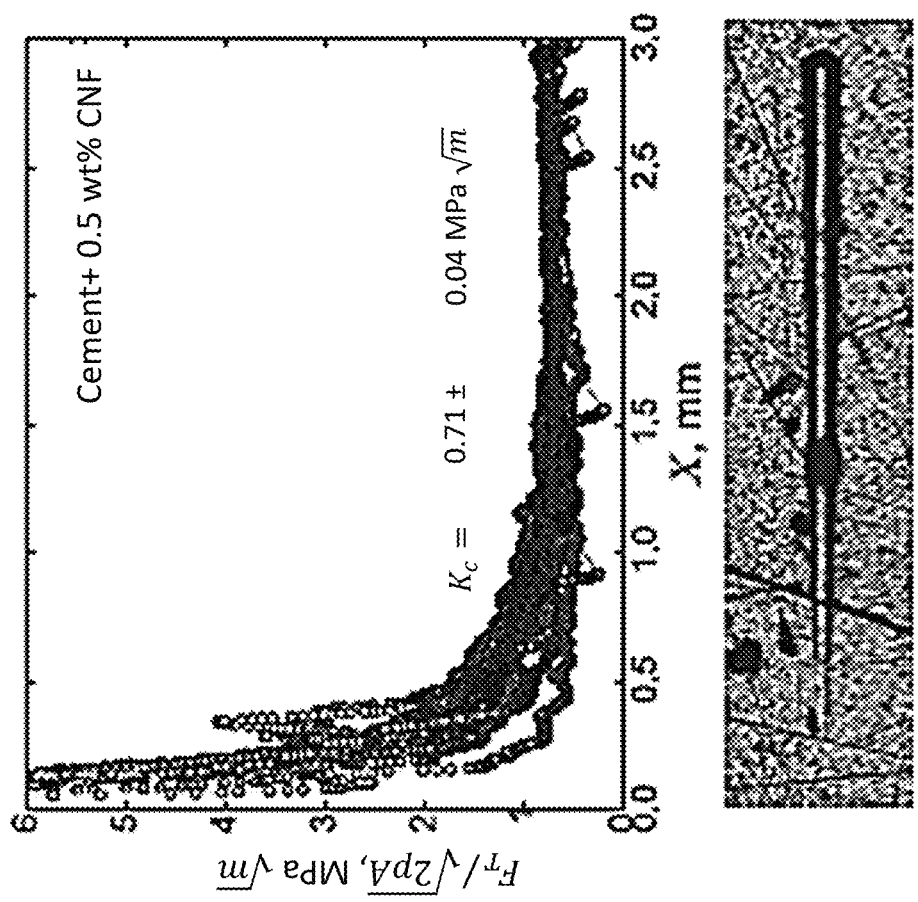

FIGS. 21A-21C show the fracture response of CNF cement composites. $F_T$ is the horizontal force, X is the scratch path, and 2pA is the scratch probe shape function. N=12 tests were performed per specimen.

FIGS. 22A-22D show the fracture micromechanisms of a 5 wt % CNF cement composite compared to plain Portland cement.

Figure 23:
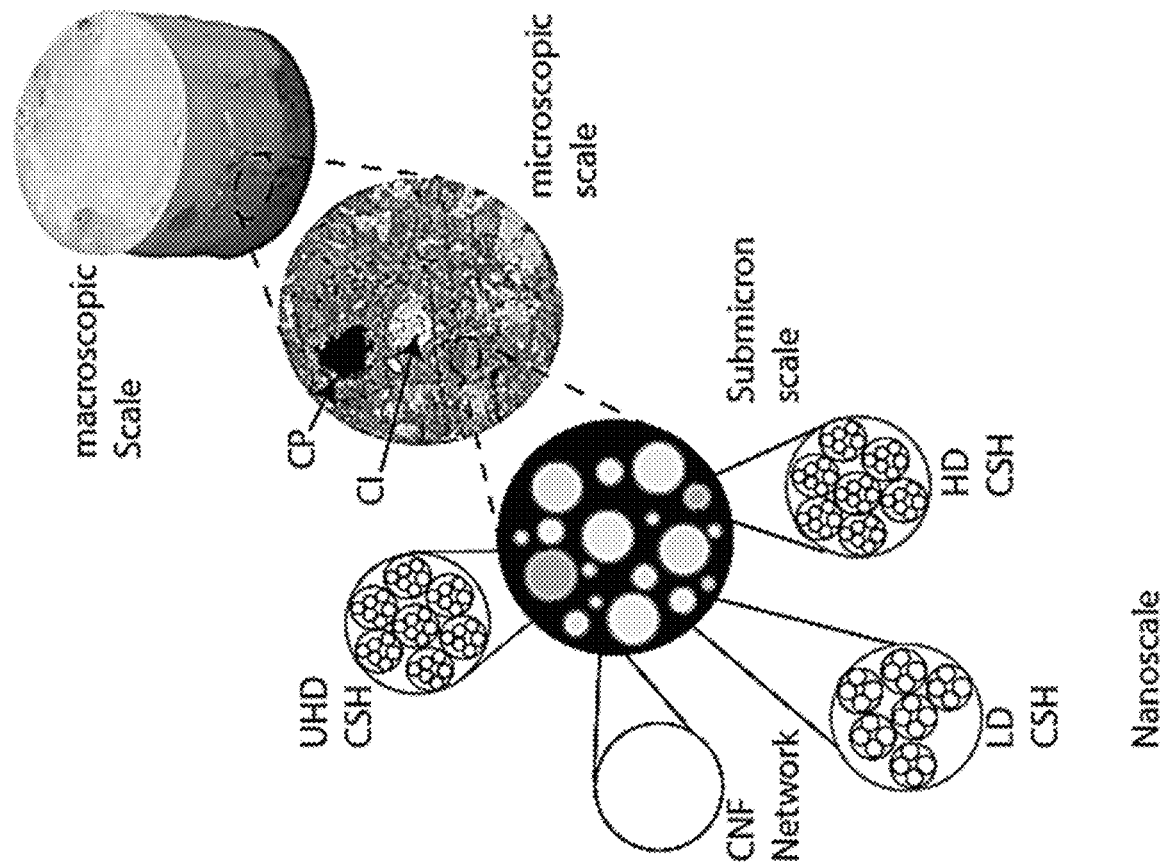

FIG. 23 shows a multiscale thought-model of a CNF-modified cement composite. CP=capillary pores. LD CSH=low-density C—S—H. HD CSH=high-density C—S—H. UHD=ultra-high-density C—S—H. Cl=unhydrated clinker.

Figure 24A:
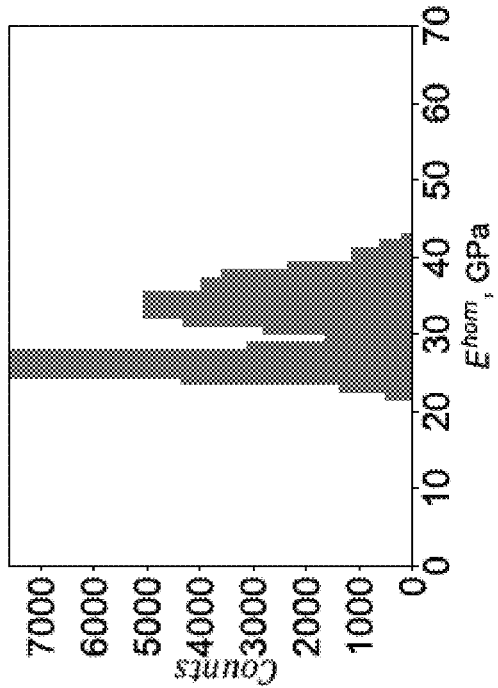
Figure 24B:
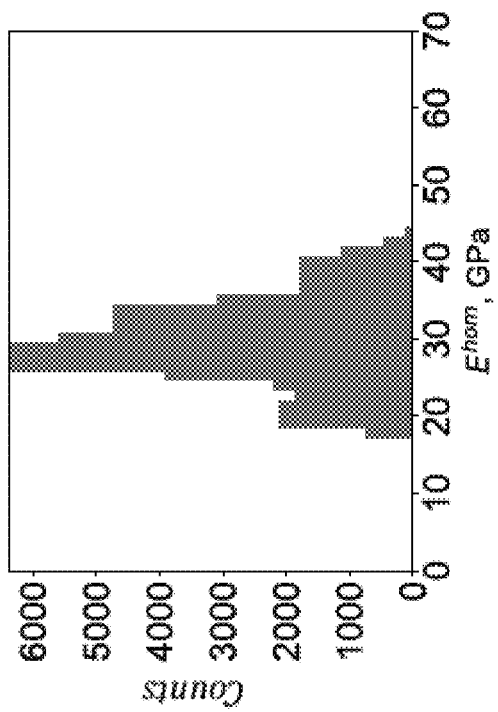
Figure 24C:
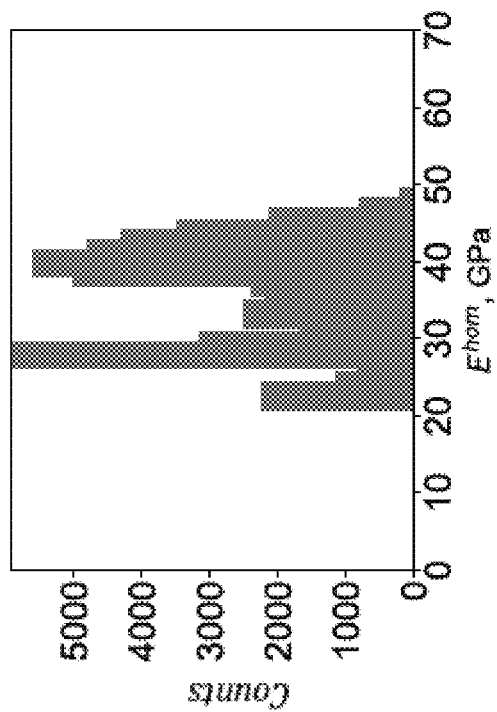

FIGS. 24A-24C show histograms of the predicted macroscopic Young's modulus, $E^{hom}$. FIG. 24A shows plain Portland cement. FIG. 24B shows cement+0.1 wt % CNF. FIG. 24C shows cement+0.5 wt % CNF. For each specimen, 50,625 numerical simulations were conducted.

Figure 25B:
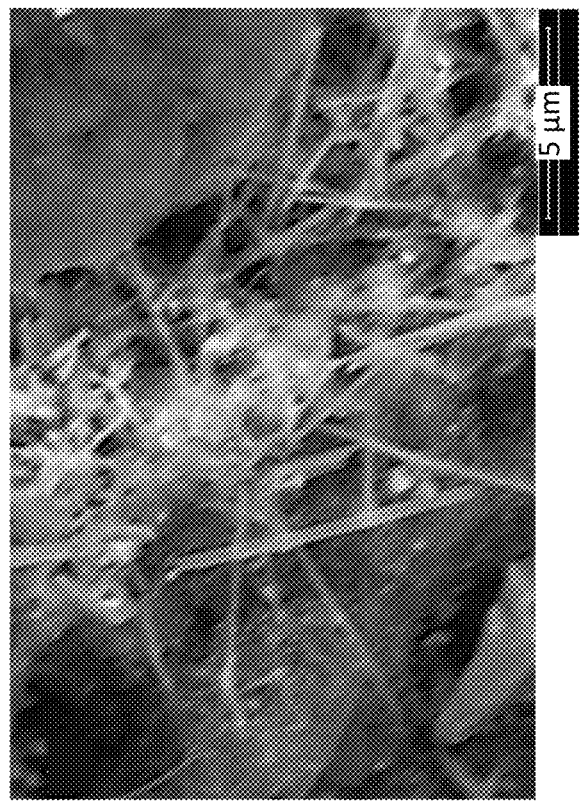
Figure 25A:
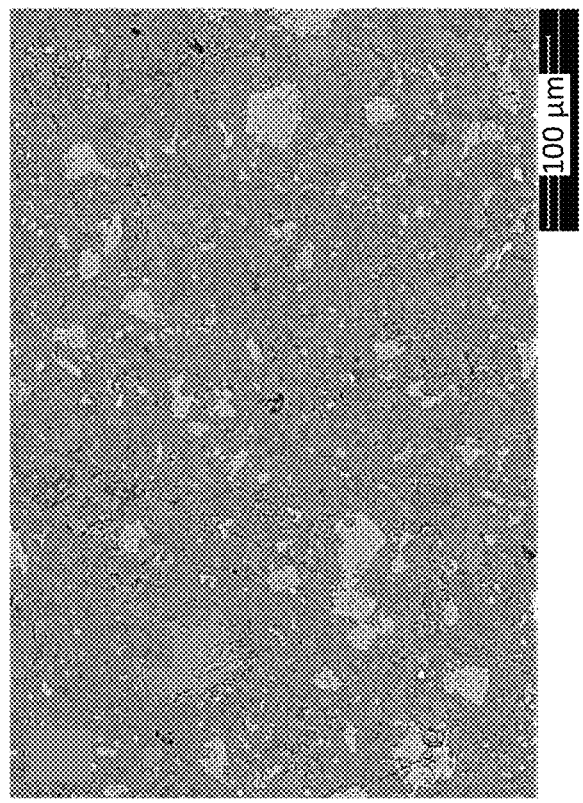

FIGS. 25A-25B show ESEM images of cement+1 wt % MWCNT at magnification levels of (FIG. 25A) ×500, and (FIG. 25B) ×10,000.

Figures 26A, 26B:
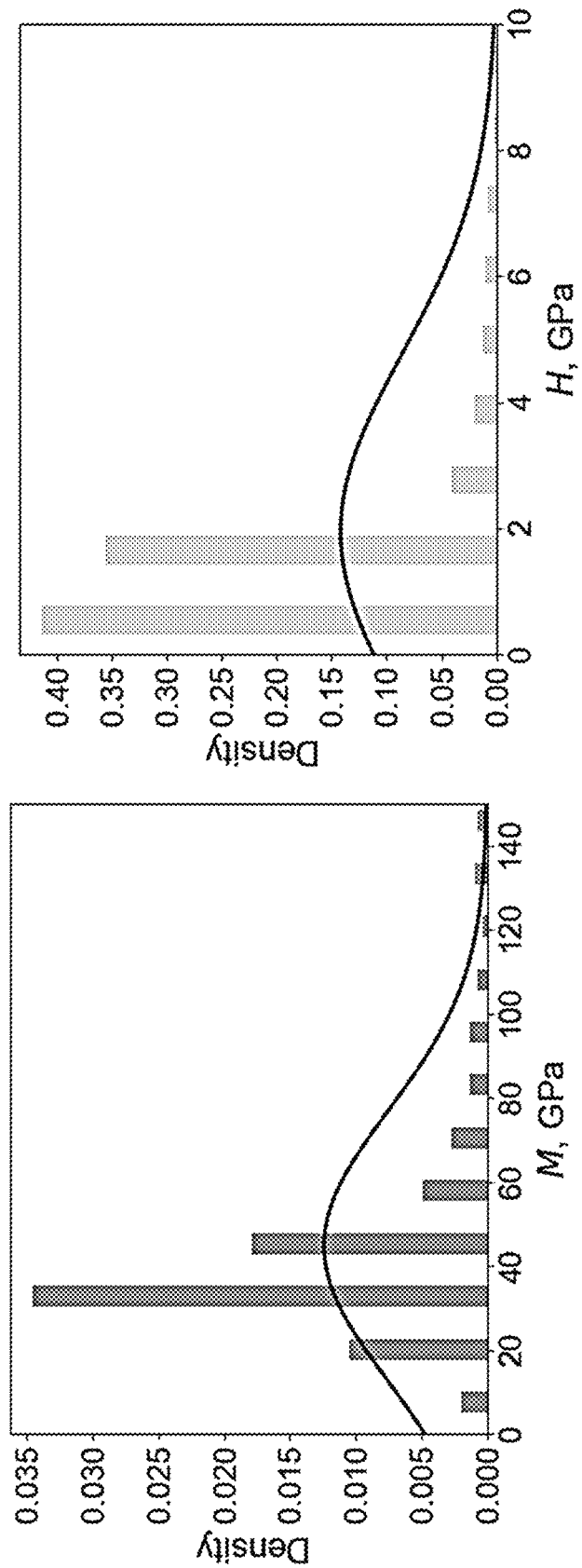

FIGS. 26A-26B show indentation tests on cement-1 wt % MWCNT.

Figure 27:
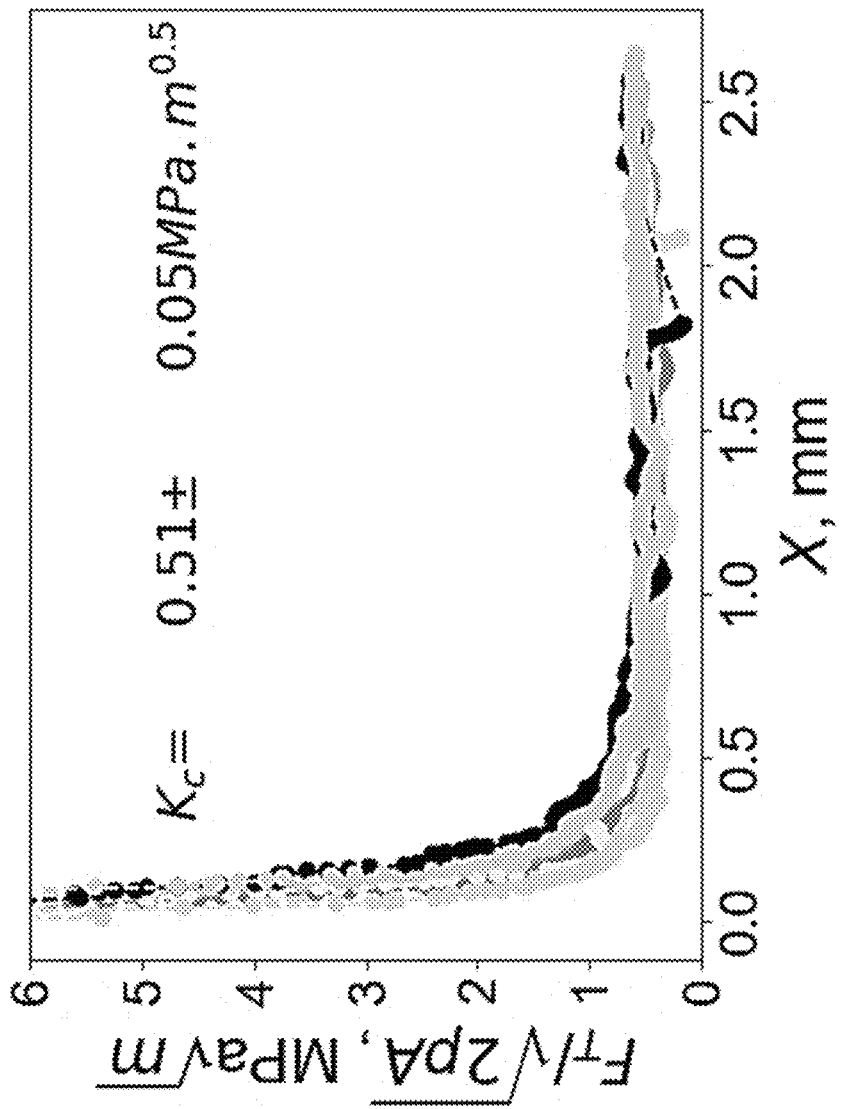

FIG. 27 shows scratch test results for cement-1 wt % MWCNT.

Figures 28A, 28B:
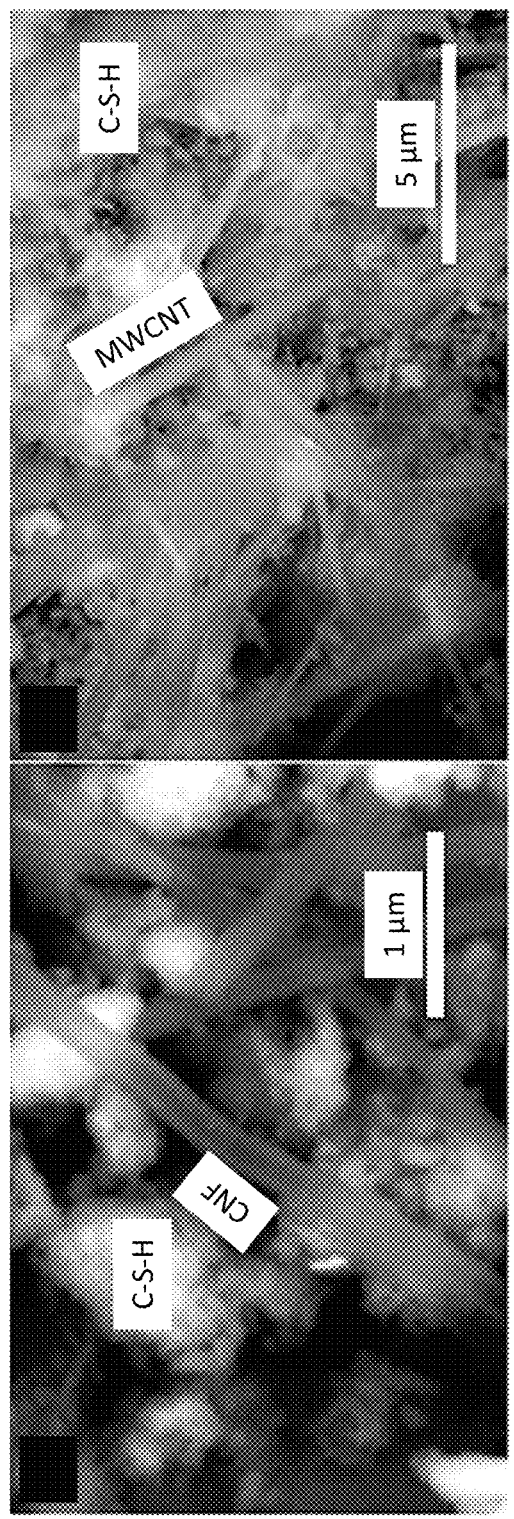

FIGS. 28A-28B show backscattered ESEM images of plain cement and cement nanocomposites. Except otherwise noted, all specimens were imaged after 7 days of hydration. FIG. 28A shows carbon nanofiber-reinforced cement, CNF-5. FIG. 28B shows MWCNT reinforced cement, MWCNT-5. C—S—H=calcium silicate hydrates. CNF=carbon nanofiber. MWCNT=multiwalled carbon nanotubes.

Figures 29A, 29B:
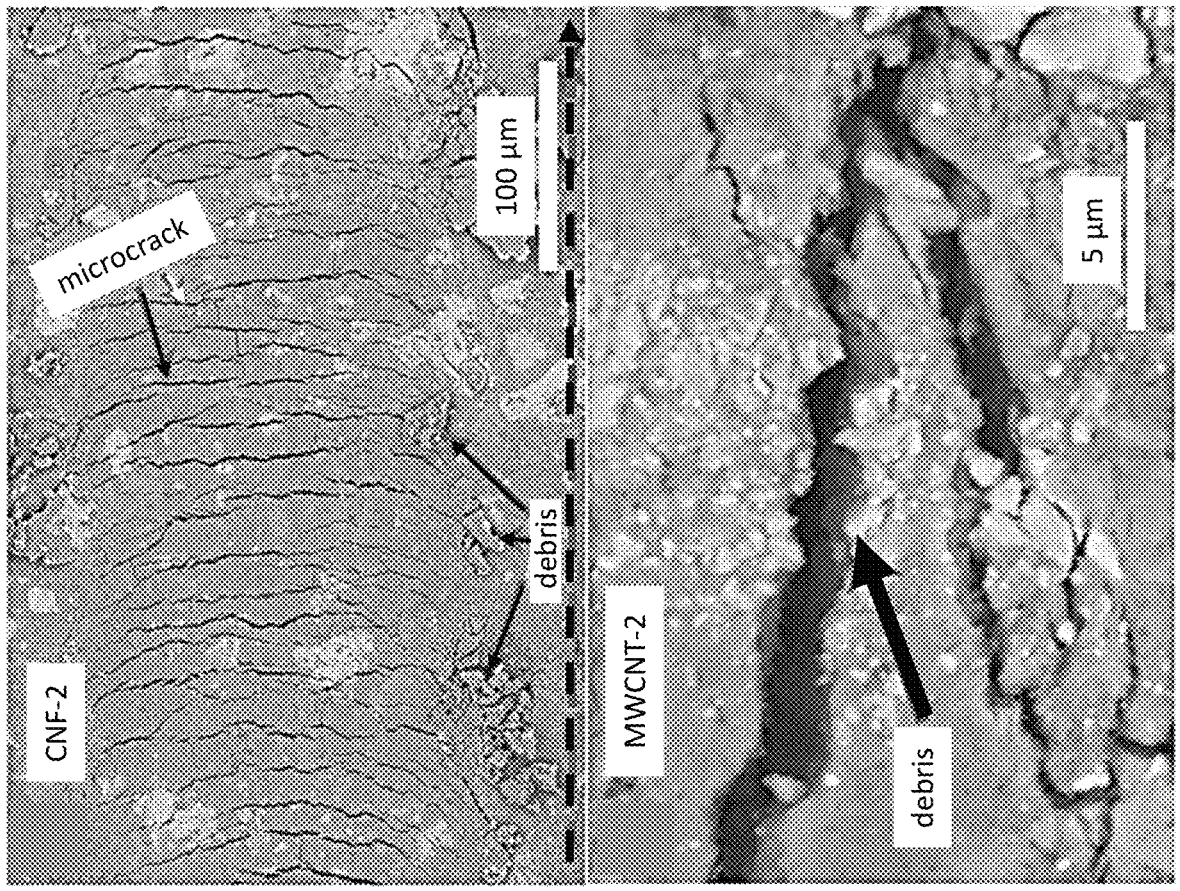

FIGS. 29A-29B show fracture mechanisms of cement composites. FIG. 29A shows carbon nanofiber-reinforced cement (CNF-2). The dotted arrow indicates the direction of the motion of the scratch probe. FIG. 29B shows MWCNT-reinforced cement (MWCNT-2).

Figures 30A, 30B:
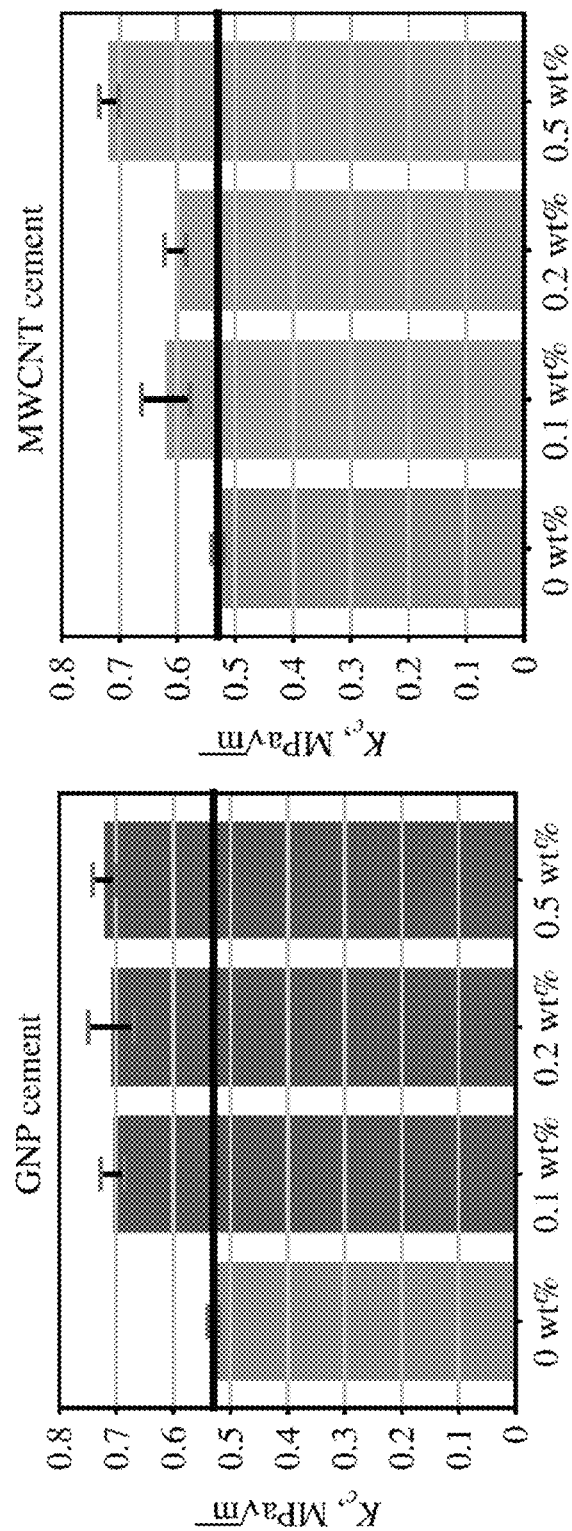

FIGS. 30A-30B show the influence of carbon-based nanomaterials on the fracture toughness of cement matrices. CNF=carbon nanofibers. MWCNT=multiwalled carbon nanotubes. The solid black line indicates the average fracture toughness of the reference Portland cement specimen.

Figure 31:
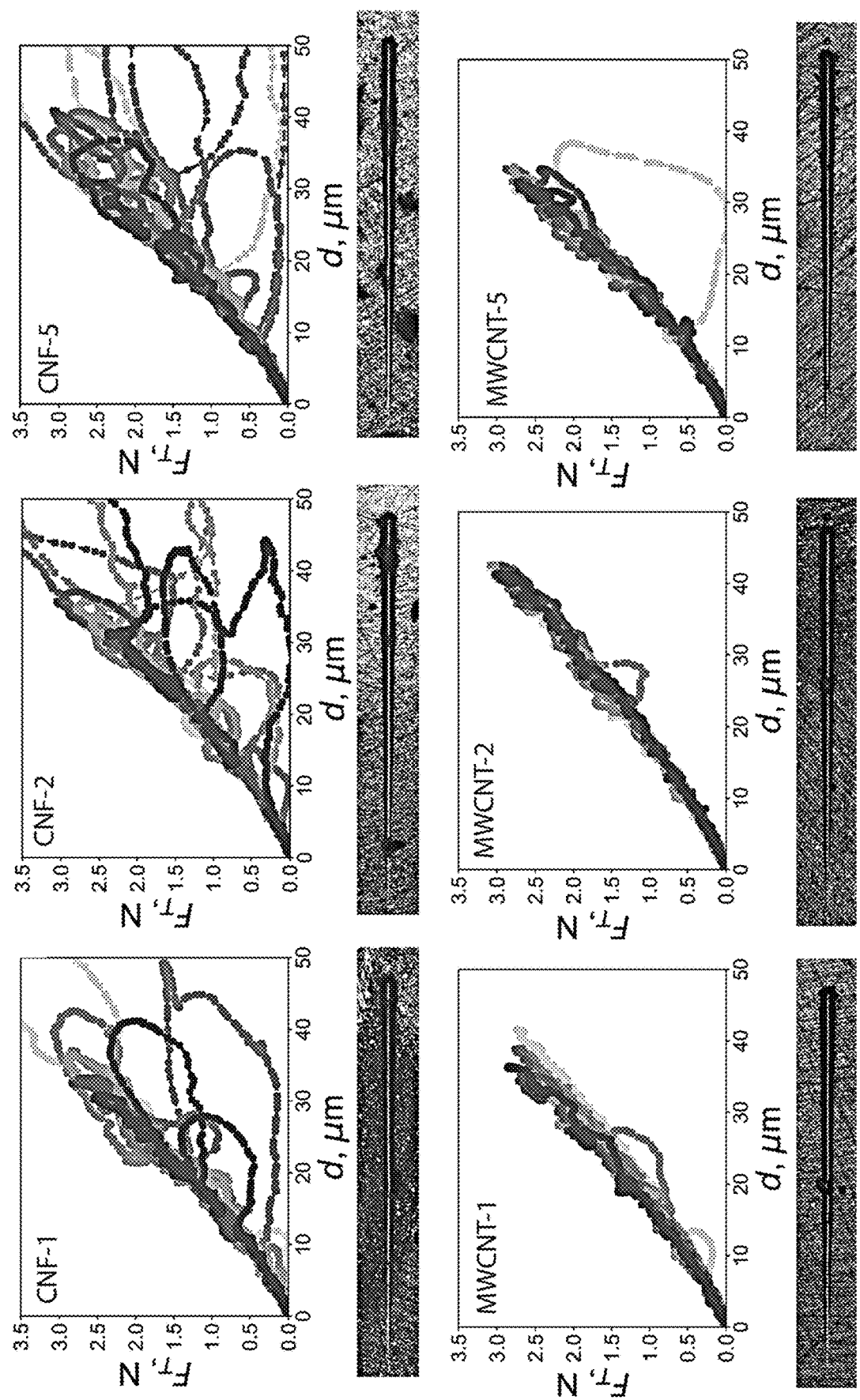

FIG. 31 shows load-depth curves for cement nanocomposites. $F_T$ is the horizontal force recorded during scratch testing, and d is the penetration depth. N=7 tests were conducted per specimen. Below each specimen, a representative optical microscopy image of the residual groove after scratch testing is shown.

Figure 32A:
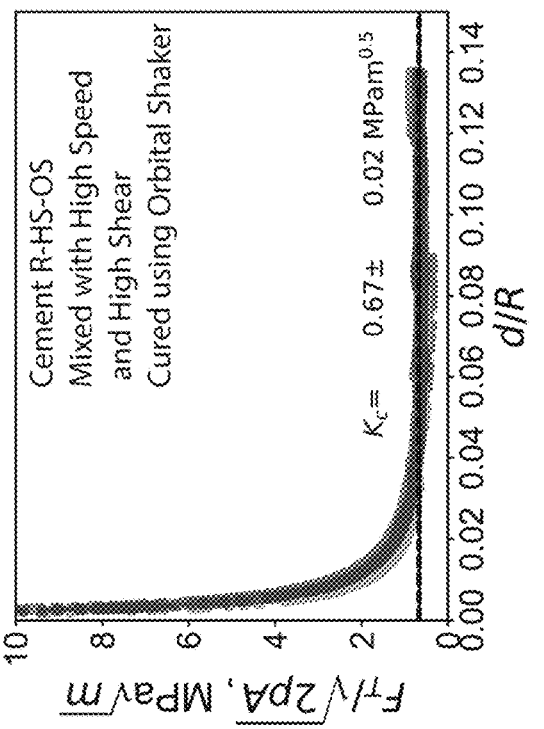
Figure 32C:
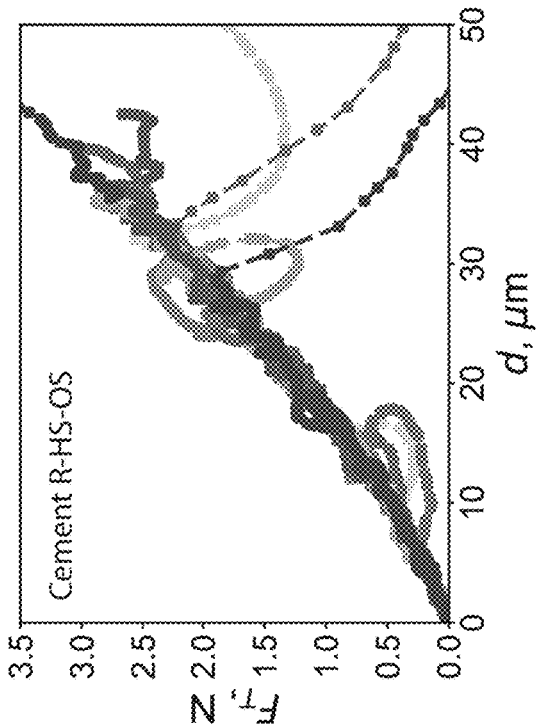
Figure 32B:
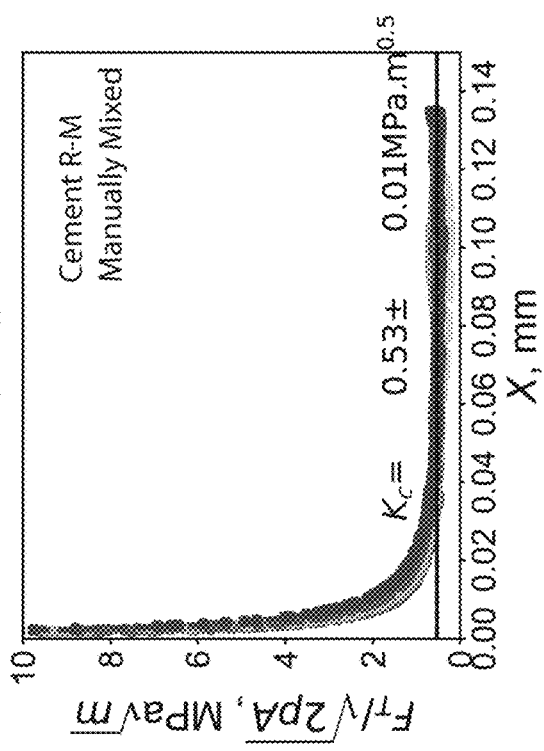
Figure 32D:
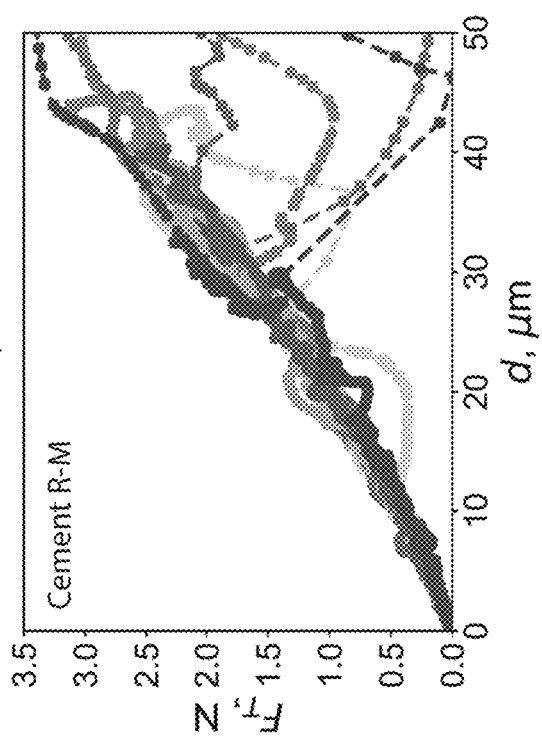

FIGS. 32A-32B show reference Cement R-M that was manually mixed: FIG. 32A shows fracture toughness scaling. FIG. 32B shows load-depth curve. FIGS. 32C-32D show reference cement R—HS—OS that was mixed using high shear and high speed and cured using on orbital shaker for the first 24 hours of curing age. FIG. 32C shows fracture toughness scaling. FIG. 32D shows the load-depth curves.

Figure 33A:
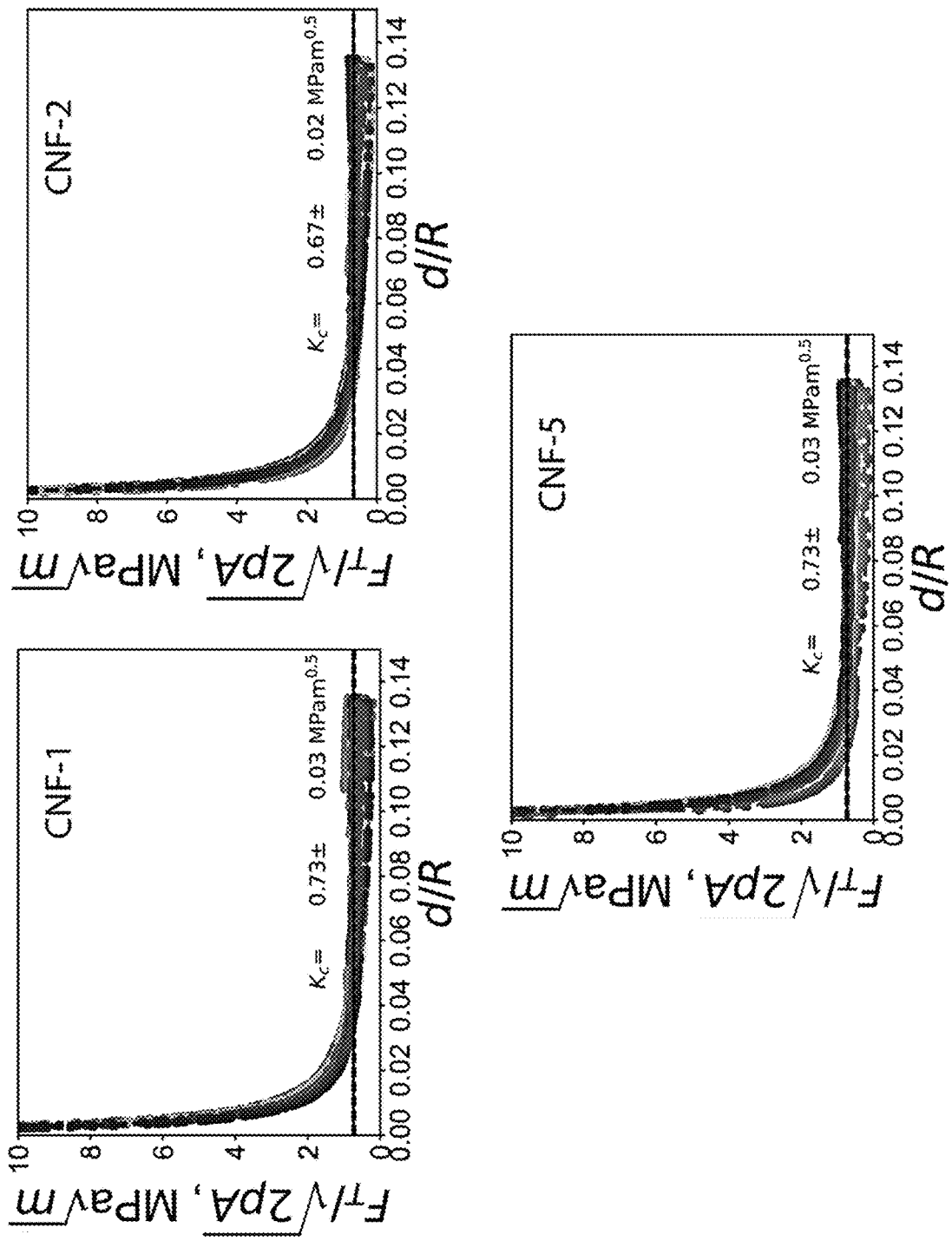
Figure 33B:
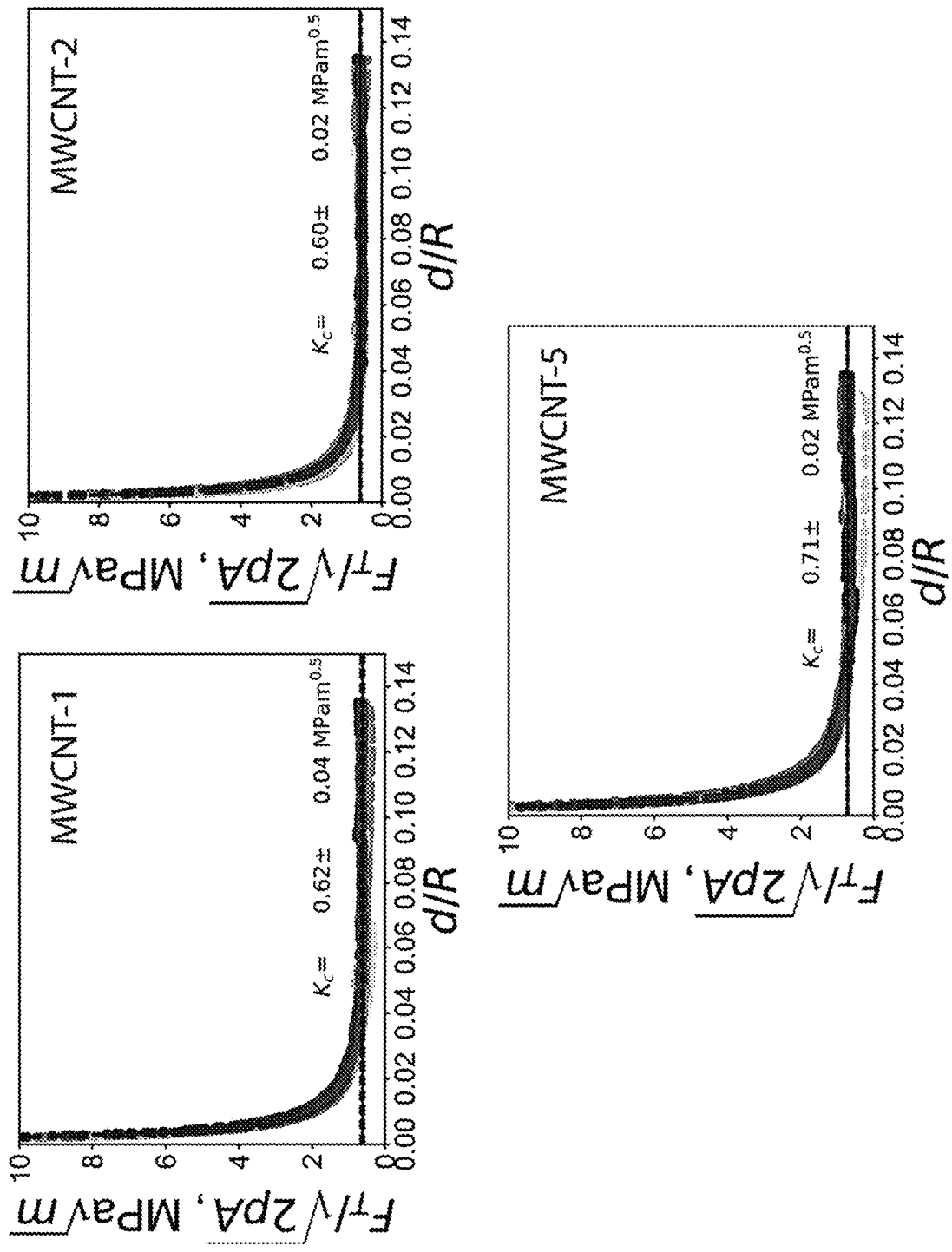

FIGS. 33A-33B show fracture scaling for cement nanocomposites. $F_T$ is the horizontal force recorded during scratch testing, and d is the penetration depth. R is the scratch probe tip radius and 2pA is the scratch probe shape area function.

DETAILED DESCRIPTION

Methods for the dispersion and synthesis of MWCNT-cement composites with high concentrations of MWCNTs that do not require MWCNT chemical dispersing aids, such as superplasticizers, or dispersion-enhancing chemical surface functionalization are provided. Also provided are MWCNT-cement composites made using the methods.

The MWCNTs are composed of multiple concentric cylindrical graphene tubes—that is, multiple concentric carbon nanotubes. They include at least two carbon nanotubes, but more typically six to 25, or even more. The MWCNTs typically have outer diameters of at least 3 nm and, more typically, 5 nm or greater, including diameters of up to 100 nm. By way of illustration, MWCNTs having diameters in the range from 5 nm to 50 nm can be used. The lengths of MWCNTs can vary over a wide range. For example, they can have lengths of 1 μm or longer, including 10 μm or longer (e.g., in the range from about 1 μm to 50 μm, including the range from 10 μm to 20 μm). However, MWCNTs with dimensions outside of the ranges recited here can be used.

Further provided are methods for the dispersion and synthesis of CNF-cement composites with high concentrations of CNFs that do not require CNF chemical dispersing aids, such as superplasticizers, or dispersion-enhancing chemical surface functionalization. Also provided are CNF-cement composites made using the methods.

The CNFs are cylindrical nanostructures composed of graphene layers constructed in the shape of cups, cones, or plates. CNFs typically have an average diameter in the range from 70 nm to 500 nm and an average length in the range from 50 μm to 200 μm. However, CNFs with dimensions outside of the ranges recited here can be used.

The cement composites have improved properties that may be attributed, at least in part, to the development of a multistep dispersion and mixing protocol that forgoes the use of chemical dispersants and dispersion-enhancing surface functionalities in favor of intensive mechanical dispersion. This protocol, which includes ultrasonic dispersion of the MWCNTs or CNFs, followed by extensive mechanical mixing at high speed and high shear, alters the distribution of hydration products and pore sizes in the cured cements relative to the distribution of hydration products and pores sizes in cured cements, including other MWCNT- or CNF-reinformed cements, made using other dispersion and mixing protocols.

In the cement composites, the mechanically dispersed MWCNTs and CNFs bridge air voids and reduce crack widths, thereby refining the pore size and strengthening the C—S—H matrix, as evidenced by increased Young's modulus and/or fracture toughness. In particular, the mechanically dispersed MWCNTs and CNFs promote an increase in high-density C—S—H, at the expense of low-density C—S—H, relative to MWCNT- and CNF-cement composites made using other methods. In addition to an increase in the concentration of high-density C—S—H, an increase in the concentration of other hydrations products, such as calcium hydroxide and/or ultra-high-density C—S—H may also be achieved. High density C—S—H is a hydrated cement phase composed of globules packed in a hexagonally-closed packed arrangement with a packing density of about 0.74 (e.g., 0.72-0.76). Low-density C—S—H is a hydrated cement phase composed of C—S—H packed loosely with a packing density of about 0.64 (e.g., 0.64-0.66). Ultra-high-density C—S—H is a hydrated cement phase composed of C—S—H packed loosely with a packing density of about 0.87 (e.g., 0.82-0.87). High-density C—S—H is characterized by smaller internal (gel) pores than low-density C—S—H. By way of illustration, the average gel pore size for a high-density C—S—H phase is typically less than about 3 nm (e.g., from 1.2 nm to about 2 nm), while the average gel pore size for low-density C—S—H is typically greater than about 5 nm (e.g., from about 5 nm to about 12 nm).

Gel pores are nano-scale pores that are internal to the C—S—H phases of the cured cement, while the space in the cured cement that is not filled by the solid products of hydration is the capillary pore space. Capillary pores are typically much larger than gel pores and may include microscale and mesoscales pores (e.g., pores having sizes of 100 nm or greater). The total porosity of the cured cement composite is the combined capillary porosity and gel porosity.

The bridging of the voids by the reinforcing MWCNTs and CNFs and the shift to cement hydration products having smaller gel pores and higher indentation hardness is accompanied by a drop in the capillary porosity and an accompanying increase in the gel porosity of the cured cement composites. Notably, the present MWCNT- and CNF-cement composites may have a higher gel porosity than their non-reinforced counterpart cements, although the overall porosity of the MWCNT- and CNF-cement composites is lower than their non-reinforced counterparts. Within some embodiments of the MWCNT- and CNF-reinforced composites, more than half of the porosity can exist as small gel pores having a pore size of 2 nm or smaller (e.g., 1.2-2 nm).

The changes in microstructure of the cement composites containing the mechanically dispersed MWCNTs or CNFs are accompanied by an increased Young's modulus and may also be accompanied by an increased fracture toughness, relative to non-reinforced cements or MWCNT- or CNF-reinforced cements made using other methods. In addition, the present reinforced cements may be characterized by one or more of the following properties: high electrical conductivity; high thermal conductivity; high ductility; and high compressive strength.

Although the inventors do not intend to be bound to any particular theory of the invention, the enhancements in the mechanical and transport properties of the cement composites caused by the mechanically dispersed MWCNTs and CNFs may be attributed to one or more of the following effects: (i) promotion of high-density C—S—H formation, (ii) promotion of calcium hydroxide formation and/or ultra-high-density C—S—H formation, (iii) the filling of microscopic air voids in the composite microstructure, (iv) reduction in capillary porosity, (v) increased fraction of small gel pores (for example, pores with sizes in the range from 1.2 to 2 nm), and/or (vi) the bridging of microcracks by MWCNTs and CNFs.

Potential applications of the cement composites described herein include: smart infrastructure materials; building materials with electrical sensors and smart technology; three-dimensional (3D) printing of construction materials, buildings, and structural elements; marine engineering; transportation, bridges, and roads; smart infrastructure materials for structural health monitoring; piezoresistive sensors for structural health monitoring; smart sensors for structural health monitoring; strain-sensing and damage-sensing construction materials; and construction materials for electromagnetic interference shielding applications.

Methods of Making MWCNT-Cement Composites and CNF-Cement Composites

In an initial step of the dispersion and mixing protocol, MWCNTs or CNFs are dispersed in water using ultrasonic energy prior to being mixed with cement powder. The amount of water that is used in the dispersion corresponds to the amount of water to be used in the MWCNT-cement mixture or in the CNF-cement mixture. The water is preferably, but not necessarily, deionized. No dispersion-enhancing chemical surface functionalization, chemical dispersing aids, such as superplasticizers or other surfactants, or other chemical additives are needed. As used herein, a chemical dispersing aid refers to a chemical that enhances the degree of dispersion of the MWCNTs or CNFs in water, relative to the degree of dispersion of the MWCNTs or CNFs in water in the absence of the chemical. Similarly, dispersion-enhancing chemical surface functionalization refers to surface functional groups that are covalently or non-covalently bonded to the MWCNTs or the CNFs and that enhance the degree of dispersion of the MWCNTs or CNFs in water, relative to the degree of dispersion of the MWCNTs or CNFs in water in the absence of the surface functional groups.

The ultrasonic dispersion energy, which can be provided by an ultrasonic horn, is proportional to the concentration level of the MWCNTs or the CNFs. For the MWCNTs, the ultrasonic dispersion energy may be, for example, in the range from 1.5 to 2.0 kJ per gram of carbon nanotubes per mL of water. This includes ultrasonic dispersion energies in the range from 1.7 to 2.0 kJ per gram of carbon nanotubes per mL of water. For the CNFs, the ultrasonic dispersion energy may be, for example, in the range from 0.75 to 1.0 kJ per gram of CNFs per mL of water. This includes ultrasonic dispersion energies in the range from 0.85 to 1.0 kJ per gram of CNFs per mL of water.

In order to gain best sonics performance, a half inch diameter sonic probe is desirably centered under the container containing the MWCNT dispersion or the CNF dispersion. Because high dispersion energies may produce high thermal energies and increase the temperature of the dispersion, which leads to water evaporation, an ice bath can be used to decrease the temperature. In addition, in order to reduce heating, the dispersion energy can be pulsed or delivered in a repeating cycle loop.

The aqueous dispersion of MWCNTs or CNFs is then added to raw cement powder in a mixing container, and the resulting cement paste can be mixed with a high speed, high shear mixer to provide additional mechanical dispersion, deagglomeration, and uniform mixing. The cement is a binder made from silicates and aluminates. Portland cement is a cement composed of a mixture of lime (calcium oxide), silica ($SiO_2$), alumina ($Al_2O_3$), iron oxide ($Fe_2O_3$) and gypsum ($CaSO_4$). High-speed, high-shear mixing may be carried out using a propeller stirrer at a speed of 400 rpm or higher for a time of 2 minutes or longer for the MWCNT-cement composites or at a speed of 800 rpm or higher for a time of 2 minutes or longer for the CNF-cement composites.

The cement paste can then be allowed to cure. During curing, the cement undergoes hydration reactions, which are initiated by the addition of the aqueous dispersion. These hydration reactions produce various phases in the cured cement, including low-density C—S—H, high-density C—S—H, ultra-high-density C—S—H, and calcium hydroxide. Curing may take place during a molding process, whereby the freshly made cement paste is cast and molded by pouring the MWCNT-cement paste or the CNF-cement paste into a mold. A lubricant, such as palm oil, may be used to lubricate the mold and a moisture barrier, such as plastic wrap, may be used to seal the mold to prevent moisture from escaping during curing. During curing, the mixture continues to be stirred to remove microscopic air bubbles and further mechanically disperse the MWCNTs or CNFs. This can be accomplished using, for example, the centrifugal force provided by an orbital shaker. This mixing and curing step is carried out for a substantial duration, typically 24 hours or longer. After curing, the resulting MWCNT-cement composite or CNF-cement composite is sufficiently hardened to be demolded. The demolded composite may then be placed in water (preferably deionized) in a sealed container for further curing.

Generally, the MWCNT or CNF dispersion will contain sufficient water to achieve adequate hydration of the cement without the need to add additional water during curing. For example, the water content of the MWCNT dispersion or the CNF dispersion that is added to a given quantity of cement powder can be selected to provide a cement paste having a water to cement ratio (w/c) of at least about 0.3 grams of water per gram of cement. This includes embodiments of the cement pastes that have a w/c in the range from about 0.3 to about 0.5, including the range from about 0.4 to 0.5, and further including the range from about 0.42 to about 0.46. During curing, the cement paste should be maintained at a temperature that allows for the hydration to occur. For the pastes described herein, suitable curing temperatures include temperatures in the range from about 20° C. to about 40° C., including temperatures in the range from 22° C. to 24° C. (e.g., room temperature (23° C.)), and suitable curing times include period of 24 hours up to 28 days. However, temperatures and times outside of these ranges can be used, and full curing of the cement need not occur in the recited time period.

Notably, the MWCNT dispersions, the CNF dispersions, the MWCNT-cement pastes, the CNF-cement pastes, and the composites made therefrom do not require the MWCNTs or the CNFs to be surface-functionalized and do not require the use of chemicals (e.g., chemical compounds and molecules) that enhance the dispersion of the MWCNTs or CNFs in water, relative to their dispersion in the absence of such agents. Thus, the dispersions and the pastes and composites can be free of surfactants, such as gum Arabic and sodium dodecyl sulfate; alcohols, such as isopropanol; superplasticizers; acids, such as sulfuric acid and/or nitric acid; organic ammonium chloride; polymers, such as styrene butadiene rubber copolymers; and/or fly ash, and the MWCNTs and CNFs themselves can be free of covalently and non-covalently bonded surface functionalities, such as carboxyl groups. In fact, the aqueous MWCNT dispersions may consist of only MWCNTs and water, and the MWCNT-cement pastes may consist of only MWCNTs, cement, and water. Similarly, the aqueous CNF dispersions may consist of only CNFs and water, and the CNF-cement pastes may consist of only CNFs, cement, and water.

Embodiments of MWCNT-Cement Composites

MWCNT-cement composites with improved Young's modulus (also referred to as elastic modulus), relative to cements without the MWCNTs or to MWCNT-cement composites made with other methods, can be made with high MWCNT concentrations. For example, various embodiments of the cement composites include: Portland cement; and MWCNTs, wherein the concentration of MWCNTs is in the range from 0.2 wt % to 1.0 wt %, including in the range from 0.2 wt % to 0.5 wt. %, based on the total weight of the Portland cement and the MWCNTs. Such composites can be made without the use of chemical dispersing aids and/or dispersion-enhancing chemical surface functionalization and can have the following characteristics: a gel porosity of 0.2 or lower (e.g., in the range from 0.15 to 0.20, including in the range from 0.16 to 0.19), and a capillary porosity of less than 0.1; a volume fraction of high-density C—S—H of at least 0.3, including at least 0.5; and a Young' modulus in the range from 18 GPa to 45 GPa. For example, high-density C—S—H volume fractions in the range from 0.3 to 0.7, including in the range from 0.3 to 0.6 can be achieved. Methods for measuring the Young's modulus for the cement composites are provided in the Examples.

Such high fractions of high-density C—S—H represent a substantial increase in the high-density C—S—H concentration relative to that of the corresponding unreinforced cement (i.e., plain cured Portland cement). By way of illustration, the volume fraction of high-density C—S—H can be increased by at least 200% for composites having a MWCNT concentration in the range from about 0.2 wt % to about 0.5 wt %. Methods that can be used to measure the volume fractions of the hydration products in the cement composites, including low-density C—S—H, high-density C—S—H, ultra-high-density C—S—H, and calcium hydroxides, are provided in the Examples.

Some embodiments of the MWCNT-cement composites made according to the methods described herein have a capillary porosity of 0.05 or lower (e.g., a capillary porosity in the range from about 0.02 to about 0.1) and a total porosity (capillary porosity+gel porosity) of 0.3 or lower, including a total porosity of 0.25 or lower (e.g., a total porosity in the range from 0.15 to 0.3). Methods for measuring the capillary porosity and gel porosity of a cement composite are provided in the Examples.

The MWCNT-cement composites include composites having a fracture toughness in the range from 0.70 MPa$\sqrt{m}$ to 0.80 MPa$\sqrt{m}$. This represents a substantial increase in the fracture toughness of the corresponding cement (e.g., plain cured Portland cement) in the absence of the MWCNT reinforcement. By way of illustration, the fracture toughness of the MWCNT-cement composites can be increased by at least 9% (e.g., increases in the range from about 9% to about 15%) for composites having a MWCNT concentration in the range from about 0.2 wt % to about 0.5 wt %, relative to the corresponding, unreinforced cement. Methods for measuring the fracture toughness for the cement composites are provided in the Examples.

Some embodiments of the MWCNT-cement composites having improved Young's modulus are characterized by a volume fraction of low-density C—S—H of 0.15 or less, including 0.10 or less, and/or a volume fraction of calcium hydroxide in the range from 0.25 to 0.40, including in the range from 0.25 to 0.35. For example, volume fractions of low-density C—S—H in the range from 0.01 to 0.15 can be achieved, including volume fractions in the range from 0.02 to 0.15, and in the range from 0.05 to 0.1

The MWCNTs and the Portland cement may be the only components present in the cement composites. However, it is also possible for other components to be present as minor components. Typically, if other components are present, they are not chemical dispersing aids or dispersion-enhancing chemical surface functionalities and they are present at concentrations of less than 5 wt %. For example, the MWCNT-cement composites can include small amounts of water condensed on the composites due to the humidity of the surrounding environment and/or small concentrations of impurities introduced with the starting products; such cement composites are characterized as "consisting essentially of" MWCNTs and Portland cement. Typically, if impurities are present, they are present at concentrations of less than 0.5 wt. % and more typically at concentrations of less than 0.1 wt. %.

In some of the embodiments of the MWCNT-cement composites, unhydrated clinker (i.e., raw cement powder grains) is present, along with the hydration phases described above, making up the balance of the composite.

Embodiments of CNF-Cement Composites

CNF-cement composites with improved Young's modulus, relative to that of the cements without the CNFs or CNF-cement composites made with other methods, can be made with high CNF concentrations. For example, various embodiments of the cement composites include: Portland cement; and CNFs, wherein the concentration of CNFs is in the range from 0.1 wt % to 0.5 wt %, including in the range from 0.2 wt % to 0.5 wt. %, based on the total weight of the Portland cement and the CNFs. Such composites can be made without the use of chemical dispersing aids and/or dispersion-enhancing chemical surface functionalization and can have the following characteristics: a gel porosity of 0.2 or lower (e.g., in the range from 0.16 to 0.20, including in the range from 0.16 to 0.19), and a capillary porosity of less than 0.1; a volume fraction of high-density C—S—H of at least 0.6, including at least 0.65; and a Young' modulus in the range from 30 GPa to 40 GPa. For example, high-density C—S—H volume fractions in the range from 0.65 to 0.75, including in the range from 0.66 to 0.72, can be achieved. Methods for measuring the Young's modulus for the cement composites are provided in the Examples. Methods that can be used to measure the volume fractions of the hydration products in the cement composites, including low-density C—S—H, high-density C—S—H, ultra-high-density C—S—H, and calcium hydroxides, are also provided in the Examples.

Some embodiments of the CNF-cement composites made according to the methods described herein have a total porosity (capillary porosity+gel porosity) of 0.3 or lower, including a total porosity of 0.25 or lower (e.g., a total porosity in the range from 0.20 to 0.3). Methods for measuring the capillary porosity and gel porosity of a cement composite are provided in the Examples.

The CNF-cement composites include composites having a fracture toughness in the range from 0.70 MPa$\sqrt{m}$ to 0.80 MPa$\sqrt{m}$. Methods for measuring the fracture toughness for the cement composites are provided in the Examples.

Some embodiments of the CNF-cement composites having improved Young's modulus are characterized by a volume fraction of low-density C—S—H of 0.05 or less, including 0.02 or less, and/or a volume fraction of ultra-high-density C—S—H in the range from 0.05 to 0.25, including in the range from 0.05 to 0.20. For example, volume fractions of low-density C—S—H in the range from 0.005 to 0.05 can be achieved, including volume fractions in the range from 0.005 to 0.03.

The CNFs and the Portland cement may be the only components present in the cement composites. However, it is also possible for other components to be present as minor components. Typically, if other components are present, they are not chemical dispersing aids or dispersion-enhancing chemical surface functionalities and they are present at concentrations of less than 5 wt %. For example, the CNFs-cement composites can include small amounts of water condensed on the composites due to the humidity of the surrounding environment and/or small concentrations of impurities introduced with the starting products; such cement composites are characterized as "consisting essentially of" CNFs and Portland cement. Typically, if impurities are present, they are present at concentrations of less than 0.5 wt. % and more typically at concentrations of less than 0.1 wt. %.

In some of the embodiments of the CNF-cement composites, clinker is present, along with the hydration phases described above, making up the balance of the composite.

Methods for measuring the values of quantifiable properties (e.g., Young's modulus, porosity, etc.) of cement composites are provided in the Examples below. Unless otherwise indicated, the recited values for quantifiable properties that are temperature and/or pressure dependent are for the values as measured at room temperature (23° C.) and/or atmospheric pressure.

EXAMPLES

Example 1: Composites of MWCNTs and Cement

This Example illustrates the effect of MWCNTs on the microstructure and on the distribution of hydration products in Portland cement.

Materials and Methods

Materials

Figure 1B:
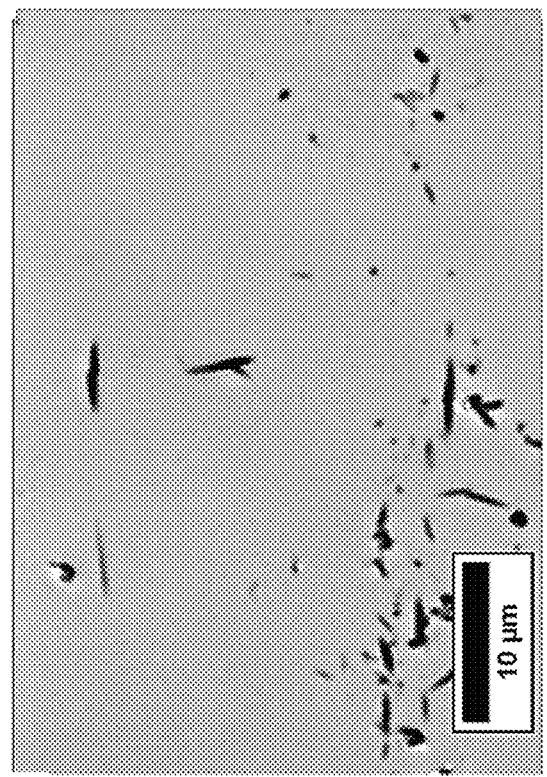
FIG. 1B shows microscopic images of MWCNTs after dispersion using an ultrasonic horn.
Figure 1A:
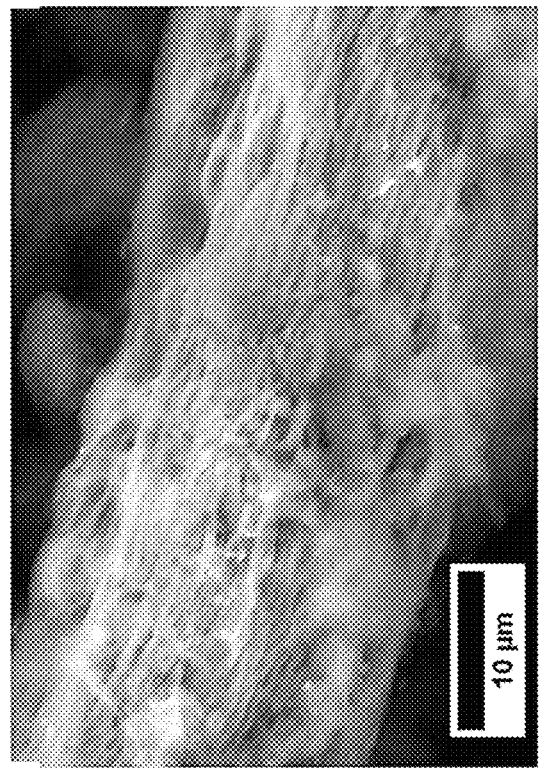
FIG. 1A shows a scanning electron microscopy (SEM) image of a bundle of MWCNTs before dispersion.

Cement composites reinforced with MWCNTs were synthesized at reinforcement levels of 0.0 wt %, 0.2 wt %, 0.5 wt %, and 1.0 wt %. Table 1 presents the detailed mix design. Type I Portland cement was used and the w/c ratio was 0.44 for all mix designs. The MWCNTs were provided by CheapTubes (Cheap Tubes Inc., Grafton, VT, USA) and were characterized by an outer diameter of <8 nm, an inside diameter of 2-5 nm, a length of 10-30 µm, and a specific surface area of 500 m$^2$/g. In addition, the bulk density of the MWCNTs was 0.27 g/cm$^3$ with a true density of 2.1 g/cm$^3$. FIG. 1A provides an SEM image of a bundle of MWCNTs in their initial state.

TABLE 1

| MWCNT, wt % | 0.0 | 0.2 | 0.5 | 1.0 |
|---|---|---|---|---|
| MWCNT, g | 0.00 | 0.14 | 0.35 | 0.69 |
| Portland Cement, g | 69.44 | 69.44 | 69.44 | 69.44 |
| Deionized Water (DIW), g | 30.56 | 30.56 | 30.56 | 30.56 |

The first step in the synthesis process was to disperse MWCNTs using ultrasonic energy in the presence of deionized water and absence of any chemical dispersing aid. Dispersing MWCNTs is challenging due to the presence of Van der Waals forces that promote carbon nanotube aggregation. Ultrasonic energy was provided by an ultrasonic horn VCX 750 with a dispersion energy of 1.87 kJ per gram of MWCNTs. Thus, energy levels of 8 kJ, 20 kJ, and 40 kJ were used to disperse MWCNTs for reinforcement levels of 0.2 wt %, 0.5 wt %, 1.0 wt % MWCNTs, respectively. The dispersion parameters for the various MWCNT dispersions are shown in Table 2.

TABLE 2

| Reinforcement Level | 0.0 wt % | 0.2 wt % | 0.5 wt % | 1.0 wt % |
|---|---|---|---|---|
| Deionized water | 30.56 g | 30.56 g | 30.56 g | 30.56 g |
| Carbon Nanotubes, X | 0.00 g | 0.14 g | 0.35 g | 0.69 g |
| Dispersion Energy | 0 kJ | 8 kJ | 20 kJ | 40 kJ |

An ice bath was implemented to reduce the heat produced by the concentrated ultrasonic energy. The MWCNTs in solution were weighted before and after dispersion and the amount of evaporated deionized water was replaced. FIG. 1B displays optical microscopy images of MWCNTs after dispersion with ultrasonic energy.

The next step was to mix the aqueous solution of dispersed MWCNTs suspension with Type I Portland Cement powder, using an IKA (IKA Works Inc., Wilmington, NC) overhead stirrer equipped with a four-bladed propeller stirrer at a speed of 400 rpm for 2 minutes. The resulting slurry was cast in 30-mm cylindrical sample molds sealed with polyethylene films. Curing took place in two steps: first the sealed molds were stored in an orbital shaker at a speed of 100 rpm for 24 hours at 22±2° C. Then, the cementitious samples were de-molded and soaked in sealed containers filled with deionized water for 6 days of curing at 22±2° C. Thus, after a total of 7 days of hydration, the cementitious samples were soaked in ethanol for another 24 hours to stop cement hydration.

Methods

Grinding and Polishing

In order to prepare specimens for nanoscale testing, such as scratch testing, grid nano-indentation testing, and environmental scanning electron microscopy, a rigorous grinding and polishing procedure was derived. The objective was to yield a flat and smooth surface with a low surface roughness. First, samples were embedded in low-viscosity epoxy resin. Embedded samples were cut into 5-mm thick slices and then mounted on 30-mm aluminum disks. For grinding, silicon carbide abrasive papers with 400, 600, and 1200 grit sizes were employed. For further polishing, soft woven polishing cloths were used, combined with a diamond paste with polycrystalline diamond particle sizes ranging from 3 µm down to 0.25 µm. Between each step, the specimens were rinsed in an inert oil-based solvent and cleaned using ultrasonic energy for 2 minutes to prevent cross-contamination.

Scratch Testing

Figure 2A:
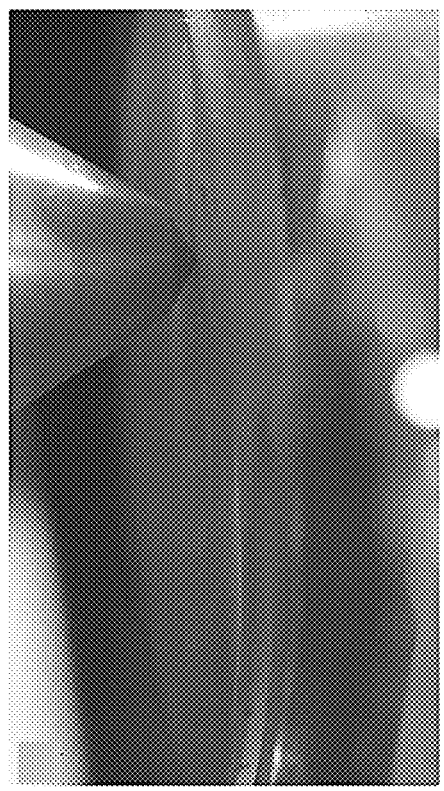
FIG. 2A shows a digital image of a scratch test on a composite material.
Figure 2B:
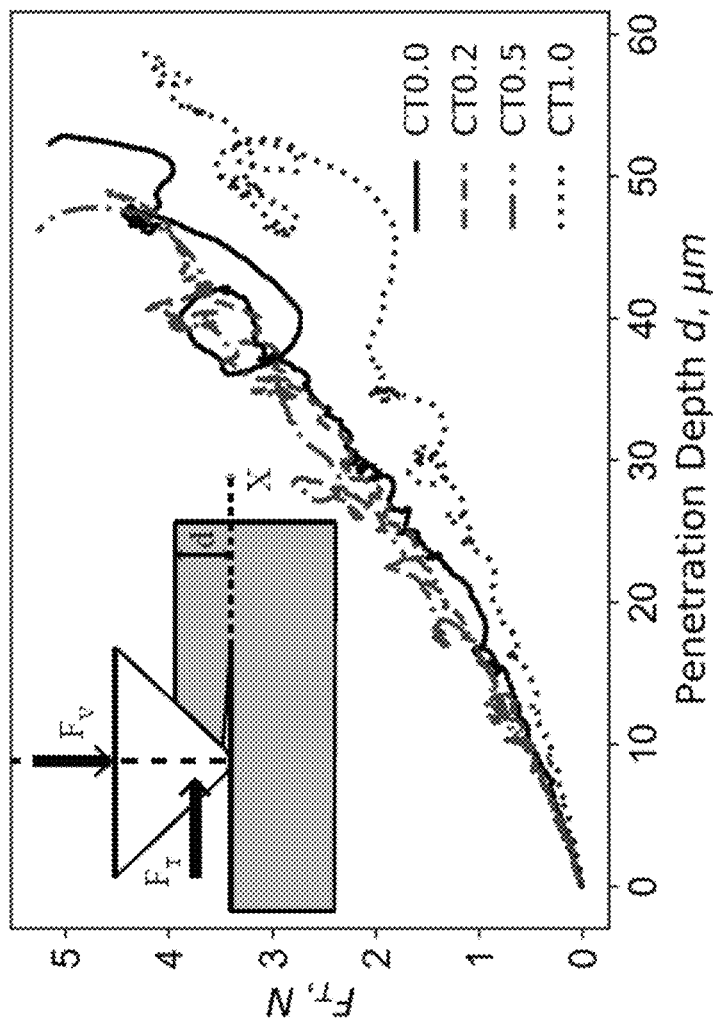
FIG. 2B show representative load-depth curves during scratch testing on MWCNT-cement composites: CT0.0=plain cement, CT0.2=cement+0.2 wt % MWCNT, CT0.5=cement+0.5 wt % MWCNT, and CT1.0=cement+1.0 wt % MWCNT; Scratch illustration: d is the penetration depth; FT is the horizontal force; FV is the vertical force; X indicates the scratch path.

Scratch tests were conducted to study the fracture behavior of MWCNT cement nano-composites at the microscopic level. FIG. 2A displays a digital image of the experimental set-up. In the tests, a vertical force $F_V$ was applied, from 0.03 N to 4.00 N, to push a Rockwell C diamond scratch probe into the sample at a linear loading rate of 7.94 N/min. Meanwhile, the resulting horizontal force $F_T$ and penetration depth d were measured using high-accuracy force and displacement transducers. The scratch length was 5 mm, and 8 scratch tests were conducted per specimen. FIG. 2B displays representative load-depth curves for all four MWCNT composites.

Grid Nano-Indentation Testing

Figures 3A, 3B:
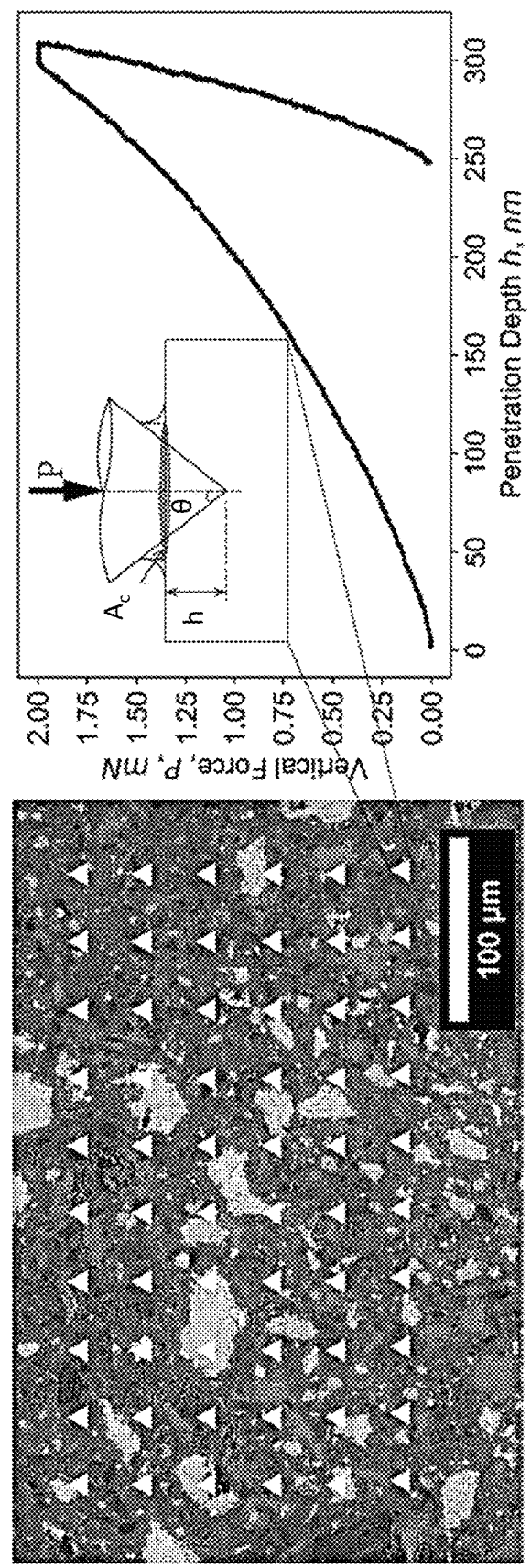
FIG. 3A shows a grid nano-indentation principle.
FIG. 3B shows a representative individual P–h indentation. Curve P is the applied vertical force. h is the penetration depth. $A_c$ is the contact area.

In order to capture the spatial distribution of chemomechanical phases, grid nano indentation tests were conducted. FIG. 3A illustrates the principle of grid nanoindentation testing. In all tests, a Berkovich diamond probe was used, which is pyramidal with an equivalent conical half-angle of θ=65.27°. For each specimen, a 21×21 grid nano-indentation was carried out with a spacing of 25 µm as shown in FIG. 3A, spanning a total area of approximately 500 µm×400 µm. Furthermore, a linear increasing load P with a maximum value of 2 mN was applied at a loading/unloading rate of 4.00 mN/min with a 10 s holding phase. A representative load-penetration depth curve is presented in FIG. 3B. For each test, the indentation hardness H and the indentation modulus M were calculated using the Oliver and Pharr's method: (W. C. Oliver, et al., J. Mater. Res. 7 (1992) 1564-1583; L. A. Galin, et al., North Carolina State College, 1961, (translated by H. Moss); I. N. Sneddon, International Journal of Engineering Science 3 (1965) 4557; L. Sorelli, et al., Cem. Concr. Res. 38 (2008) 14471456.)

$$H = \frac{P}{A_c}; M = \frac{\sqrt{\pi}}{2} \frac{s}{\sqrt{A_c}}; S = \frac{dP}{dh}\bigg|_{h=h_{max}} \quad (1)$$

S represents the unloading indentation stiffness. The contact area $A_c$ can be calculated from the maximum depth $h_{max}$. (Oliver, et al., 1992.) Prior to testing, the projected contact area function $A_c$ was calibrated using fused silica as a reference material.

Environmental Scanning Electron Microscopy

In order to characterize the micro-structure of cement composites reinforced with MWCNTs, ESEM was employed using an FEI Quanta 650 environmental scanning electron microscope. Due to the low conductivity of cement materials, a low vacuum mode with an accelerating voltage of 10.00 kV was selected. A circular back-scatter detector was selected with a working distance of 10 mm, a spot size of 3.5, and an aperture of 5. In addition, a digital image analysis routine was implemented to quantitatively identify the capillary porosity and other phases of cement composites at the microscopic scale, based on greyscale levels. To this end, the image local greyscale values were rescaled in a 0-1 range, and a histogram was displaced. Micropores and calcium hydroxide grains were identified based on image thresholding in an iterative fashion.

X-Ray Powder Diffraction and Fourier-Transform Infrared Spectroscopy

To characterize the chemical compositions and chemical groups of cement composites, XRD analysis and FTIR analysis were conducted. For XRD, bulk samples were milled with ethanol using a McCrone mill to create powder specimens. A uniform final fineness of less than 1 μm was achieved. The XRD tests were performed at the Jerome B. Cohen X-Ray Diffraction Facility using a Rigaku Ultima X-ray diffractometer. The tests were conducted at 40 keV of accessible energy and 30 mA of current with Bragg angle 2θ ranging from 10° to 60° with a step size of 0.02°. For FTIR tests, the Nicolet iS50 spectrometer (Thermo Nicolet) at the NUANCE Keck-II facility was utilized. Powder specimens were prepared using the same method as for XRD analysis. In addition, KBr pellets were prepared by pressing the mixture of powder and KBr with a weight ratio of powder sample to KBr of 1:100. Regular adsorption-transmission mode was used with a frequency range from 4000 to 400 $cm^{-1}$ at a resolution of 4 $cm^{-1}$, using an average of 64 scans.

Theory

Multi-Scale Model of Cement Reinforced with MWCNTs

Figure 4:
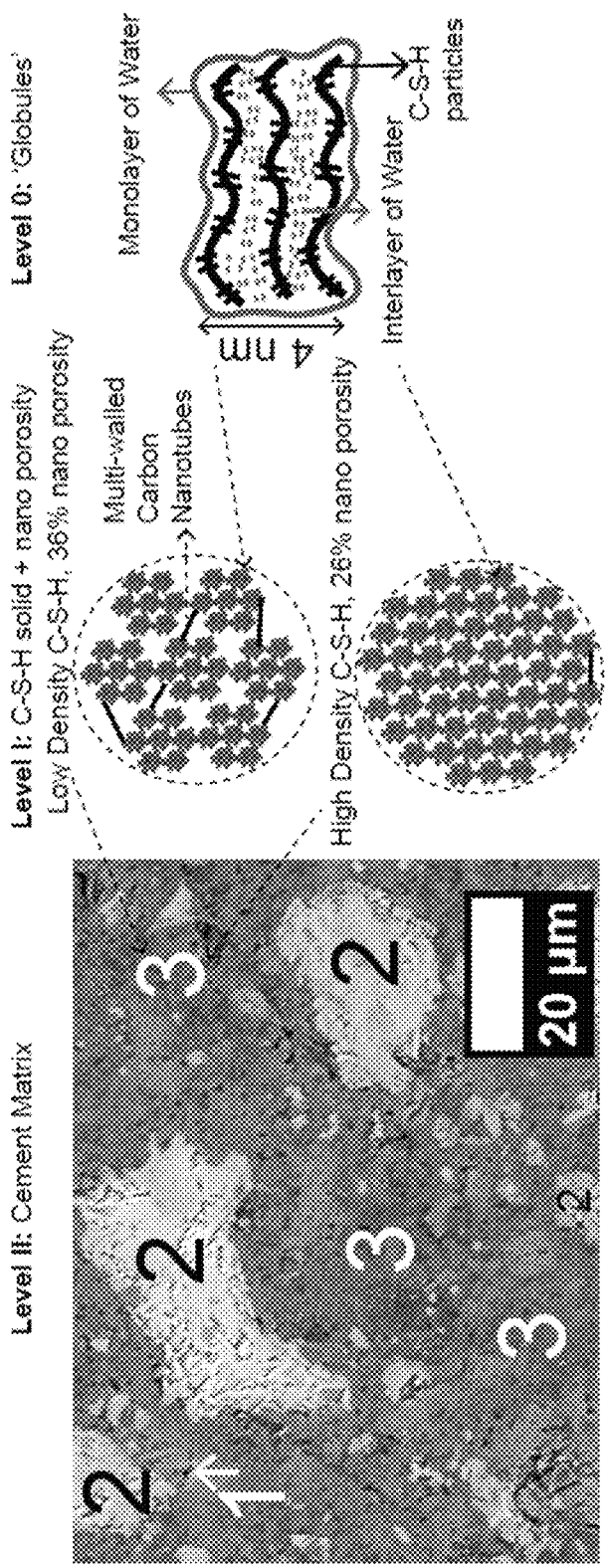
FIG. 4 shows a multi-scale model of cement composites reinforced with MWCNTs: Level II: Cement Matrix including capillary pores (1), calcium hydroxide (2), and calcium silicate hydrate (C—S—H) matrix (3), domains; Level I: C—S—H matrix including low-density C—S—H (up, low packing density), high-density C—S—H (down, high packing density), nanoporosity (white), and MWCNTs (black); Level 0: C—S—H 'Globules' including monolayer of water, interlayer of water, and C—S—H gel.
Figure 5A:
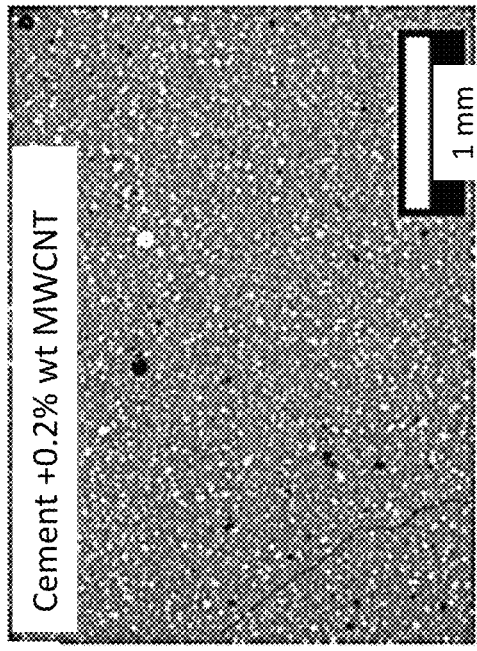
FIGS. 5A-5D show SEM images of (FIG. 5A) Cement.
Figure 5B:
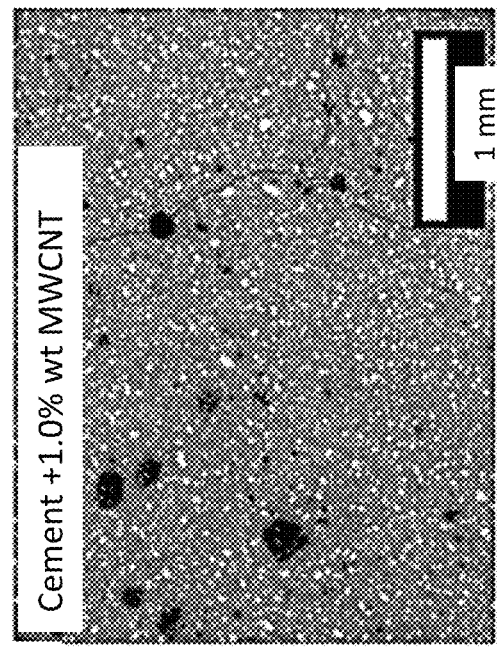
Figure 5C:
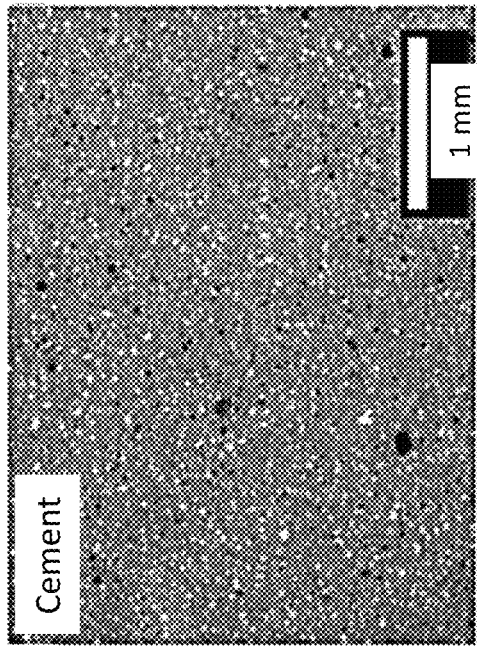
Figure 5D:
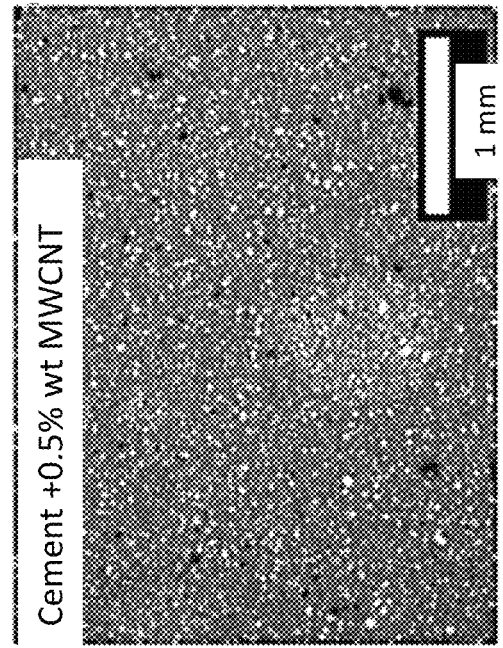

A multiscale model of MWCNT-modified cement paste was formulated with three levels: C—S—H globules, C—S—H Matrix, and Cement Matrix levels as shown in FIG. 4.

Without intending to be bound to any particular theory of the inventions described herein, the hypothesis was that MWCNTs will influence the microstructure at the C—S—H matrix level. Level 0 is the C—S—H Globules level. The globules are at the nanometer lengthscale and are composed of a monolayer of water, an interlayer of water, and C—S—H particles. The globules build up the structure of both low-density and high-density C—S—H. Level I is the C—S—H matrix with two types of C—S—H: low-density C—S—H with a packing density of 64%, and high-density C—S—H, with a higher packing density of 74%. It was postulated that MWCNTs will modify the structure of the C—S—H gel at the C—S—H matrix level by connecting C—S—H globule clusters, mainly at low-density C—S—H. Thus, MWCNTs act as connectors and bridges to help low-density C—S—H achieve a higher packing density. Finally, Level II is the Cement Matrix. There are three main phases in this level: capillary pores, calcium hydroxide, and primary C—S—H matrix.

Fracture Toughness Characterization and Scratch Testing

A nonlinear fracture mechanics model was used to calculate the fracture toughness $K_c$ using the horizontal force $F_T$ and penetration depth d measurements. In particular, the model relates FT to the scratch probe shape function 2pA according to: (A.-T. Akono, et al., Mat. Res. Soc., (2012), Vol. 27, pp. 485-493; A. T. Akono, et al., Wear. 313 (2014) 117124; A.-T. Akono, ASCE's Journal of Nanomechanics and Micromechanics, (2015).)

$$K_C = \frac{F_T}{\sqrt{2pA}} \quad (2)$$

Assuming a linear elastic isotropic response along with the presence of a semi-horizontal crack emanating from the tip of the scratch probe, the energy release rate was computed using the J integral as well as computational fracture mechanics. (Akono, et al., 2012; Akono, et al., 2014; Akono, 2015; A. T. Akono, et al., Phys. Rev. Lett. 106 (2011) 25.) The shape function of the probe 2pA depends on both the penetration depth and on the geometry of the scratch probe. For a spherical probe, 2pA is a quadratic function of the penetration depth. The scratch probe shape function was calibrated prior to testing using a reference material as described in Akono, et al., 2014.

Statistical Deconvolution Analysis

To characterize various phases in cement nano-composites and investigate the effect of MWCNTs on phase volume fraction, statistical deconvolution was implemented. This is an important method to link micro-scale and nano-scale, analyze the results from nano-indentation, and quantify the pore structure in cement composites.

Statistical deconvolution is a method commonly applied to decompose the overall response as a weighted contribution of individual phases. For each sample, the grid nanoindentation technique yielded a distribution of N=441 tests. For each single test i, the indentation hardness $H_i$ and modulus $M_i$ were calculated. Thus, for each sample, the entire data-set was analyzed using the statistical deconvolution was $X_i = (M_i, H_i)_{1 \le i \le N=441}$.

By setting n as the number of material phases in the composite, each phase j was characterized by five mechanical parameters. The five parameters consist of the volume fraction $f_j$, the mean elastic modulus $\mu_j^M$, the mean hardness $\mu_j^H$, the standard deviation of the elastic modulus $s_j^X$, and the standard deviation of the hardness $s_j^H$. The theoretical cumulative distribution function $F(X_i, \mu_j^X, s_j^X)$ of a Gaussian-distributed is given by Eq. (3):

$$F_X(X_i) = \frac{i}{N} - \frac{1}{2N}; X = (M, H); i \in [1, N] i \in [1, N] \quad (3)$$

where X=(M, H), $s_j^X = (s_j^M, s_j^H)$ and $\mu_j^X = (\mu_j^M, \mu_j^H)$. Thus, there were 5×n unknowns $f_j, \mu_j^M, \mu_j^H, s_j^M, s_j^H$ with j belongs to [1, n]. Meanwhile, the theoretical value of the cumulative distribution functions $F_X(X_i)$ is given by:

$$F(X_i, \mu_j^X, s_j^X) = \frac{1}{|s_j^X|\sqrt{2\pi}} \int_{-\infty}^{x_i} \exp\left(-\frac{(u-\mu_j^X)^2}{2|s_j^X|^2}\right) du \quad (4)$$

The 5n unknowns were determined by minimizing and optimizing the squared sum difference between the experimental cumulative distribution functions $F_X(X_i)$ and the theoretical cumulative distribution function $F(X_i, \mu_j^X, s_j^X)$, as shown in Eq. (5):

$$\min \sum_{i=1}^{N} \sum_{X=(M,H)} \left[ \sum_{j=1}^{n} n f_i F(X_i, \mu_j^X, s_j^X) - F_X(X_i) \right]^2 \quad (5)$$

Eq. (5) was solved by using a nonlinear constrained optimization solver in the programming language Python. In addition, two constraints were imposed. The first one is a physical constraint that the sum of the surface fractions of each phase should be equal to unity $\Sigma_{j=1}^{n} f_i = 1$. Moreover, in order to avoid overlapping of neighboring Gaussian distributions and provide sufficient contrast in properties, another set of constraints were enforced on both the elastic modulus and the hardness values as shown in Eq. (6):

$$\mu_j^X + s_j^X \leq \mu_{j+1}^X - s_{j+1}^X \quad (6)$$

Results

Microstructure of Multi-Walled Carbon Nanotube-Reinforced Cement

FIGS. 5A-5D display ESEM images of plain cement as well as MWCNT-modified cement at levels of 0.2 wt %, 0.5 wt %, and 1 wt %. For all cement-based specimens, a heterogeneous microstructure was observed, composed of capillary pores in black, C—S—H matrix in dark grey, and calcium hydroxide in light grey.

The presence of MWCNTs has a positive effect on the fraction of capillary pores for low weight fractions of MWCNTs. A digital image analysis on SEM images was performed at a 50× magnification level, spanning an area of 3.71 mm×2.80 mm, and the capillary porosity was calculated. A downward trend was observed for plain cement and for MWCNT weight fractions of 0.2 wt % and 0.5 wt %. The computed capillary porosity values were 0.82%, 0.132%, and 0.026%, respectively, for plain cement, cement+0.2 wt % MWCNT, and cement+0.5 wt % MWCNT.

However, at large weight fractions, the presence of MWCNTs resulted in an increase in the volume fraction of capillary pores and in the size of capillary pores. The computed capillary porosity value for cement+1 wt % MWCNT was 1.465%, which represents a 79% increase compared to plain cement. Moreover, the maximum capillary pore size was 200 µm for cement+1 wt % MWCNT whereas it was 100 µm for plain cement, cement+0.5 wt % MWCNT, and cement+0.2 wt % MWCNT.

Figure 6B:
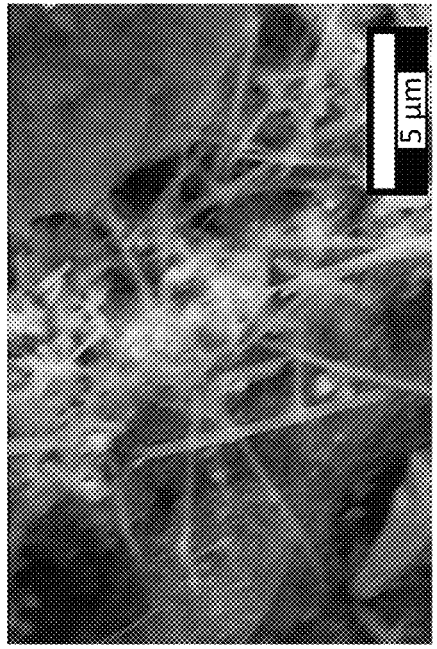
FIGS. 6A-6C show SEM images of MWCNT-modified cement (cement+1 wt % MWCNT).
Figure 6C:
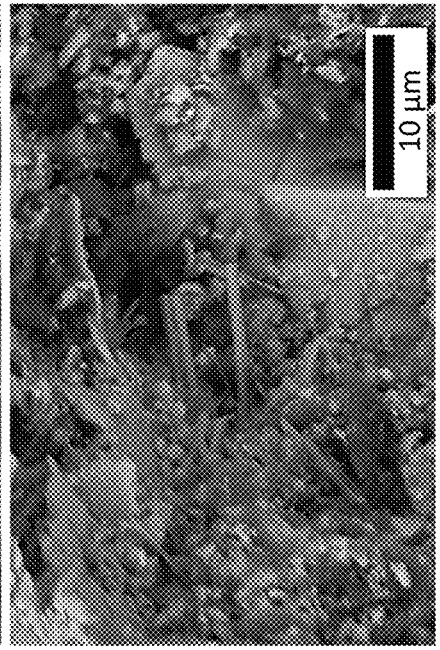
Figure 6A:

To further understand the influence of MWCNTs on cement composites, high resolution scanning electron microscope was implemented as shown in FIGS. 6A-6C with a magnification level 10,000×. MWCNTs appear as rod-like structures that connect grains and bridge air voids (see FIGS. 6A-6B). Consequently, MWCNTs contribute to a refinement of the pore size. Moreover, FIG. 6C shows some amount of hydration product growth surrounding MWCNTs. FIGS. 6A-6C support the hypothesis of MWCNTs connecting C—S—H and other hydration products. Thus, the ESEM observations support the multi-scale model shown in FIG. 4.

Fracture Behavior

Figure 7A:
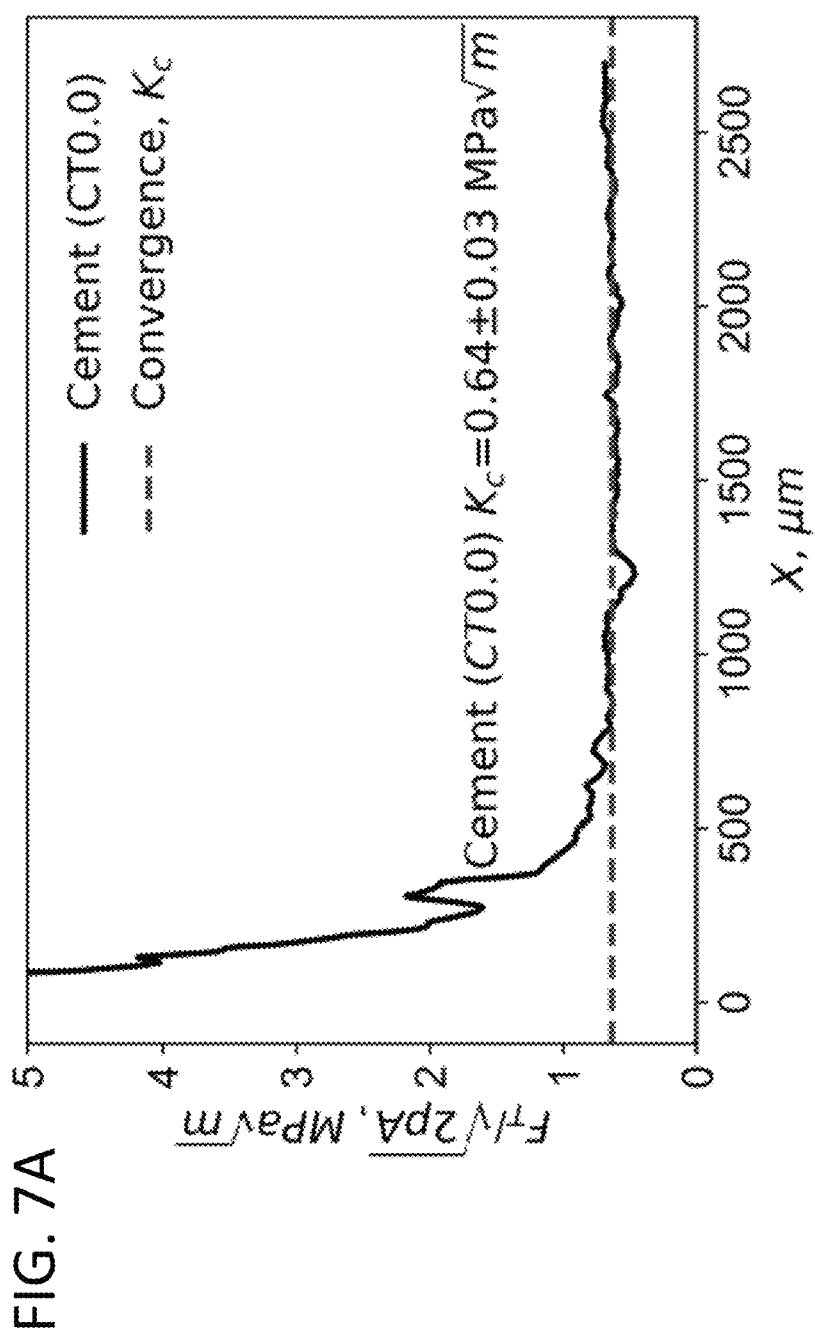
FIG. 7A shows fracture toughness calculation: illustration on plain cement. $F_T$ is the horizontal force, 2pA is the scratch probe shape function and $K_c$ is the fracture toughness.

Therefore, the scratch fracture model was applied to understand the influence of MWCNTs reinforcement on the fracture performance. FIG. 7A illustrates the fracture toughness calculation process on plain cement. The quantity $F_T/\sqrt{2pA}$ is displayed as a function of the scratch length X, where $F_T$ is the horizontal force and $2pA$ is the scratch probe shape function. For low values of X, and hence low values of the penetration depths, $F_T/\sqrt{2pA}$ sharply varied. However, a convergence regime was reached for large values of X, and hence d. The convergence of $F_T/\sqrt{2pA}$ toward a horizontal asymptote reflects the convergence from ductile to brittle fracture.

Within the brittle fracture regime, linear elastic fracture mechanics prevail, and Eq. (2) yields the fracture toughness, which is also the value of the asymptote. Thus, each scratch test yielded a single estimate of the fracture toughness based on 1,000 experimental data points; for each specimen, 8 scratch tests were conducted for statistical purposes. The fracture toughness value obtained for plain cement, 0.64±0.02 MPa$\sqrt{m}$, is in agreement with values of the fracture toughness measured at the macroscopic scale on cement paste w/c=0.44 using three-point bending tests and by application of size effect upscaling methods. (B. Cotterell, et al., Journal of materials science, 22(8), pp. 2734-2738; X. Hu, et al., 65(2-3), pp. 209-221.) Thus, a validated method exists to assess the fracture toughness at the microscopic scale.

Figure 7B:
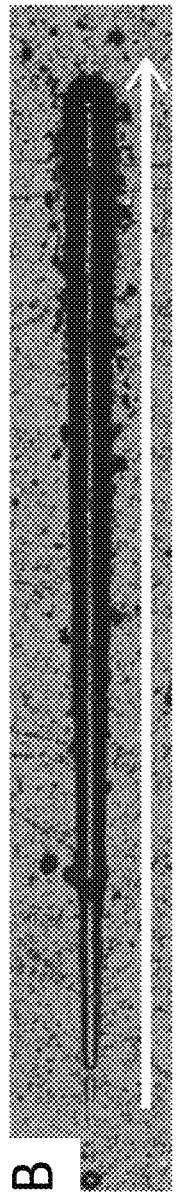
FIG. 7B shows an optical microscopy image of a residual groove after scratch testing on a plain cement specimen; the white arrow indicates the scratch direction.
Figure 8A:
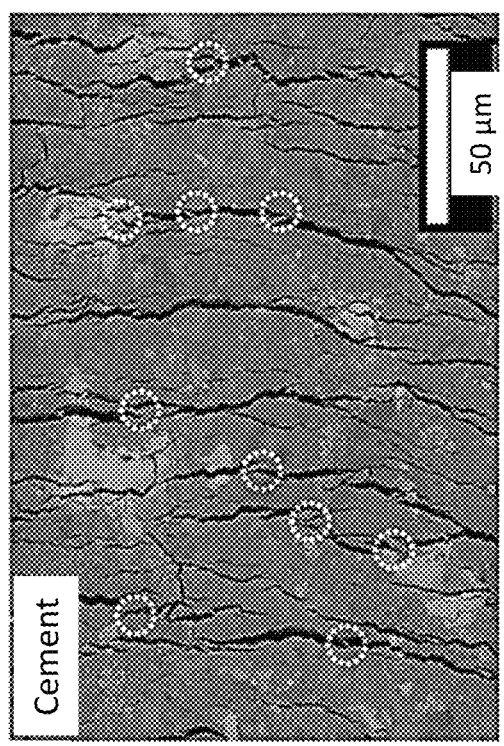
FIGS. 8A-8B show fracture micromechanisms of MWCNT-cement composites.
Figure 8B:
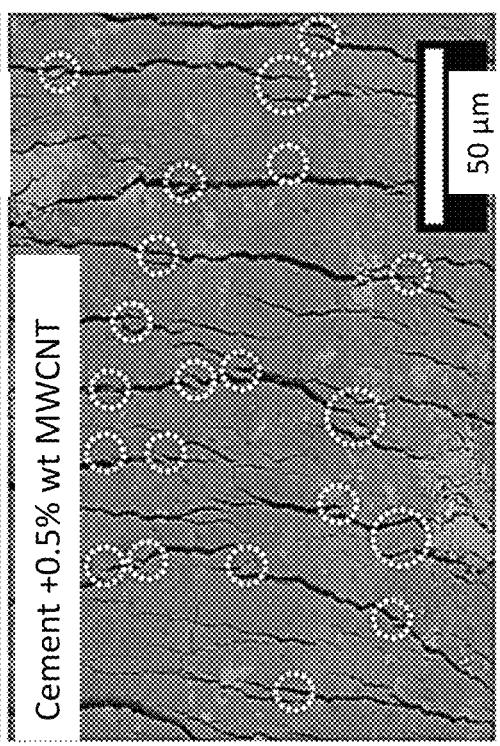

Furthermore, the presence of fracture processes was observed. FIG. 7B shows the presence of a residual groove after scratch testing. The width of the residual groove increased with the scratch path length and the penetration depth, pointing to material removal processes. FIGS. 8A-8B display ESEM images of the residual groove in both plain cement and cement+0.5 wt % MWCNT. The presence of curved fracture surfaces was observed. Similar fracture micro-mechanisms exist between plain cement and MWCNT-modified cement: micro-cracking, crack deflection, and crack ligament bridging.

The presence of MWCNTs influenced the fracture micromechanisms in general and the bridging process in particular. FIGS. 5A-5D focus on ligament bridging, and instances of ligament bridging were counted in both plain cement and MWCNT-modified cement for an area spanning 20 µm×150 µm. For plain cement, 6 major cracks and 10 instances of ligament bridging were counted, whereas for cement+0.5 wt % MWCNT, 6 major cracks and 21 ligament bridging events were counted. Thus, MWCNTs promoted ligament bridging as a fracture micromechanism.

Figure 9:
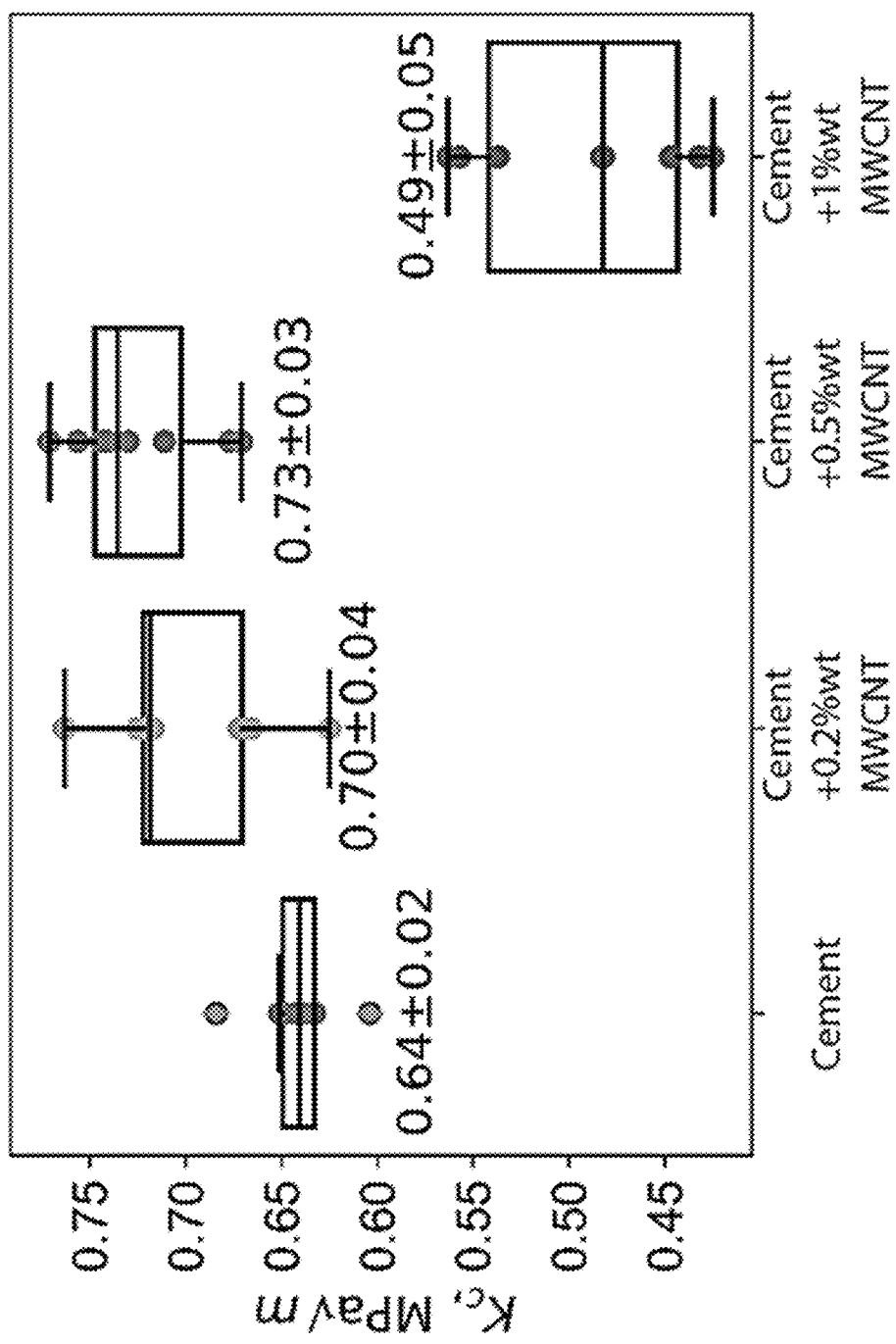
FIG. 9 shows a Box Plot of Fracture Toughness $K_c$ of CT0.0, CT0.2, CT0.5 and CT1.0.
Figures 10A, 10B:
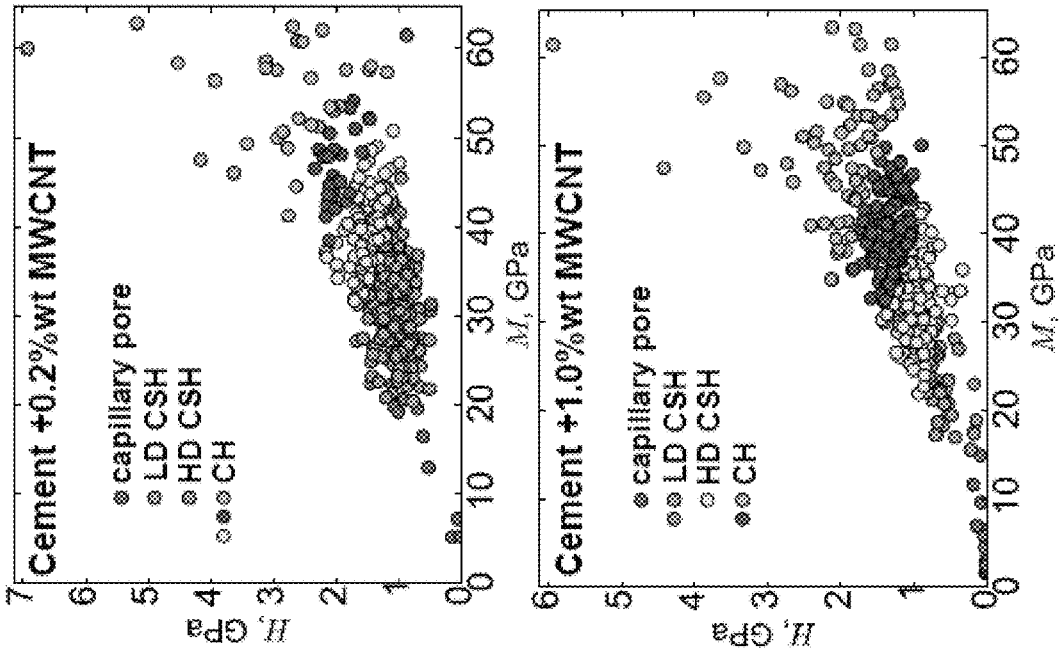
FIGS. 10A-10D show cluster analysis of indentation hardness H (GPa) and modulus M (GPa) including (FIG. 10A) CT0.0, (FIG. 10B) CT0.2, (FIG. 10C) CT0.5, (FIG. 10D) CT1.0.
Figures 10C, 10D:
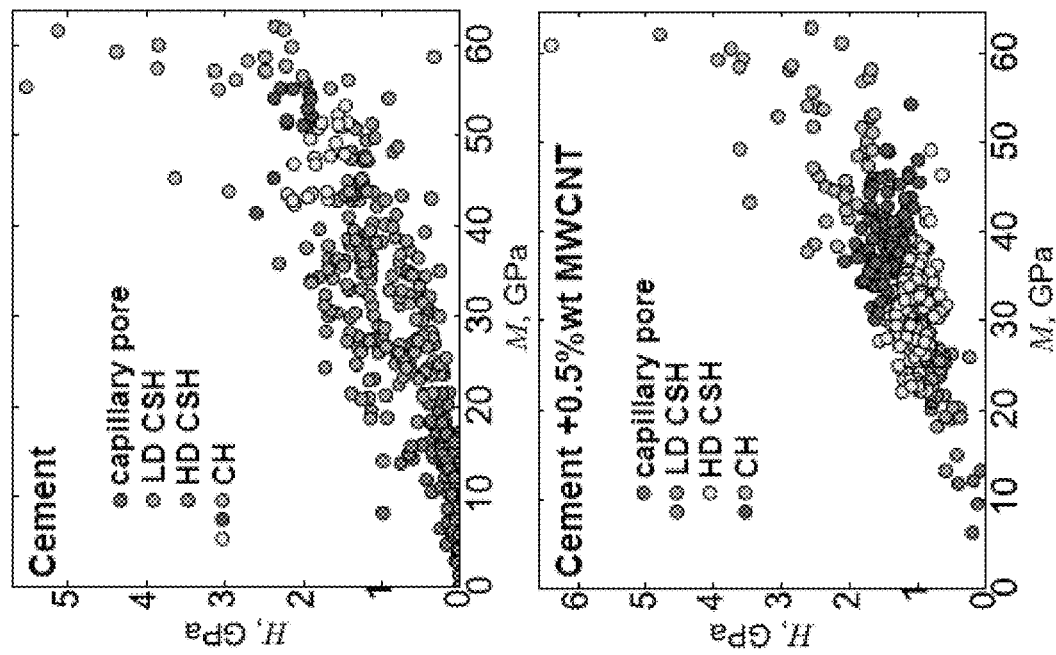

MWCNTs contributed to an increase in fracture toughness for low MWCNT weight fractions. FIG. 9 displays the evolution of the fracture toughness as a function of the weight fraction of MWCNTs. The fracture toughness for plain cement, cement+0.2 wt % MWCNT, and cement+0.5 wt % MWCNT were 0.64±0.02 MPa$\sqrt{m}$, 0.70±0.04 MPa$\sqrt{m}$, and 0.73±0.03 MPa$\sqrt{m}$, respectively. Thus, a 9.4% and a 14% increase in fracture toughness were recorded for cement paste when modified with respectively 0.2 wt % and 0.5 wt % of MWCNTs. However, for high weight fractions of MWCNTs, a sharp decline in fracture toughness was observed. The fracture toughness of cement+1 wt % MWCNT was 0.49±0.05 MPa, which represents a 30.6% decrease compared to plain cement.

Calcium-Silicate-Hydrate Phase Distribution

Figure 11:
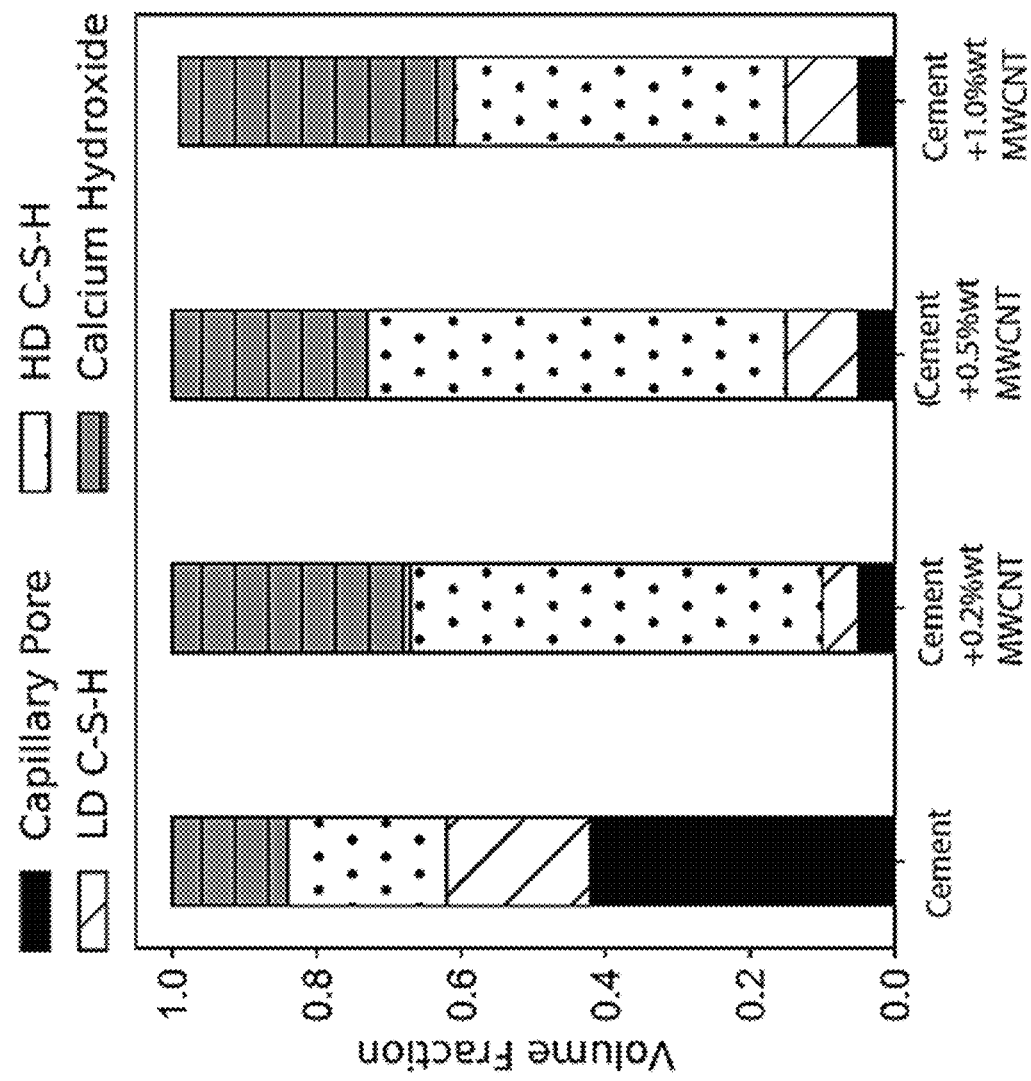
FIG. 11 shows a bar plot of volume fraction calculated from statistical nanoindentation for different phases including capillary pores (black), low-density C—S—H (white with slash), high-density C—S—H (white with black dot), calcium hydroxide (gray with horizontal lines).

FIG. 11 displays the results of statistical deconvolution integrated with grid nanoindentation on plain cement and MWCNT-cement composites. The analysis focused on cement hydration products, with M<65 GPa. Based on the multiscale model for MWCNT-modified cement, see FIG. 4, four types of phases were considered: capillary pores, low-density C—S—H, high-density C—S—H, and calcium hydroxide. FIGS. 10A-10D display the phases in clusters in the (M, H) plane.

The different micro-constituents of MWCNT-modified cement were identified based on their mechanical signature. Calcium hydroxide (CH) phases had the highest values of the indentation modulus, 40.47-58.45 GPa, meanwhile capillary pores had the lowest values of the indentation modulus, less than 11 GPa. Low-density C—S—H (LD C—S—H) had indentation modulus values in the range 18.88-26.85 GPa. High-density C—S—H (HD C—S—H) had indentation values in the range 31.50-38.00 GPa. The computed values of the indentation modulus for LD C—S—H, HD C—S—H, and CH, are in agreement with experimental values reported in the scientific literature and measured using nanoindentation experiments. (G. Constantinides, et al., Cem. Concr. Res. 34 (2004) 6780; and M. J. DeJong, et al., 2007, Cement and Concrete Research, 37(1), pp. 1-12.)

Figure 12:
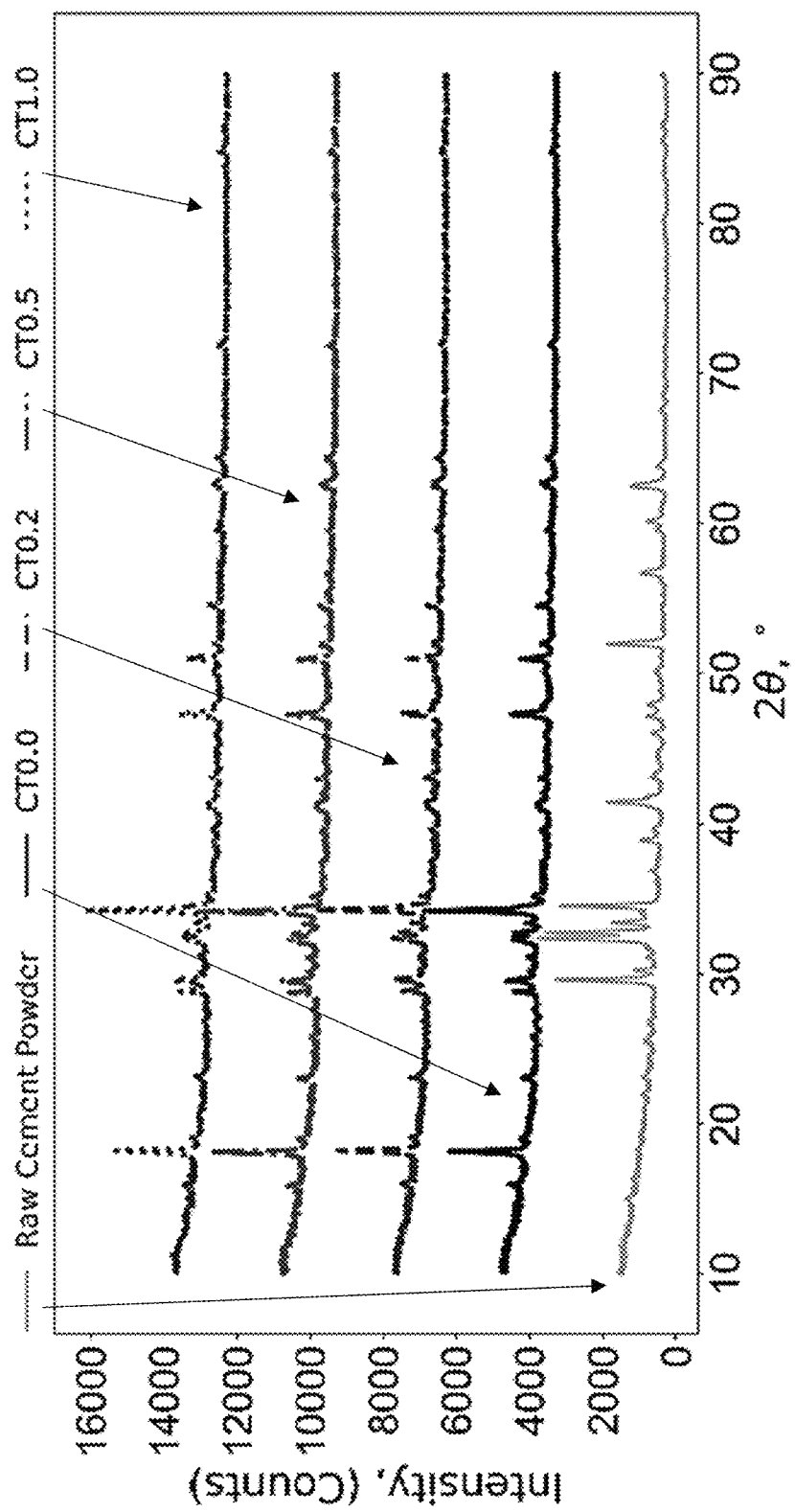
FIG. 12 shows X-ray powder diffraction (XRD) results: CT0.0=cement; CT0.2=cement+0.2 wt % MWCNT; CT0.5=cement+0.5 wt % MWCNT; CT1.0=cement+1.0 wt % MWCNT.
Figure 13:
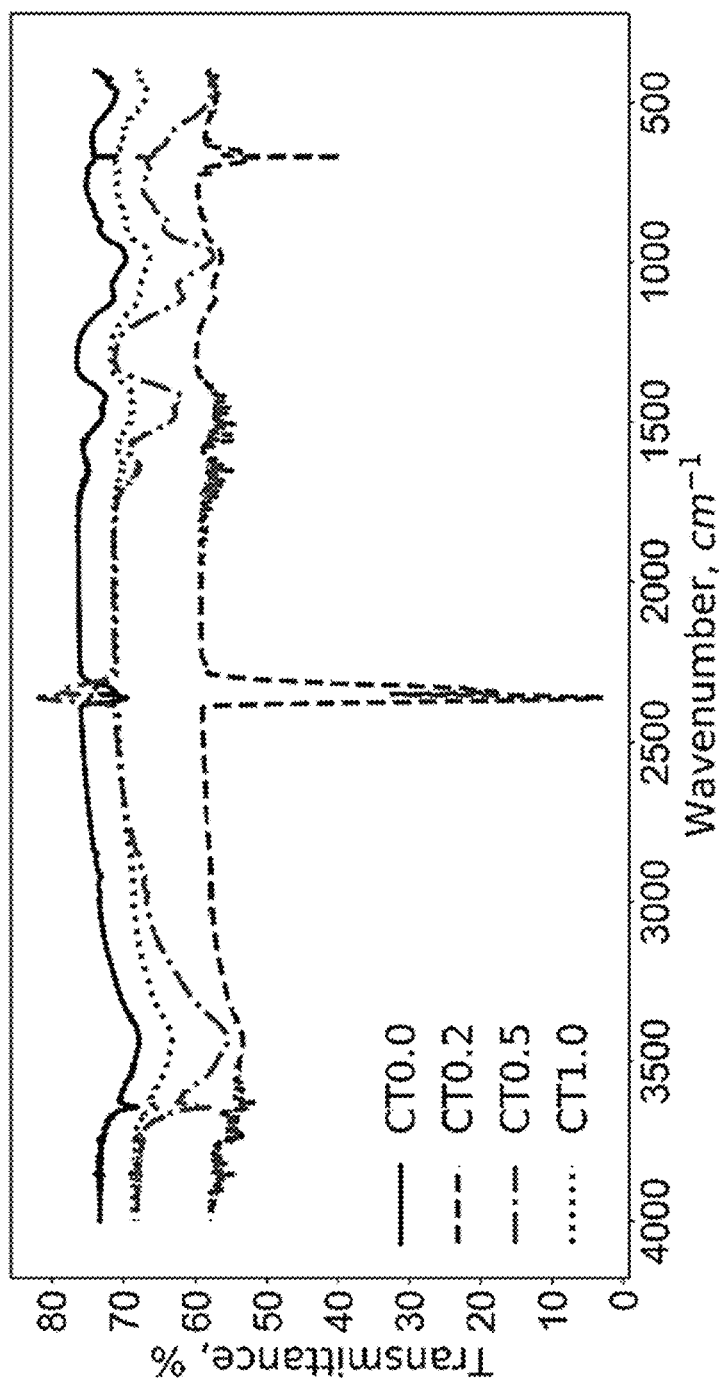
FIG. 13 shows Fourier-transform infrared spectroscopy (FTIR) results: CT0.0=cement; CT0.2=cement+0.2 wt %

The presence of MWCNT had a strong influence on the capillary porosity and on the percentage of cement hydration products. FIG. 12 displays the chemomechanical phase distribution for both plain cement and MWCNT-modified cement composites. A sharp reduction in capillary pores was observed between plain cement and MWCNT-modified cement. This reduction in capillary porosity is in agreement with the ESEM observations in FIGS. 5A-5D.

TABLE 3

Nano-porosity and Total Porosity Results

| Type | Capillary Pore | LD C—S—H | HD C—S—H | Gel porosity $\varphi$ | Total porosity |
|---|---|---|---|---|---|
| CT0.0 | 0.42 | 0.2 | 0.22 | 0.1292 | 0.5492 |
| CT0.2 | 0.05 | 0.05 | 0.57 | 0.1662 | 0.2062 |
| CT0.5 | 0.05 | 0.1 | 0.58 | 0.1868 | 0.2368 |
| CT1.0 | 0.05 | 0.1 | 0.33 | 0.1566 | 0.2056 |

MWCNTs promoted an increase in high-density C—S—H and in calcium hydroxide. The volume fraction of high-density C—S—H was 22% for plain cement and was increased up to 57% and 58%, respectively, for cement+0.2 wt % MWCNT and cement+0.5 wt % MWCNT. Similarly, the volume fraction of calcium hydroxide was 16% for plain cement and that values increased to 33% and 27% for cement+0.2 wt % MWCNT and cement+0.5 wt % MWCNT, respectively. In turn, the volume fraction of low-density C—S—H decreased with the addition of MWCNTs, from 20% for plain cement to 5% and 10% for cement+0.2 wt % MWCNT and cement+0.5 wt % MWCNT.

MWCNTs led to an increase in C—S—H gel porosity $\varphi$. The gel porosity given the volume fraction of low-density C—S—H and high-density-C—S—H was computed according to the formula:

$$\varphi = f_{LDC-S-H}(1 - 0.64) + f_{HDC-S-H}(1 - 0.74) \quad (7)$$

where 0:64 and 0:74 are the local packing density values of low-density C—S—H and high-density C—S—H, respectively. Table 3 displays the values of the gel porosity and of the total porosity (capillary porosity and gel porosity) for both plain cement and MWCNT-modified cement paste. A surprising result is that the gel porosity of cement composites was greater than that of plain cement, with the highest increase observed for cement+0.5 wt % MWCNT. Nevertheless, overall, the addition of MWCNTs resulted in a decrease in the total porosity. As shown in Table 3, a significant drop of total porosity by 62.45% was observed with the addition of 0.2 wt % MWCNTS. The total porosity decreased by 56.88% and 62.56% with the addition of 0.5 wt % and 1.0 wt %, respectively. Finally, the presence of MWCNTs introduced a shift in the pore size distribution of MWCNT-modified cement paste, with most air voids existing as gel pores.

XRD and FTIR Spectra

XRD and FTIR were implemented to study the chemical composition and chemical groups of cement nano-composites. FIGS. 11 and 12 present XRD and FTIR results of plain cement, cement+0.2 wt % MWCNT, cement+0.5 wt % MWCNT, and cement+1.0 wt % MWCNT.

At low weight fractions, MWCNTs led to an increase in the calcium hydroxide (CH) orientation index. To calculate the calcium hydroxide orientation index, one must divide the CH (001) orientation peak intensity by the CH (101) orientation peak intensity. In XRD results, calcium hydroxide peaks appear at around 18.2° 2θ in (001) direction at around 34.2° 2θ in (101) direction. There was an orientation index of 1.106, 1.111, 1.233, and 1.068 for plain cement, cement+0.2 wt % MWCNT, cement+0.5 wt % MWCNT, and cement+1.0 wt % MWCNT, respectively.

The presence of MWCNTs influenced the vibration frequencies of the O—H, C—O, and $SiO_4^{4-}$ groups. At a wavenumber of around 3643 $cm^{-1}$, the peak is referred to the stretching vibrations of O—H. (Z. Li, et al., Cem. Concr. Compos. (2020) 103513.; and Z. Li, et al., Cem. Concr. Compos. (2020) 103513.) There was a slight shift to a lower wavenumber between CT0.0 and cement with MWCNTs. At around 1420 $cm^{-1}$, which is the C—O vibration bond, there was a shift to a lower frequency. At around 987 $cm^{-1}$, $SiO_4^{4-}$ (asymmetric Si—O stretching) shifted towards a little lower frequency, while at around 461 $cm^{-1}$, $v_4 SiO_4^{4-}$ shifted towards a higher frequency with the addition of MWCNTs.

Discussion

Strengthening Mechanisms of MWCNT-Modified Cement

The results show that MWCNTs led to a reduction in capillary porosity. SEM images show MWCNTs bridging air voids, thereby reducing the pore size. Statistical deconvolution shows a neat decrease in the capillary porosity and in the total porosity.

The results show that MWCNTs promoted an increase in high-density C—S—H. The FTIR results show a shift in the spectra, suggesting a change in the proportion of hydration products. At around 1420 $cm^{-1}$, which is the C—O vibration bond, there was a shift to a lower frequency. At around 987 $cm^{-1}$, $SiO_4^{4-}$ (asymmetric Si—O stretching) shifted towards a little lower frequency, while at around 461 $cm^{-1}$, $v_4 SiO_4^{4-}$ shifted towards a higher frequency with the addition of MWCNTs, which may indicate an increase in the polymerization degree of C—S—H.

The results show that MWCNTs promote calcium hydroxide crystal growth. Statistical nanoindentation shows a neat increase in calcium hydroxide volume fraction for MWCNT-modified cement. Moreover, the XRD spectra show an increase in the calcium hydroxide orientation index for cement+xMWCNT, X=0:2; 0:5; 1:0 wt %, which suggests that calcium hydroxide has more free space to grow.

Toughening Mechanisms of MWCNT-Modified Cement

The results show an increase in fracture toughness for MWCNT reinforcement levels less than or equal to 0.5 wt %. Moreover, the fractography studies show that MWCNTs promoted ligament bridging. Herein, using microscopic scratch tests, a higher frequency of ligament bridging in MWCNT-modified cement was shown compared to plain cement. Another MWCNT-induced toughening mechanism is the reduction in the fraction of capillary pores, which serve as potential stress concentrators. Finally, the increase in small gel pores will also provide additional means to dissipate mechanical energy through nanopore rearrangement, thereby enhancing the fracture energy.

Example 2: Composites of CNFs and Cement

This Example illustrates the impact of CNF modification on the distribution of cement hydration products, on the pore structure, and on the calcium silicate hydrate gel porosity of cement composites.

Materials and Methods

Materials Synthesis

CNF-modified cement composites were synthesized with CNF weight fractions of 0.0 wt %, 0.1 wt %, and 0.5 wt % by mass fraction of cement. The reference material consisted of 69.44 g of Portland cement I and 30.56 g of deionized water. In addition, the 0.1 wt % and 0.5 wt % CNF cement nano-composites contained, respectively, 0.069 g and 0.347 g of CNFs per 100 g of material. Vapor-grown CNFs were acquired from Pyrograph Products, Inc. (Cedarville, OH). The CNFs were highly graphitic and tubular with an average diameter of 150 nm, a 50-200 µm length, and a surface area of 20-30 m$^2$/g.

The CNF cement nano-composites were synthesized in three steps. First, the CNFs were dispersed in deionized water using a Sonics VCX-750 ultrasonic processor with a total energy output of 0 kJ, 2 kJ, and 10 kJ, corresponding respectively to the reference Portland cement paste, the 0.1 wt % CNT cement, and 0.5 wt % CNF cement specimens. Second, the suspension of CNF dispersed in deionized water was mixed with cement paste using an IKA RW 20 overhead stirrer equipped with a four-blade propeller for two minutes at a speed of 200 rpm for the reference specimen and 0.1 wt % CNF cement and 800 rpm for the 0.5 wt % CNF cement specimen. Afterward, the resulting slurry was poured into lubricated 32-mm round cylindrical molds. The cast cementitious specimens were initially cured for 24 hours at 22±2° C. using an orbital shaker at a speed of 100 rpm. Then, the specimens were demolded and soaked in deionized water for six additional days at 22±2° C. Finally, after seven days of curing, the cement composites were soaked in ethanol for 24 hours to stop the cement hydration reaction, then wrapped in polyethylene films and stored in vacuum desiccators.

Methods

Grinding and Polishing

The cement nano-composites were polished in three steps to yield a thoroughly flat surface. First, the 32-mm CNF cement specimens were embedded in low-viscosity epoxy resin and sectioned using a low-speed diamond saw to yield 5-mm thick slices. Second, after mounting on aluminum discs using cyano-acrylate adhesive, the specimens were ground using a semi-automated grinder polisher in concert with silicon carbide grinding pads of grit size 400, 600, and 800. Afterward, the specimens were manually polished using silicon carbide polishing pads of particle size 3 µm, 1 µm, and 0.25 µm. In between each step, the specimens were cleansed in N-decane using an ultrasonic bath for two minutes. At the end of the grinding and polishing procedure, the specimens were stored in vacuum desiccators.

Scanning Electron Microscopy Imaging

In order to visualize the microstructure of the CNF cement nano-composites, ESEM imaging was performed on uncoated polished specimens. To this end, an environmental scanning electron microscope was used in backscattered mode and under low-vacuum at the Northwestern University Electron Probe Instrumentation Center. The accelerating voltage was 15 kV, the walking distance was 11 mm, and the magnification level ranged from 55× to 20,000×.

Nanoindentation Testing

In order to map the elasto-plastic properties, nanoindentation testing was conducted using an Anton Paar nanohardness tester NHT$^2$. Each individual indentation test was characterized by a maximum vertical force of 2 mN, a loading/unloading rate of 4 mN/min, and a holding phase of 10 s. For each sample, a 20×20 array of indentation tests was conducted with an interindent spacing of 20 µm. For each indent, the local values of the indentation modulus ($M_i$) and the indentation hardness ($H_i$) were measured from the load-depth curve by application of the Oliver & Pharr model: (W. Oliver, et al., Journal of Materials Research 7 (1992) 1564-1583.)

$$\frac{1}{E_r} = \frac{1-v^2}{E} + \frac{1}{M_i}; H_i = \frac{P_{max}}{A_i(h_i)} \quad (1)$$

where $$E_r = \frac{\sqrt{\pi}}{2} \frac{S}{\sqrt{A_i(h_i)}}$$

is the reduced modulus which is calculated knowing S, the slope of the load-depth curve upon unloading. $P_{max}$=2 mN is the maximum force, and $A_i$ is the projected load contact area at maximum penetration depth $h_i$. All tests were performed using a diamond Berkovich probe with E=1024 GPa and v=0:17 being respectively the Young's modulus and Poisson's ratio of the probe. Prior to running the series of indentation tests, the curve A(h) was calibrated using fused silica as reference material.

For each individual indentation test, the local value of the packing density $\eta_i$ was measured by application of theoretical solutions for indentation in porous cohesive frictional materials: (S. Cariou, et al., Journal of the Mechanics and Physics of Solids 56 (2008) 924-952.)

$$M_i = m_s \mathcal{M}(\eta_i, v_s); H_i = c_s \mathcal{H}(\eta_i, \alpha_s, v_s) \quad (2)$$

Herein, $m_s$, $v_s$, $c_s$, and $\alpha_s$ are respectively the plane strain elastic modulus, Poisson's ratio, cohesion, and coefficient of internal friction of the solid skeleton. $\mathcal{M}$ is the indentation modulus linear-upscaling function which is a function of the morphology as well as the packing density. For instance, for a statistically disordered morphology with spherical spheres and for $v_s=0.2$, $\mathcal{M}(\eta)=2\eta-1$. (M. Vandamme, et al., Cement and Concrete Research 40 (2010) 14-26.) Meanwhile, the indentation hardness nonlinear upscaling function, $\mathcal{H}$, can be derived via yield design analysis. (S. Cariou, et al., 2008; and A.-T. Akono, Journal of the Mechanics and Physics of Solids, Under Review (11 2019).)

An unsupervised machine learning method, here statistical deconvolution analysis, was conducted based on the distribution $(M_i, H_i, \eta_i)_{1 \leq i \leq 400}$ so as to identify individual chemomechanical phases based on their mechanical signature. The principle of statistical deconvolution methods is to represent a convoluted probability distribution function as a weighted sum of individual Gaussian functions. (F. Ulm, et al., Journal of the American Ceramic Society 90 (2007) 2677-2692; and L. Sorelli, et al., Cement and Concrete Research 38 (2008) 1447-1456.) In the case of cement paste composites n=5 types of phases were expected to be found: capillary pores, low-density calcium silicate hydrates (C—S—H), high-density C—S—H, ultra-high-density C—S—H, and unhydrated clinker. (Vandamme, et al., 2010.) Each phase j was characterized by five mechanical parameters: the surface fraction $f_j$, the mean indentation modulus and hardness, $\mu_j^M$ and $\mu_j^H$ and the standard deviations of the indentation modulus and the hardness, $s_j^M$ and $s_j^H$. The 5×n unknowns $\{f_j, \mu_j^M, s_j^M, \mu_j^H, s_j^H\}_{(j \in [1,n])}$ were determined by minimizing the squared sum difference between the experimental probability distribution functions $PDF_X(X_i)$ and the weighted model probability distribution functions PDF $(X_i, \mu_j^X, s_j^X)$ according to:

$$\min \sum_{i=1}^{N} \sum_{x=(M,H)} \left( \sum_{j=1}^{n} f_j PDF(X_i, \mu_j^X, s_j^X) - PDF_X(X_i) \right)^2 \quad (3)$$

Moreover, two additional constraints were enforced. First, the sum of the surface fractions of each phase should be equal to unity: $\Sigma_{j=1}^n f_j=1$. Second, a phase overlap between neighboring Gaussian curves was avoided: $\mu_j^X + s_j^X \leq \mu_{j+1}^X - s_{j+1}^X$.

Scratch Testing

The fracture behavior was measured using microscopic scratch tests with an Anton Paar micro-scratch tester. In the experiments, a Rockwell C diamond probe was pushed across the surface of the specimen under a prescribed linearly increasing vertical force while the horizontal force and the penetration depth were measured using high-accuracy force and displacement transducers at an acquisition rate of 45 kHz. The maximum vertical force was 2 N, the scratch length was 3 mm, and the scratch speed was 6 mm/min. Prior to testing, the surface baseline was probed using a contact force of 3 mN. The fracture toughness $K_c$ was computed from the horizontal force $F_T$ and penetration depth d measurements using: (A.-T. Akono, et al., Wear 313 (2014) 117-124; and A.-T. Akono, et al., Journal of Materials Research 27 (2012) 485-493.)

$$\frac{F_T}{\sqrt{2pA}} = K_c \quad (4)$$

2pA is the scratch probe shape function that was calibrated prior to scratch testing using fused silica as a reference material.

Micromechanical Modeling

The elastic properties of CNF-modified cement were upscaled using a linear micromechanics scheme. At the nanoscale, each C—S—H hydration product i was comprised of C—S—H gel pores and of a C—S—H solid skeleton with a packing density $\eta_i$. Therefore, for each C—S—H hydration product i={LD C—S—H, HD C—S—H, UHD C—S—H}, The effective stiffness tensor is that of a porous solid of packing density $\eta_i$, which is given by: (L. Dormieux, et al., Microporomechanics, John Wiley and Sons, 2006; and S. Nemat-Nasser, et al., Micromechanics: Overall Properties of Heterogeneous Materials, North-Holland, 1998.)

$$\mathbb{C}_i = \eta_i \mathbb{C}^{(s)} : \mathbb{A}^{(s)}; \mathbb{A}^{(s)} = \left[ (1-\eta_i)(\mathbb{I} - \mathbb{P}_0 : \mathbb{C}^{(s)})^{-1} + \eta_i \mathbb{I} \right]^{-1} \quad (5)$$

$\eta_i$ is the packing density and $\mathbb{A}^{(s)}$ is the strain concentrator tensor for the solid skeleton phase. Meanwhile, $\mathbb{P}_0$ is the Hill tensor for a spherical inclusion in an elastic isotropic medium. $\mathbb{P}_0$ is given by $$\mathbb{P}_0 = \frac{1}{3\kappa_s + 4\mu_s} \mathbb{J} + \frac{3}{5\mu_s} \frac{\kappa_s + 2\mu_s}{3\kappa_s + 4\mu_s} \mathbb{K}.$$

(A. Zaoui, Journal of Engineering Mechanics 128 (2002) 808-816.) $\mathbb{C}^{(s)} = 3\kappa_s \mathbb{J} + 2\mu_s \mathbb{K}$ is the stiffness tensor of the C—S—H solid skeleton. $\mathbb{I}$, $\mathbb{J}$, and $\mathbb{K}$ are respectively the symmetric fourth-order unit tensor, the fourth-order spherical tensor, and the fourth-order deviatoric projection tensor. Finally, $\kappa_s$ and $\mu_s$ are, respectively, the bulk modulus and shear modulus of the solid skeleton.

At the submicron scale, the C—S—H matrix was composed of low-density (LD) C—S—H, high-density (HD) C—S—H, and ultra-high-density (UHD) C—S—H phases arranged in a statistically disordered fashion. The effective stiffness tensor of the C—S—H matrix then reads:

$$\mathbb{C}_{C-S-H\ Matrix} = \quad (6)$$
$$\phi_{LD\ C-S-H} \mathbb{C}_{LD\ C-S-H} : \mathbb{A}_{LD\ C-S-H} + \phi_{HD\ C-S-H} \mathbb{C}_{HD\ C-S-H} :$$
$$\mathbb{A}_{HD\ C-S-H} + \phi_{UHD\ C-S-H} \mathbb{C}_{UHD\ C-S-H} : \mathbb{A}_{UHD\ C-S-H}$$

Given a phase i={LD C—S—H, HD C—S—H, UHD C—S—H}, $\phi_i$, $\mathbb{C}_i$, and $\mathbb{A}_i$ were, respectively, the volume fraction of phase i within the C—S—H matrix, the stiffness tensor of phase i, and the strain concentration tensor of phase i. The strain concentration tensor of phase i is given by: (Zaoui, 2002.)

$$\mathbb{A}_i = \phi_i \overline{\mathbb{A}_i} : \left[ \sum_{j=LD\ C-S-H, HD\ C-S-H, UHD\ C-S-H} \phi_j \overline{\mathbb{A}_j} \right]^{-1} \quad (7)$$

$$\overline{\mathbb{A}_i} = (\mathbb{I} + \mathbb{P}_{C-S-H\ Matrix} : (\mathbb{C}_j - \mathbb{C}_{C-S-H\ Matrix}))^{-1} \quad (8)$$

A self-consistent scheme was employed where the reference material was the C—S—H matrix. As a result, the Hill tensor reads:

$$\mathbb{P}_{C-S-H\ Matrix} = \frac{1}{3\kappa_{C-S-H\ Matrix} + 4\mu_{C-S-H\ Matrix}}$$
$$\mathbb{J} \frac{3}{5\mu_{C-S-H\ Matrix}} \frac{\kappa_{C-S-H\ Matrix} + 2\mu_{C-S-H\ Matrix}}{3\kappa_{C-S-H\ Matrix} + 4\mu_{C-S-H\ Matrix}} \mathbb{K}.$$

$\kappa_{C-S-H\ Matrix}$ and $\mu_{C-S-H\ Matrix}$ were, respectively, the homogenized bulk modulus and shear modulus for the C—S—H matrix.

The effective stiffness tensor for the cement paste reads then:

$$\mathbb{C}_{Cement\ Paste} = \qquad\qquad\qquad (9)$$
$$\phi_{C-S-H\ Matrix} \mathbb{C}_{C-S-H\ Matrix} : \mathbb{A}_{C-S-H\ Matrix} + \phi_{Clinker} \mathbb{C}_{Clinker} : \mathbb{A}_{Clinker}$$

$\mathbb{C}_{Clinker}$ is the stiffness tensor of unreacted clinker and $\phi_{Clinker}$ is the volume fraction of unreacted clinker grains. $\phi_{C-S-H\ Matrix}$ is the volume fraction of the C—S—H matrix. A Mori-Tanaka scheme was employed to capture the matrix-inclusion morphology. The reference material was the C—S—H matrix. Therefore, the strain concentration tensors are given by:

$$\mathbb{A}_{C-S-H\ Matrix} = \phi_{C-S-H\ matrix}[\phi_{C-S-H\ matrix}\mathbb{I} + \phi_{Clinker}\widetilde{\mathbb{A}_{Clinker}}]^{-1} \quad (10)$$

$$\mathbb{A}_{Clinker} = \phi_{Clinker}\widetilde{\mathbb{A}_{Clinker}} : [\phi_{C-S-H\ matrix}\mathbb{I} + \phi_{Clinker}\widetilde{\mathbb{A}_{Clinker}}]^{-1} \quad (11)$$

with $\widetilde{\mathbb{A}_{Clinker}} = (\mathbb{I} + \mathbb{P}_{C-S-H\ Matrix}:(\mathbb{C}_{Clinker} - \mathbb{C}_{C-S-H\ Matrix}))^{-1}$. In particular, the Hill tensor is still $\mathbb{P}_{C-S-H\ Matrix}$:

Results

Microstructural Characteristics

FIG. 14A displays an environmental backscattered SEM image of a CNF cement composite, with 0.5 wt % CNF, at a magnification level of 55×. A porous, heterogeneous, and granular microstructure was observed. There is a dominating dark grey matrix which is the calcium silicate hydrates (C—S—H) matrix. Unhydrated clinker grains crystals, 50 μm wide, can be seen in light grey. Finally, a few capillary pores, 50 μm wide, are shown in black. Furthermore, see FIG. 14B, digital image analysis reveals that capillary pores represent 5% of the surface area, unhydrated clinker grains occupy 10% of the total surface area, whereas the C—S—H matrix occupy 85% of the total surface area.

FIG. 15 displays a high-resolution scanning electron image of the C—S—H matrix, with a magnification level of 20,000×. A heterogeneous, porous, and granular microstructure was observed with C—S—H grains in the size of 2,500 nm. CNF bundles can be seen filling nanopores. Moreover, CNF bundles also emerged from C—S—H grains suggesting that CNFs promote the nucleation of C—S—H crystals. Finally, CNF bundles can also be seen connecting C—S—H grains, leading to bridging effect, and facilitating load transfer. Thus, the experiments show that CNF cement composites exhibit a multiscale structure and that CNFs affect the microstructure at the nanometer level.

Probabilitistic Description of the Mechanical Behavior

Grid nanoindentation was utilized to map the elastoplastic behavior. The local packing density was computed by application of Eq. (2). The calibrated values for the intrinsic parameters of the C—S—H solid skeleton are: $\nu_s$=0.2, $m_s$=63.5 GPa, $c_s$=0.264 GPa, and $\alpha_s$=0.30. These values are in agreement with reported values of the plane strain elastic modulus $m_s$ and of the cohesion $c_s$ for calcium-silicate hydrates using nanoindentation experiments as well as molecular dynamics simulations. (R. Pellenq, et al., Proceedings of the National Academy of Sciences 106 (2009) 16102-16107; W. Wu, et al., Journal of Nanomechanics and Micromechanics 1 (2011) 84-90; M. Vandamme, Ph.D. thesis, Massachusetts Institute of Technology (2008).)

FIG. 16 shows the probability distribution of the local packing density for plain cement, 0.1 wt % CNF-, and 0.5 wt % CNF-modified cement specimens. The probability distribution function for plain cement exhibits three major peaks: $\eta$=0.58, $\eta$=0.80, and $\eta$=0.92, with the second peak being dominant. For 0.1 wt % CNF-modified cement, the first peak is significantly reduced and the intensity of the second peak is increased whereas its location is shifted to $\eta$=0.76. Similarly, the third peak is shifted to $\eta$=0.87. Finally, for 0.5 wt % CNF, the intensity of the first peak is diminished and the location is moved to $\eta$=0.61. The second peak remains at $\eta$=0.79 and both the intensity and width are increased. Finally, the third peak is shifted to $\eta$=0.93 is reduced. Thus, the addition of CNFs leads to a reduction in low-density areas, with $\eta$<0.7, and an increase in high-density area, $\eta$=0.7–0.9. In other words, CNFs contribute to densify the cement paste.

Moreover, a probabilistic description of the elastoplastic characteristics was adopted. For a given phase, the indentation modulus—respectively the indentation hardness—spans a continuous range of values and the likelihood of each value is described by a probability distribution function. A Gaussian distribution of the indentation modulus—respectively the indentation hardness—was assumed, characterized by an average value and a standard deviation. The average value points to the location of the maximum, whereas the standard deviation points to the half-width of the Gaussian bell curve. FIG. 17 displays the computed probability distribution functions at both the collective and individual level for the indentation modulus M, for plain cement, and for CNF-modified cement. Meanwhile, the probability distribution functions for the indentation hardness H are displayed in FIG. 18. By using grid nanoindentation the uncertainty on the mechanical response can be quantified. The probability distribution function for the indentation modulus exhibits a main peak in the 30-40 GPa range, with the exact location of the peak and the half-bandwidth of the peak being dependent on the CNF content. Similarly, the probability distribution function for the indentation hardness exhibits a main peak in the 1-2 GPa range, with the exact location of the peak and the half-bandwidth of the peak being dependent on the CNF content.

A statistical deconvolution analysis of the indentation data was conducted to identify the cement microconstituents. 5 phases were expected to be observed: capillary pores, low-density C—S—H, high-density C—S—H, ultra-high-density C—S—H, and un-hydrated clinker grains. Low-density C—S—H and high-density C—S—H are compositionally similar and structurally distinct phases of the C—S—H matrix. Jenning's colloidal model was used as a reference for calcium silicate hydrates where the C—S—H gel is a gelled colloid and a nanogranular material with the globule, 2-4 nm in size, being the basic unit. (H. M. Jennings, Cement and Concrete Research 30 (2000) 101-116; H. M. Jennings, Materials and structures 37 (2004) 59-70; and H. M. Jennings, Cement and Concrete Research 38 (2008) 275-289.) High-density C—S—H is composed of C—S—H globules packed in a hexagonally-closed packed arrangement with a packing density of 0.74 and with a pore size in the range of 1.2 nm. Low-density C—S—H is composed of C—S—H packed loosely with a packing density of 0.64. Moreover, on the scale of 100 nm, low-density C—S—H exhibits mesopores in the range 5-12 nm. In addition, the specific surface area of low-density C—S—H is higher than that of high-density C—S—H, whereas high-density C—S—H is more dimensionally stable. Thus, low-density C—S—H and high-density C—S—H differ in terms of packing order, packing density values, and pore size ranges. The approach described herein allows for the quantification of the characteristics of each chemo-mechanical phase: volume fraction, indentation modulus, and indentation hardness, as shown in Table 4.

The results confirm the intrinsic nature of the mechanical characteristics for low-density C—S—H and high-density C—S—H. As shown in Table 4, for low-density C—S—H, the average indentation modulus lies in the range 16.89-20.74 GPa and the average indentation hardness lies in the range 0.49-0.73 GPa. For high-density C—S—H, the average indentation modulus lies in the range 32.37-36.98 GPa and the average indentation hardness lies in the range 1.14-1.36 GPa. These computed values agree with reported values of the indentation modulus and indentation hardness for both low-density C—S—H and high-density C—S—H that had been measured using nanoindentation experiments. (M. Vandamme, F. et al., Cement and Concrete Research 52 (2013) 38-52.) As for ultrahigh-density C—S—H (UHD CSH), the average indentation modulus is in the range 46.50-52.74 GPa and the average indentation hardness lies in the range 2.11-2.57 GPa. Ultrahigh-density C—S—H is usually considered to be a mix of C—S—H with portlandite. (Vandamme et al., 2013) Finally, capillary pores exhibit very low values of both the indentation hardness and modulus with a high variability. Meanwhile, clinker phases are characterized by an indentation modulus greater than 65 GPa.

Influence of CNF Content on Cement Chemo Mechanical Phases

The addition of CNFs influences the distribution of C—S—H phases. FIG. 19 displays the phase clusters for plain cement, 0.1 wt % CNF-, and 0.5 wt % CNF-modified cement. FIG. 20 displays the fraction of different chemo-mechanical phases: capillary pores, low-density C—S—H, high-density C—S—H, ultrahigh-density C—S—H, and unhydrated clinker. CNFs result in an increase in the fraction of high-density C—S—H by 6.7% from plain cement to cement+0.1 wt % CNF and by 10.7% from plain cement to cement+0.5 wt % CNF.

Table 4: Computed physical characteristics of chemo-mechanical phases in plain cement and in CNF-modified cement. CP=capillary porosity. LD C—S—H=low-density C—S—H. HD C—S—H=high-density C—S—H. UHD C—S—H=ultrahigh-density C—S—H. For each phase, $\mu_M$ (respectively $\mu_H$) is the average value of the indentation modulus (respectively indentation hardness); whereas $\sigma_M$ (respectively $\sigma_H$) is the standard deviation of the indentation modulus (respectively indentation hardness).

|  | Vol (%) | ($\mu_M$, $\sigma_M$), GPa | ($\mu_H$, $\sigma_H$), GPa, | $\eta$ |
|---|---|---|---|---|
| Plain Cement | | | | |
| CP | 2.72 | (0.00, 4.73) | (0.02, 0.10) | (0.52, 0.03) |
| CP | 8.17 | (9.39, 4.66) | (0.29, 0.17) | (0.58, 0.04) |
| LD C—S—H | 7.26 | (20.74, 6.69) | (0.67, 0.19) | (0.67, 0.05) |
| HD C—S—H | 59.89 | (36.98, 9.55) | (1.36, 0.49) | (0.80, 0.07) |
| UHD C—S—H | 12.71 | (52.74, 6.20) | (2.57, 0.72) | (0.92, 0.05) |
| Clinker | 9.25 | (97.23, 35.34) | (4.93, 3.31) | N. A. |
| Cement + 0.1 wt % CNF | | | | |
| CP | 3.65 | (0.00, 10.27) | (0.26, 0.17) | (0.05, 0.50) |
| CP | 0.91 | (12.49, 2.23) | (0.53, 0.10) | (0.58, 0.03) |
| LD C—S—H | 0.91 | (16.89, 2.17) | (0.73, 0.10) | (0.64, 0.02) |
| HD C—S—H | 66.61 | (32.37, 6.09) | (1.26, 0.34) | (0.76, 0.05) |
| UHD C—S—H | 19.16 | (46.50, 5.78) | (2.11, 0.51) | (0.87, 0.05) |
| Clinker | 8.75 | (91.40, 21.46) | (4.25, 2.41) | N. A. |
| Cement + 0.5 wt % CNF | | | | |
| CP | 2.65 | (0.00, 6.32) | (0.07, 0.10) | (0.54, 0.05) |
| CP | 3.53 | (10.65, 3.79) | (0.27, 0.10) | (0.61, 0.02) |
| LD C—S—H | 2.65 | (17.60, 3.16) | (0.49, 0.12) | (0.66, 0.02) |
| HD C—S—H | 70.60 | (35.58, 9.43) | (1.14, 0.53) | (0.79, 0.07) |
| UHD C—S—H | 8.83 | (53.00, 5.76) | (2.44, 0.77) | (0.93, 0.05) |
| Clinker | 11.75 | (87.65, 24.75) | (4.04, 3.43) | N. A. |

This increase in the fraction of high-density C—S—H is positively correlated with the CNFs content in a nonlinear fashion. Moreover, the increase in high-density C—S—H is followed by a decrease in the volume fraction of low-density C—S—H by 6.4% and 5.1% respectively for cement+0.1 wt % CNF and cement+0.5 wt % CNF. As for ultrahigh-density C—S—H, its volume fraction reaches its maximum value for low volume fractions of CNF, cement+0.1 wt % CNF. Meanwhile, the volume fraction of unhydrated clinker is maximum for cement+0.5 wt % CNF. In brief, CNFs promote the growth of high-density C—S—H.

The results from the statistical deconvolution of indentation data can be utilized to assess the influence of CNFs on the pore structure. A decrease was observed in the fraction of capillary pores by 6.3% and 4.7%, respectively, for cement+0.1 wt % CNF and cement+0.5 wt % CNF. The C—S—H gel porosity can be computed as $\phi_{LD\ CSH}(1-\eta_{LD\ CSH})+\phi_{HD\ CSH}(1-\eta_{HD\ CSH})+\phi_{UHD\ CSH}(1-\eta_{UHD\ CSH})$ where $\phi_{i,i=\{LD\ CSH;HD\ CSH;UHD\ CSH\}}$ is the volume fraction and $\eta_{i,i=\{LD\ CSH;HD\ CSH;UHD\ CSH\}}$ is the packing density of low-density C—S—H, high-density C—S—H, and ultrahigh-density C—S—H. The computed C—S—H gel porosity for plain cement, cement+0.1 wt % CNF and cement+0.5 wt % CNF is 15.39%, 18.80%, and 16.35%, respectively. Thus, a 3.41% and a 0.96% increase in C—S—H gel porosity was observed with the addition of 0.1 wt % CNF and 0.5 wt % CNF, respectively. However, for CNF-modified cement, the C—S—H gel porosity is distributed primarily among gel pores, 1.2 nm large with a significant reduction in gel mesopores, 5-12 nm large, due to the decrease of low-density C—S—H phases. The total porosity is then the sum of the capillary porosity and the C—S—H gel porosity. The computed total porosity is 26.28% for plain cement, 23.36% for cement+0.1 wt % CNF, and 22.53% for cement+0.5 wt % CNF. Thus, a 2.92% and a 3.75% reduction in total porosity was observed following the addition of 0.1 wt % and 0.5 wt % CNF, respectively. Thus, CNF-modification of cement paste results in a reduction of the total porosity, in a reduction of the capillary porosity, and in a refinement of the pore size.

Influence of CNF Content on Fracture Resistance

The fracture response of CNF cement composites was probed using scratch tests jointly with high-resolution SEM imaging. As shown in FIGS. 21A-21C, after scratch testing, the formation of a residual groove of increasing width was observed; this residual groove points to material removal processes at work during the scratch test. For all specimens and all tests, the quantity $F_T/\sqrt{2pA}$ decreased and then converged toward a stable value for large scratch X values and for large penetration depths d values. For low penetration depths, the mechanical energy was dissipated through a mix of ductile and brittle processes. However, as the axisymmetric scratch probe dug deeper into the material, the mechanical energy was dissipated primarily through brittle crack propagation processes. Thus, the convergence of $F_T/\sqrt{2pA}$ reflects a ductile-to-brittle transition which is activated by the penetration depth. In the asymptotic regime of a brittle regime, the asymptotic value of $F_T/\sqrt{2pA}$ yields the fracture toughness, following Eq. (1).

The presence of CNFs enhanced the fracture properties of cement paste. The fracture toughness of plain Portland cement is 0.66±0.02 MPa $\sqrt{m}$, a value which is in agreement with macroscopic values of the fracture toughness reported in the scientific literature for plain Portland cement. (B. Cotterell, et al., Journal of Materials Science 22 (1987) 2734-2738; and X. Z. Hu, et al., Engineering Fracture Mechanics 65 (2000) 209-2011.) These macroscopic fracture toughness values for plain Portland cement were obtained using three-point bending tests on single-edge notched specimens in concert with large specimen extrapolation methods. (Cotterell et al., 1987; Hu et al., 2011.) The fracture toughness of 0.1 wt % CNF cement is 0.69±0.02 MPa $\sqrt{m}$ and that of 0.5 wt % CNF cement is 0.71±0.04 MPa $\sqrt{m}$. Consequently, adding 0.1 wt % CNF yielded a 4.5% increase in fracture toughness and adding 0.5 wt % CNF yielded a 7.6% increase in fracture toughness. Thus, CNFs lead to significant gains in the fracture toughness.

Influence of CNF Content on Fracture Micromechanisms

In order to understand the reason for the enhancement in fracture behavior in CNF-modified cement composites, their fracture micromechanisms were studied using backscattered electron microscopy as shown in FIGS. 22A-22D. Looking at the residual groove of plain cement from the top, see FIG. 22A, the presence of curved fracture surfaces regularly spaced was observed. These fracture surfaces provide additional physical evidence of fracture processes during scratch testing. In addition, some common toughening mechanisms for Portland cement were observed, such as: microcracking, crack deflection, ligament bridging, and particle bridging. FIG. 22B presents a close-up view of a fracture surface; the crack opening averages 2 µm in width. In FIG. 22C, similar fracture micromechanisms were observed for 0.5 wt % CNF cement with a major difference: the fracture openings were smaller. FIG. 22D provides high-resolution imaging of the fracture surface for 0.5 wt % CNF cement: the crack opening averaged 1 µm in width. Thus, the addition of CNFs results in a drastic reduction in the crack width in CNF-modified cement composites.

Discussion

Multiscale Conceptual Model for CNF-Modified Cement

A multiscale thought-model for CNF-modified cement was formulated based on SEM observations. FIG. 23 displays the conceptual model. At the nanoscale, calcium silicate hydrate products are packed in various structural arrangements resulting in low-density C—S—H, high-density C—S—H, and ultrahigh-density C—S—H. At the submicron length-scale, C—S—H grains are connected by a network of CNFs forming the C—S—H matrix. At the microscopic length-scale, capillary pores and unhydrated clinker grains are embedded in the C—S—H matrix.

Using a micromechanics scheme, the elastic properties at the macroscopic scale can be predicted based on the nanoindentation measurements using Eqs. (5)-(11). A Monte Carlo approach was employed, where the stochastic variation of the clinker phase and the packing density was accounted for within the C—S—H phases—low-density C—S—H, high-density C—S—H, and ultrahigh-density C—S—H. For each specimen, 50,625 numerical simulations were conducted. FIGS. 24A-24C display the histogram of the predicted macroscopic Young's modulus $E^{hom}$ for all three specimens: plain Portland cement, cement+0.1 wt % CNF, and cement+ 0.5 wt % CNF. For plain Portland cement, the histogram of the predicted macroscopic Young's modulus exhibits a major peak at 29 GPa and at 36 GPa. For cement+0.1 wt % CNF, two peaks were observed: at 24 GPa and at 35 GPa. Finally, for cement+0.5 wt % CNF, three peaks were observed: at 23 GPa, at 29 GPa, and at 40 GPa. Thus, the presence of CNFs influences the stochastic distribution of the macroscopic Young's modulus by inducing a shift towards higher values. Moreover, the average value of the predicted macroscopic Young's modulus is 29.66 GPa, 31.43 GPa, and 36.12 GPa, respectively, for plain Portland cement, cement+0.1 wt % CNF, and cement+0.5 wt % CNF. Thus, an increase of 5.97% and 21.78%, respectively, in the average Young's modulus was predicted following CNF modification at 0.1 wt % CNF and 0.5 wt % CNF levels.

The presence of CNFs modifies the microstructure and nanostructure of CNF-modified cement. A reduction in the capillary porosity and a reduction in total porosity were observed, followed by a refinement of the pore structure. The model predicts a shift from micropores and mesopores—100 nm large—in plain Portland cement to small gel pores, 5-12 nm large, in CNF-modified cement.

Furthermore, the increase in high-density C—S—H and the pore refinement observed in CNF-modified cement can explain the decrease in autogenous shrinkage. Within the framework of the colloidal model of C—S—H, shrinkage results from the irreversible motion of C—S—H globules under drying stresses as the relative humidity is lower due to the ongoing cement hydration reaction. (Jennings, 2004.) Among the C—S—H phase, the low-density C—S—H is most susceptible to experience high irreversible volume changes given its low packing density as well as the presence of large gel mesopores. In contrast, high-density C—S—H is more dimensionally stable due to its high packing density along with a structural arrangement in close-packed hexagonally packed structures. Therefore, as the presence of CNFs promotes the formation of high-density C—S—H, CNFs will lead to a reduction in autogenous shrinkage for the cement paste. Thus, the results link the decrease in autogenous shrinkage in CNF-modified cement paste to the CNF-induced changes in nanostructure.

Toughening Behavior of CNF-Modified Cement

Using microscopic scratch tests, an increase in fracture toughness for CNF-modified Portland cement was observed, along with a reduction in the crack width. Moreover, CNFs toughen the cement matrix by reducing the capillary porosity and promoting a refinement of the pore size. The refinement of the pore size, due to an increase in high-density C—S—H, will likely increase the fractality of the fracture surface making it harder for fractures to propagate.

Example 3

Cement paste reinforced with MWCNTs at a mass fraction of 1 wt % per mass of cement was synthesized in four steps: (i) dispersion of MWCNTs in deionized water, (ii) mixing of the MWCNT mixture with cement powder under high speed and high sheer, (iii) 24-hour curing of the cement slurry in lubricated molds with an orbital shaker, and (iv) further curing of the pre-hardened cement nanocomposites in deionized water for 6 days.

Scanning Electron Microscopy Images

Scanning electron microscopy was employed to investigate the microstructure of cement+1 wt % MWCNT. To this end, an environmental scanning electron microscope FEI Quanta 650 was used, in low vacuum and backscattered mode. FIGS. 25A-25B display backscattered ESEM images of cement+1 wt % MWCNT. At magnification level×500, see FIG. 25A, a dense granular microstructure can be seen with hydrated cement in dark gray and residual unhydrated cement grains in light gray. At magnification ×10,000, see FIG. 25B, MWCNTs can be seen reinforcing the cement paste matrix at the nanoscale.

Indentation Test Results

The elasto-plastic properties were measured using nanoindentation tests conducted using an Anton Paar nanohardness tester equipped with a Berkovich probe. A 21×21 series of tests was conducted, each test being characterized by a maximum load of 2 mN, a loading/unloading rate of 4 mN/min, and a holding phase of 10 s. FIGS. 26A-26B display histograms of the indentation modulus and indentation hardness. The average indentation modulus was $(M^{micro})=45.04$ GPa and the average indentation hardness was H=1.96 GPa. The predicted effective indentation modulus at the macroscopic lengthscale is: $M^{macro}=38.23$ GPa.

Fracture Properties

The fracture properties were assessed using scratch tests conducted with an Anton Paar microscopic scratch tester. The prescribed maximum vertical load was 4 N, the scratch length was 5 mm, and the scratching speed was 10 mm/min. The number of tests performed was 8 scratch tests. A nonlinear fracture mechanics model was applied to extract the fracture toughness. The fracture scaling curves are shown in FIG. 27. The measured value for the fracture toughness was $K_c=0.51\pm0.05$ MPa$\sqrt{m}$.

Example 4

This example demonstrates the fracture response of Portland cement reinforced with MWCNTs and CNFs. The MWCNT-cement composites and CNF-cement composites were made using a quadratic distribution of the ultrasonic energy during the ultrasonic dispersion step. Scratch testing was used to probe the fracture response by pushing a sphero-conical probe against the surface of the material under a linearly increasing vertical force. The fracture toughness was then computed using a nonlinear Fracture Mechanics model.

Materials and Methods

Cement Nanocomposite Design and Synthesis

The CNFs were sourced from Pyrograph Products, Inc. (Cedarville, OH) as highly graphitic and tubular stacked-cup carbon nanotubes. The MWCNTs were sourced from Cheap Tubes Inc (Grafton, VT) and were produced through catalytic chemical vapor deposition. The specific surface area for the CNFs was in the range from 20 to 30 m$^2$/g, the average length of the CNFs was in the range from 150 to 200 µm, and the average diameter was 150 nm. The specific surface area for the MWCNTss was 110 m$^2$/g, the average length of the MWCNTs was in the range from 10-30 µm, and the average diameter was in the range from 20 to 30 nm.

Cement nanocomposites were synthesized with 0.1-0.5 wt % of CNFs or MWCNTs per mass of cement. The samples were designated as X-n where X=(CNF or MWCNT collectively referred to as carbon-based nanofillers) is the type of nanomaterial and n=(1, 2, 5) represents the mass fraction of nanomaterial, (0.1*n wt % per mass of cement). The synthesis occurred in four steps. First, the carbon-based nanofillers were pre-dispersed in deionized water with ultrasonic energy. A quadratic distribution of the amount of ultrasonic energy was adopted with respect to the nanofiller mass fraction. The amount of ultrasonic energy provided was 1.77 kJ/(g/L) for 0.1 wt %, 3.54 kJ/(g/L) for 0.2 wt %, and 17.72 kJ/(g/L) for 0.5 wt %. Second, the suspension of carbon-based nanofillers in deionized water was mixed in with Portland cement using an overhead IKA digital stirrer equipped with a 4-bladed propeller stirrer to provide ultrahigh speed and high shear. The mixing speed was set at 200 rpm for nanofiller fractions less than 0.1 wt %, 400 rpm for 0.2 wt %, and 800 rpm for 0.5 wt %. Afterward, the slurry was poured into lubricated cylindrical molds that were then sealed using polyethylene films. The specimens were initially cured for 24 hours using an orbital shaker at a rotational speed of 79 rpm. After the initial 24-hour curing, the cement nanocomposite specimens were removed from their molds and soaked in deionized water for an additional 6 days. After a total of 7 days of curing age, the cement nanocomposites were soaked in ethanol for 24 hours to stop the cement hydration and were stored under vacuum afterward.

Two reference Portland cement materials were mixed by combining 138.8 g of Portland cement with 61.12 g of deionized water. For the first reference Portland cement specimens, R-M, the mixture of Portland cement powder and deionized water was mixed manually for two minutes and cast in lubricated and sealed molds to cure at room temperature for 24 hours. For the second reference Portland cement specimen, R—HS—OS, the cement powder was mixed with deionized water using an IKA digital overhead high-shear high-speed mixer at a speed of 200 rpm for two minutes. Afterward, the slurries were cast in lubricated molds and sealed using an orbital shaker with a 19-mm orbit and a rotational speed set at 79 rpm for 24 hours. For both reference cement materials, R-M and R—HS—OS, after 24 hours of curing, the cement specimens were removed from their molds and cured in deionized water for 7 days.

Water Absorption and Porosity Measurements

The water absorption and the porosity were measured after 7 days of curing age following the standard ASTM C20-00 with minor modifications. (See, ASTM C20-00 (2015), Standard Test Methods for Apparent Porosity, Water Absorption, Apparent Specific Gravity, and Bulk Density of Burned Refractory Brick and Shapes by Boiling Water, ASTM International, West Conshohocken, PA, 2015.) First, the specimens were dried in an oven at 50° C. for 24 hours, and the mass $M_{dry}$ and dry specific gravity $\rho_{dry}$ were measured. Then, the specimens were saturated by submersion in deionized water at 23° C. for 24 hours, and the saturated mass was measured $M_{saturated}$. The water absorption, W, was calculated as the relative difference between the dry and the saturated mass:

$$W = \frac{M_{saturated} - M_{dry}}{M_{dry}} \times 100 \quad (1)$$

The porosity, P, was computed as the product of the water absorption and the dry specific gravity:

$$P = W \times \rho_{dry} \quad (2)$$

Grinding and Polishing

Before nanoscale mechanical testing, the cement nanocomposite specimens were polished to yield a flat surface. First, each specimen was cold-mounted using a low-viscosity epoxy resin. Afterward, 4-mm thick slices were machined using a low-speed diamond saw with an inert oil-based coolant. Grinding was conducted using a semi-automated grinder and polisher apparatus along with silicon carbide grinding pads of grit size 240, 400, and 600, consecutively. The specimens were rinsed using an ultrasonic bath with an inert oil-based solvent in between each grit size. Polishing was conducted using abrasive lapping discs with silicon carbide particles of size µm and 0.25 µm, consecutively. After grinding and polishing, the specimens were stored under vacuum.

Environmental Scanning Electron Microscopy Imaging

The microstructure of the polished cement nanocomposites specimens was observed using ESEM imaging. To this end, an FEI Quanta 650 environmental scanning electron microscope was used, which was equipped with a backscattered detector. In the ESEM experiments, the walking distance was 10-11 mm, the accelerating voltage was 10 kV, the spot size was 3-4.5, and the magnification level was in the range×10,000-50,000.

Scratch Tests

The fracture response of the cement nanocomposite specimens was measured using microscopic scratch tests. The scratch tests entailed pushing an axisymmetric probe across the surface of a softer material under a linearly prescribed vertical force. All scratch tests were conducted using an Anton Paar (Ashland, VA, USA) microscopic scratch tester equipped with a 200-µm Rockwell C diamond probe. The vertical force was progressively increased using a force feedback loop system, and the prescribed maximum vertical force was 2.5 N. Meanwhile, the scratch length was 5 mm, and the scratch speed was 10 mm/min. Before testing the cement specimens, the scratch probe was calibrated using fused silica: calibration scratch tests were performed with a maximum vertical force of 7 N, a scratch length of 3 mm, and a scratch speed of 6 mm/min. During each scratch test, the vertical and horizontal forces were measured using load sensors with a resolution of 0.1 mN. The penetration depth was measured using a linear variable differential transformer system with a resolution of 0.3 nm. The acquisition rate for the forces and the vertical depth was 45.0 kHz. For each cement nanocomposite material, seven scratch tests were conducted, spaced 1.2-mm apart. The microscopic scratch tester unit was integrated with a high-resolution Nikon transmitted light microscope. At the end of each scratch test, optical microscopy images of the residual top surface were captured using an Olympus objective at a magnification level of ×200, yielding a scratch panorama. Furthermore, after scratch testing, the fracture micro-mechanisms were investigated using backscattered environmental scanning electron microscopy.

Theory

A nonlinear Fracture Mechanics model was applied to extract the fracture toughness from the scratch test measurements. The theoretical model was previously published in Akono A T, et al., Phys. Rev. Lett. 106, 204302-204305. (DOI: 10.1103/PhysRevLett.106.204302); Akono A T, et al., J. Mat. Res. 27. 485-493; and Akono A T, et al., J. Mech. Phys. Solids. 60, 379-390. The salient points are summarized here. The first step is to identify the shape of the fracture surface during scratch testing. To this end, backscattered ESEM imaging was performed to visualize the residual groove after progressive-load scratch tests on cold-rolled steel with a sphero-conical probe. Curved fracture surfaces were observed perpendicular to the direction of scratch testing. As for the orientation, the fracture surfaces were slanted, suggesting subsurface cracking. Based on these observations, the existence of a crack is postulated that propagates forward, beneath the surface, away from the tip of the scratch probe. The crack initiates below the crack tips and later follows the contour of the scratch probe. Consider a crack of length $\ell$ that propagates at a speed $\underline{V} = \dot{\ell}\underline{e}_x$. Given the penetration depth, d, there are two geometrical parameters of interest: the perimeter p and the horizontally-projected load-bearing contact area, A. During an incremental advance $d\ell$ of the crack, the incremental crack surface created is $d\Gamma = pd\ell$. The energy release rate G is the thermodynamic driving force associated with crack propagation; the dissipation during crack propagation reads: $dD = Gd\Gamma$. In turn, the energy release, G, is related to the rate of change of the potential energy $\varepsilon_{pot}$ via:

$$\frac{d\varepsilon_{pot}}{dt} = -G\dot{\Gamma} = -Gp\dot{\ell} \quad (3)$$

The energy release rate G is calculated using the contour integral method or J-integral. (Rice J R. 1968. J. Appl. Mech. 35. 379-386.) The basic idea is to describe the change in potential energy within a material volume $\Omega$ from the perspective of an observer tied to the tip of the propagating crack. Consider a closed contour C containing the crack tip. For a displacement-prescribed test and given the stress-free boundary conditions on the crack faces, the potential energy is the integral of the free energy $\psi$ inside the material volume $\Omega$: $\varepsilon_{pot}=\int_\Omega \psi d\Omega$. The total change of the potential energy comprises two terms. The first term is related to the change in free energy within $\Omega$:

$$\int_\Omega \frac{\partial \psi}{\partial t} d\Omega.$$

The second term describes the free energy convectively transported as the reference system moves at a speed $-\underline{V}$ (the observer is fixed and tied to the crack tip): $\int_{\partial \Omega} -\psi \underline{V} \cdot \underline{n}$ where $\underline{n}$ is the outward unit vector normal to the boundary $\partial \Omega$ of $\bar{\Omega}$. Thus:

$$\frac{d\varepsilon_{pot}}{dt} = \int_\Omega \frac{\partial \psi}{\partial t} d\Omega - \int_{\partial \Omega} \psi \underline{V} \cdot \underline{n} = -Gp\dot{\ell} \quad (4)$$

For a linear elastic material, $\psi = \frac{1}{2}\underline{\underline{\sigma}}:\underline{\underline{\varepsilon}}$; using the theorem of virtual work, the first term can be transformed into:

$$\int_\Omega \frac{\partial \psi}{\partial t} d\Omega = \dot{\ell} \int_{\partial \Omega} \underline{T} \cdot \frac{\partial \underline{\xi}}{\partial x} dS$$

where $\underline{T}=\underline{\underline{\sigma}} \cdot \underline{n}$ is the stress vector on the boundary $\partial \Omega$ and $\underline{\xi}$ is the displacement vector. Finally, the integral on the boundary of the material volume element can be simplified into an integral on the closed contour C since the crack surface is stress-free ($\underline{T}=\underline{0}$) and horizontal ($\underline{e}_x \cdot \underline{n}=0$). Therefore, the energy release rate can be estimated from:

$$G = \frac{1}{p}\int_C \left(\psi n_x - \underline{T} \cdot \frac{\partial \underline{\xi}}{\partial x}\right) dS \quad (5)$$

with $n_x = \underline{e}_x \cdot \underline{n}$. In the case of the scratch test, the closed contour comprises the material probe interface, (S), the top surface that is stress-free ($n_x=0$, $\underline{T}=\underline{0}$) and closing material surfaces far removed $$\left(\psi = 0, \frac{\partial \underline{\xi}}{\partial x} = \underline{0}\right).$$

As a result, the only non-zero contribution to the right-hand side of Eq. (3) comes from the material-probe interface:

$$G = \frac{1}{p}\int_{(S)} \left(\psi n_x - \underline{T} \cdot \frac{\partial \underline{\xi}}{\partial x}\right) dS \quad (6)$$

Assuming plane strain conditions along with a uniaxial distribution of the stress field ahead of the probe, $$\underline{\underline{\sigma}} = -\frac{F_T}{A} \underline{e}_x \otimes \underline{e}_x,$$

the energy release rate G can be expressed as a function of the horizontal force $F_T$, the material Young's modulus E, and the Poisson's ratio $v$ according to:

$$G = \frac{1-v^2}{E} \frac{F_T^2}{2pA} \quad (7)$$

The Griffith crack propagation criterion is employed to mark the onset of crack propagation. The crack propagates when the energy release rate G reaches a threshold that is the fracture energy $G_f$. The Griffith-Irwin relation is utilized to connect the fracture energy $G_f$ to the fracture toughness $K_c$ assuming plane strain conditions:

$$G = \frac{1-v^2}{E} K_c^2.$$

The fracture toughness $K_c$ is then a function of the horizontal force $F_T$ according to:

$$K_c = \frac{F_T}{\sqrt{2pA}} \quad (8)$$

Herein 2pA is the scratch probe shape function that depends on the penetration depth d and on the scratch probe geometry. For instance, for a conical probe, the scratch probe shape function is a cubic function of the penetration depth, whereas, for a spherical probe, the scratch probe shape function is a quadratic function of the penetration depth. In practice, the scratch probe shape function must be calibrated using a reference material. In turn, the theoretical model predicts that, in the case of a purely brittle fracture process, the ratio of the horizontal force over the square root of the scratch probe shape function is constant and equal to the fracture toughness of the material.

Results

Microstructure of Cement Nanocomposites

Using environmental scanning electron microscopy, a granular and porous microstructure was observed with unhydrated cement grains in bright, hydrated cement in gray and micropores in black. FIGS. 28A-28B display high-resolution BESEM images of nano-reinforced cement at a mass fraction of 0.5 wt % with magnifications levels in the range×5,000-×50,671. For carbon nanofiber-reinforced cement, FIG. 28A shows single carbon nanofibers, 110-240 nm thick, filling nanopores. BESEM imaging suggests that the dispersion procedure is sufficient to debulk carbon nanofibers and yield isolated carbon nanofibers within Portland cement matrices. As for MWCNT-reinforced cement, FIG. 28B shows carbon nanotube bundles, 145-365 nm thick, filling nanopores, and connecting C—S—H grains. Thus, these nanomaterials refine the pore structure at the nanoscale by filling voids and connecting cement hydration products.

The MWCNTs and CNFs contributed to an increase in durability, as measured via their water absorption and the porosity. The water absorption of the manually mixed Portland cement reference specimen was 16.83%, with a porosity of 29.76%. A significant decrease in both the water absorption and the porosity was observed for the Portland cement reference specimen following high speed and high shear mixing combined with curing on an orbital shaker: the water absorption was 5.07% and the porosity was 9.64%. A higher decrease was observed for the cement composites. The water absorption from the MWCNT-reinforced samples was 3.51, 3.70, and 3.17% for the 0.1 wt %, 0.2 wt %, and 0.5 wt % samples, respectively. The water absorption from the CNF-reinforced samples was 3.90, 5.66, and 4.12% for the 0.1 wt %, 0.2 wt %, and 0.5 wt % samples, respectively. After testing cement reinforced with 0.05-0.1 wt % carbon nanotubes, the volume fraction of pores greater than 100 nm was 3-5%. Therefore, the 24-hour curing step on an orbital shaker was highly effective at removing macroscopic air voids, densifying the microstructure, and reducing the water absorption. Furthermore, the carbon-based nanofillers promoted the densification of the microstructure and led to an improvement in durability—as measured by the water absorption and the porosity.

Fracture Micro-Mechanisms of Cement Nanocomposites

FIG. 29A displays a BESEM image of the residual groove after scratch testing on CNF-reinforced cement. Micro-cracks were observed that are curved and perpendicular to the direction of the motion of the scratch probe. There was also some debris present on the sides of the grooves. The micro-cracks and debris provide physical evidence of fracture processes during scratch testing and justify the use of the scratch test method to yield the fracture toughness. FIG. 29B displays fracture micro-mechanisms for the MWCNT-cement composites. In addition to micro-cracking and debris generation, additional fracture micro-mechanisms include ligament bridging and crack deflection.

Fracture Toughness of Cement Nanocomposites

Multiple scratch tests were conducted. All tests superimposed on top of each other very well, pointing to the reproducibility of the scratch test method. After each scratch test, a residual groove had been formed. The presence of the residual groove along with the observed crack surfaces supports the approach of measuring fracture toughness using scratch testing. FIGS. 30A-30B show the influence of carbon-based nanomaterials on the fracture toughness of cement matrices. CNF=carbon nanofibers. MWCNT=multiwalled carbon nanotubes. The solid black line indicates the average fracture toughness of the reference Portland cement specimen. FIG. 31 displays the load-depth curves for all MWCNT-cement composites and all CNF-cement composites tested.

The fracture scaling of scratch tests used the nonlinear Fracture Mechanics model. The quantity $$\frac{F_T}{\sqrt{2pA}}$$

was displayed as a function of the depth-to-radius ratio, $$\frac{d}{R}.$$

A Rockwell scratch probe was used, which had a cone of half-apex angle 60° ended by a sphere of tip radius R=200 µm. In particular, the transition from sphere to cone occurred at a penetration depth of $d_0$=27 µm. Thus, given the penetration depths recorded, the shape function was considered a spherical probe and considered only data points corresponding to $d \leq d_0$. According to the theoretical model, see Eq. 6, the quantity $$\frac{F_T}{\sqrt{2pA}}$$

is constant in the case of a brittle fracture process. For $$\frac{d}{R} \leq 0.06,$$

the quantity $$\frac{F_T}{\sqrt{2pA}}$$

sharply decreased, pointing to a mix of ductile and brittle failure processes. In turn, for $$\frac{d}{R} > 0.06,$$

a convergence was observed toward a constant value. This convergence of $$\frac{F_T}{\sqrt{2pA}}$$

points to a fracture-driven process with dominant brittle fracture; in addition, the fracture toughness is the asymptotic value of $$\frac{F_T}{\sqrt{2pA}}.$$

Before the test, the scratch probe shape function, 2pA, was calibrated using fused silica. Using scratch tests, the fracture toughness of the reference Portland cement specimen R-M was found to be equal to 0.531±0.006 MPa√m. FIGS. 32A-32D display the load-depth curves and fracture toughness scaling curves for all Portland cement specimens. The high-shear and high-speed mixing step and the curing with an orbital shaker step were found to significantly enhance the fracture resistance as the reference Portland cement R—HS—OS, exhibited a 26% increase in fracture toughness with a fracture toughness value of 0.67±0.02 MPa√m.

Table 5 displays the fracture toughness values measured via scratch tests for all the cement composites considered in this example.

TABLE 5

Fracture toughness values, in MPa√m, measured for cement nanocomposites using scratch tests.

| Type of carbon-based nanofiller | 0.1 wt % | 0.2 wt % | 0.5 wt % |
|---|---|---|---|
| Carbon nanofibers | 0.733 ± 0.028 | 0.666 ± 0.018 | 0.730 ± 0.032 |
| Multiwalled carbon nanotubes | 0.620 ± 0.042 | 0.603 ± 0.018 | 0.719 ± 0.017 |

FIGS. 33A-33B display the fracture scaling curves. For CNF-reinforced cement, the fracture toughness was in the range 0.666-0.733 MPa√m. A net improvement in fracture toughness was observed for CNF-1 and CNF-5 with a 38% gain in fracture toughness. For MWCNT-reinforced cement, the fracture toughness was in the range 0.603-0.719 MPa√m. For MWCNTs, at high reinforcement levels, 0.5 wt %, a 38% increase in fracture toughness was observed.

Discussion

In this example, MWCNTs and CNFs were dispersed in three steps: pre-dispersion in deionized water using ultrasonic energy, mixing with cement using ultrahigh speed and high shear conditions, and continuous mechanical stirring for the first 24 hours of curing using an orbital shaker. In addition, the ultrasonic energy scaled quadratically with respect to the mass fraction of nanomaterials. In the last two steps, unhydrated cement grains were used to further disperse nanomaterial clusters.

The synthesis protocol illustrated in the Example yielded significant increases in the fracture toughness for the MWCNT- and CNF-cement composites.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Both embodiments are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A cement composite comprising:
Portland cement; and
multiwalled carbon nanotubes that are free of dispersion-enhancing chemical surface functionalization and are present at a concentration in the range from 0.2 wt % to 1.0 wt %, based on the total weight of the Portland cement and the multiwalled carbon nanotubes, wherein:
the cement composite is free of dispersing aids;
the cement composite has a gel porosity in the range from 0.15 to 0.20 and a capillary porosity of less than 0.1;
the cement composite has a volume fraction of high-density calcium-silicate-hydrates in the range from 0.3 to 0.6; and
the cement composite has a Young' modulus in the range from 15 GPa to 50 GPa.

2. The cement composite of claim 1 consisting essentially of the Portland cement and the multiwalled carbon nanotubes.

3. The cement composite of claim 1 consisting only of the Portland cement and the multiwalled carbon nanotubes.

4. The cement composite of claim 1, wherein the multiwalled carbon nanotubes have an average diameter in the range from 5 nm to 50 nm and an average length in the range from 1 μm to 50 μm.

5. The cement composite of claim 1 having a volume fraction of low-density calcium-silicate-hydrates in the range from 0.01 to 0.15 and a volume fraction of calcium hydroxide in the range from 0.25 to 0.40.

6. The cement composite of claim 1 having a concentration of multiwalled carbon nanotubes in the range from 0.2 wt % to 0.5 wt. %, based on the total weight of the Portland cement and the multiwalled carbon nanotubes.

7. The cement composite of claim 6 having a volume fraction of high-density calcium-silicate-hydrates in the range from 0.5 to 0.6.

8. The cement composite of claim 7 having a fracture toughness in the range from 0.70 MPa√m to 0.80 MPa√m.

9. The cement composite of claim 5 having a concentration of multiwalled carbon nanotubes in the range from 0.2 wt % to 0.5 wt. %, based on the total weight of the Portland cement and the multiwalled carbon nanotubes, a volume fraction of high-density calcium-silicate-hydrates in the range from 0.5 to 0.6, and a fracture toughness in the range from 0.70 MPa√m to 0.80 MPa√m.

10. The cement composite of claim 1, wherein gel pores having a pore size of 2 nm or smaller make up at least half of the total porosity.

11. A cement composite comprising:
Portland cement; and
carbon nanofibers that are free of dispersion-enhancing chemical surface functionalization and are present at a concentration in the range from 0.1 wt % to 0.5 wt %, based on the total weight of the Portland cement and the carbon nanofibers, wherein:
the cement composite is free of dispersing aids;
the cement composite has a gel porosity in the range from 0.16 to 0.20 and a capillary porosity of less than 0.1;
the cement composite has a volume fraction of high-density calcium-silicate-hydrates in the range from 0.65 to 0.75; and
the cement composite has a Young' modulus in the range from 30 GPa to 40 GPa.

12. The cement composite of claim 11 consisting essentially of the Portland cement and the carbon nanofibers.

13. The cement composite of claim 11 consisting only of the Portland cement and the carbon nanofibers.

14. The cement composite of claim 11, wherein the carbon nanofibers have an average diameter in the range from 70 nm to 500 nm and an average length in the range from 50 μm to 200 μm.

15. The cement composite of claim 11 having a volume fraction of low-density calcium-silicate-hydrates in the range from 0.005 to 0.05, a volume fraction of ultrahigh-density calcium-silicate-hydrates in the range from 0.05 to 0.20, and a volume fraction of clinker in the range from 0.05 to 0.15.

16. The cement composite of claim 15 having a fracture toughness in the range from 0.70 MPa√m to 0.80 MPa√m.

17. The cement composite of claim 11, wherein gel pores having a pore size of 2 nm or smaller make up at least half of the total porosity.

* * * * *